United States Patent
Ibrahim et al.

(10) Patent No.: US 12,335,989 B2
(45) Date of Patent: Jun. 17, 2025

(54) CHANNEL STATE INFORMATION REPORTING FOR HALF-DUPLEX AND FULL-DUPLEX MODES

(71) Applicant: QUALCOMM Incorporated, San Diego, CA (US)

(72) Inventors: Abdelrahman Mohamed Ahmed Mohamed Ibrahim, San Diego, CA (US); Muhammad Sayed Khairy Abdelghaffar, San Jose, CA (US); Ahmed Attia Abotabl, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 599 days.

(21) Appl. No.: 17/674,377

(22) Filed: Feb. 17, 2022

(65) Prior Publication Data

US 2023/0319864 A1    Oct. 5, 2023

(51) Int. Cl.
*H04W 72/12* (2023.01)
*H04L 5/16* (2006.01)
(Continued)

(52) U.S. Cl.
CPC ........... *H04W 72/542* (2023.01); *H04L 5/16* (2013.01); *H04W 72/0446* (2013.01);
(Continued)

(58) Field of Classification Search
CPC ........... H04W 72/542; H04W 72/0446; H04W 72/1268; H04W 72/23; H04W 72/569;
(Continued)

(56) References Cited

U.S. PATENT DOCUMENTS 9,930,677 B2 *   3/2018  Choudhury ........... H04L 5/0057
11,140,695 B1 * 10/2021  Eyuboglu ........... H04W 72/535
(Continued)

FOREIGN PATENT DOCUMENTS

CN         118648261 A  *  9/2024  ........... H04B 17/345
WO   WO-2016140607 A1  *  9/2016  ........... H04L 41/0803
(Continued)

OTHER PUBLICATIONS

Intel Corporation: "On Enhancements to UCI for eURLLC", 3GPP TSG RAN WG1 RAN1#96, R1-1902494, 3rd Generation Partnership Project, Mobile Competence Centre, 650, Route Des Lucioles, F-06921 Sophia-Antipolis Cedex, France, vol. RAN WG1, No. Athens, Greece, Feb. 25, 2019-Mar. 1, 2019, Feb. 16, 2019, XP051600190, 8 pages, Section 3, p. 2-p. 3.
(Continued)

*Primary Examiner* — Wutchung Chu
(74) *Attorney, Agent, or Firm* — Loza & Loza, LLP

(57)    ABSTRACT

A user equipment obtains a first channel state information (CSI)-related quantity and a second CSI-related quantity in at least one of: respective first and second CSI-interference measurement (CSI-IM) resources, or respective first and second CSI-reference signal (CSI-RS) resources in respective first and second slots, and transmits a baseline CSI report based on the first CSI-related quantity in the first slot, and a differential CSI report based on the second CSI-related quantity in the second slot, the baseline CSI report being linked to the differential CSI report. In one example, the first slot is a half-duplex slot, the baseline CSI report is a baseline half-duplex CSI report, the second slot is a full-duplex slot, and the differential CSI report is a differential full-duplex CSI report.

30 Claims, 23 Drawing Sheets

(51) Int. Cl.
*H04W 72/0446* (2023.01)
*H04W 72/1268* (2023.01)
*H04W 72/23* (2023.01)
*H04W 72/542* (2023.01)
*H04W 72/566* (2023.01)

(52) U.S. Cl.
CPC ....... *H04W 72/1268* (2013.01); *H04W 72/23* (2023.01); *H04W 72/569* (2023.01)

(58) Field of Classification Search
CPC ....... H04L 5/16; H04L 1/0031; H04L 1/0026; H04L 1/0029; H04L 5/0035; H04L 5/0051; H04L 5/0048; H04B 7/06952; H04B 7/06954; H04B 17/345
See application file for complete search history.

(56) References Cited

U.S. PATENT DOCUMENTS

| | | | | |
|---|---|---|---|---|
| 11,206,549 | B1* | 12/2021 | Eyuboglu | ......... H04W 72/1273 |
| 2013/0322376 | A1 | 12/2013 | Marinier et al. | |
| 2017/0054544 | A1* | 2/2017 | Kazmi | ...................... H04L 5/14 |
| 2019/0141693 | A1* | 5/2019 | Guo | ...................... H04B 7/088 |
| 2021/0235301 | A1* | 7/2021 | Abedini | ................ H04W 72/23 |
| 2021/0351959 | A1 | 11/2021 | Zhang et al. | |
| 2022/0014954 | A1 | 1/2022 | Ibrahim et al. | |
| 2022/0069884 | A1* | 3/2022 | Zhang | .................. H04B 7/0408 |
| 2022/0141852 | A1* | 5/2022 | Zhang | ...................... H04L 5/14 370/329 |

FOREIGN PATENT DOCUMENTS

| | | | | |
|---|---|---|---|---|
| WO | WO-2020149997 A1 * | 7/2020 | ......... | H04L 27/2607 |
| WO | 2021154884 A1 | 8/2021 | | |
| WO | 2021217328 A1 | 11/2021 | | |
| WO | WO-2021223582 A1 * | 11/2021 | ............ | H04B 17/24 |
| WO | 2021248299 A1 | 12/2021 | | |
| WO | 2022018672 A1 | 1/2022 | | |

OTHER PUBLICATIONS

International Search Report and Written Opinion—PCT/US2023/062108—ISA/EPO—May 15, 2023.

* cited by examiner

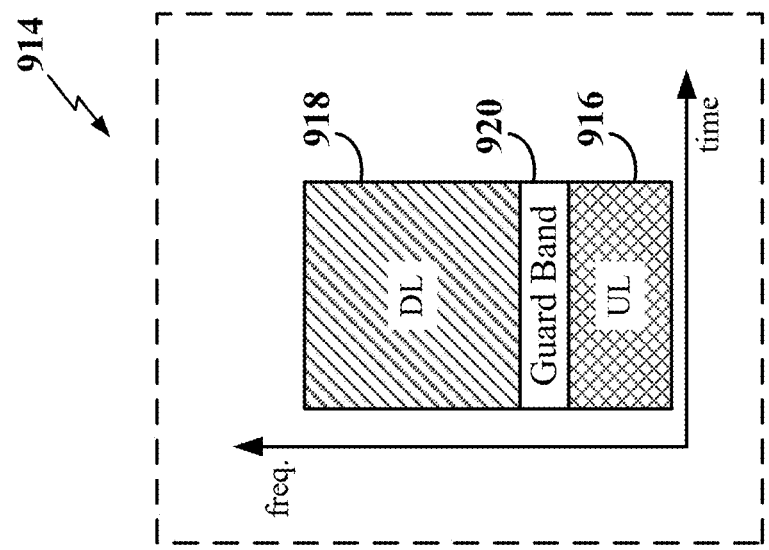
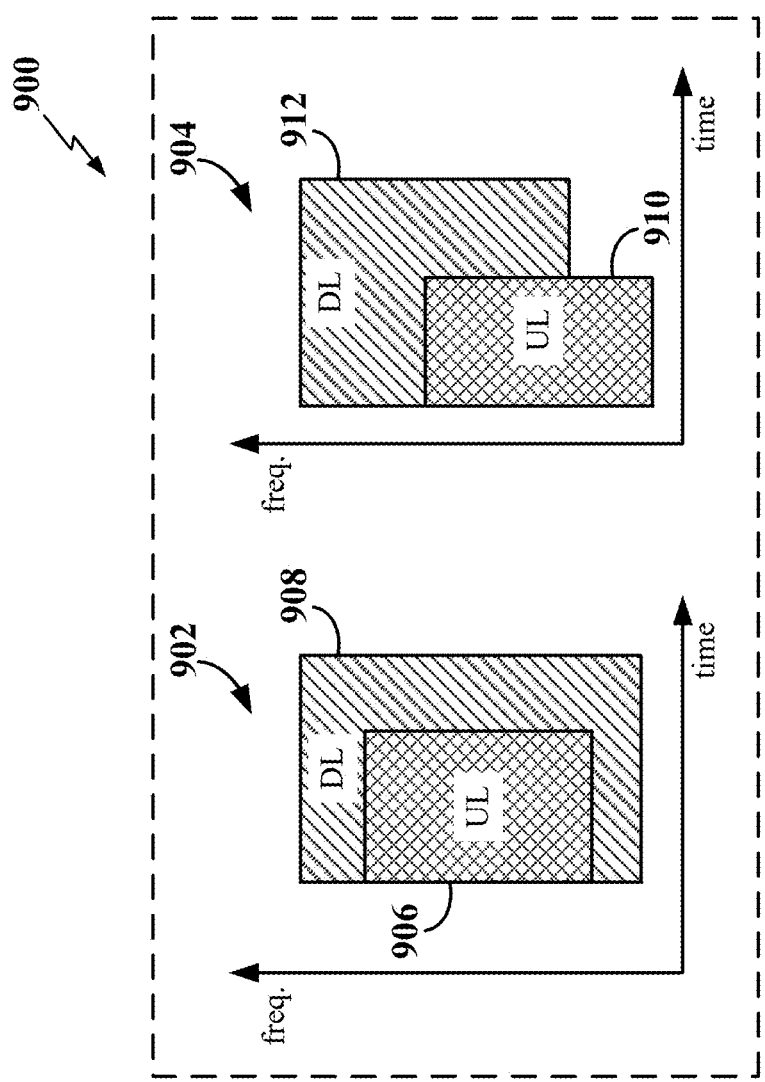
FIG. 9B
FIG. 9A

| CSI Report Number | CSI Fields |
|---|---|
| CSI Report #n CSI Part 1 | CRI or SSBRI, if Reported |
| | Rank Indicator, if Reported |
| | Wideband CQI for the First TB, if Reported |
| | Subband Differential CQI for the First TB with Increasing Order of Subband Number, if Reported |
| | Indicator of the Number of Non-zero Wideband Amplitude Coefficients $M_0$ for Layer 0, if Reported |
| | Indicator of the Number of Non-zero Wideband Amplitude Coefficients $M_1$ for Layer 1 if Two-Layer PMI Reporting is Allowed, if Reported |
| | RSRP, if Reported |
| | Differential RSRP, if Reported |

FIG. 13A

| CSI Report Number | CSI Fields |
|---|---|
| CSI Report #n CSI Part 2 | Wideband CQI for the Second TB, if Present and Reported |
| | Layer Indicator, if Reported |
| | PMI Wideband Information Fields $X_1$, from Left to Right, if Reported |
| | PMI Wideband Information Fields $X_2$, from Left to Right, or Codebook Index for 2 Antenna Ports, if pmi-FormatIndicator = widebandPMI and if Reported |

FIG. 13B

CHANNEL STATE INFORMATION REPORTING FOR HALF-DUPLEX AND FULL-DUPLEX MODES

TECHNICAL FIELD

The technology discussed below relates generally to wireless communication networks, and more particularly, to channel state information reporting for half-duplex and full-duplex modes.

INTRODUCTION

In wireless communication systems, such as those specified under 5G New Radio (NR) standards, a base station and user equipment (UE) exchange signals using various duplex modes. Duplex modes include half-duplex and full-duplex. In half-duplex communication, only one node (e.g., UE or base station) can transmit or receive at a given time. In other words, from the perspective of one node, that node is either transmitting or receiving a given time. In full-duplex communication, two nodes (e.g., UE and base station) can transmit and receive at the same time (e.g., simultaneous transmission and reception between at least two nodes). In other words, from the perspective of one node, that node may transmit and receive simultaneously. An example of half-duplex communication is time division duplex (TDD) communication. In 5G NR TDD, uplink signaling (e.g., from a UE to a base station) and downlink signaling (e.g., form the base station to the UE) are separately scheduled in time; however, uplink and downlink communications may be transmitted on the same frequencies (e.g., on the same carrier). An example of full-duplex communication is frequency division duplex (FDD) communication. In 5G NR FDD, uplink signaling and downlink signaling are simultaneously scheduled in time; however, uplink and downlink signaling may be transmitted on different frequencies (e.g., on different and spaced apart carriers). Other examples of full-duplex (FD) modes of communication include, but are not limited to, sub-band full-duplex (SBFD), in-band full-duplex (IBFD), flexible TDD, partial frequency division duplex (FDD) communication, and other FD modes of communication in which uplink and downlink signaling are simultaneously scheduled in time and may be transmitted on the same fully or partially overlapped frequencies.

Base stations and UEs may be configured to operate in FD mode when configured with two or more antenna panels, each including a plurality of antenna elements. Antenna panels may be used in beamforming applications. Beamforming may be used to provide spatial diversity between receivers and transmitters. For example, a base station with two antenna panels may direct a transmit beam to a first UE and direct a receive beam toward a second UE, where the first and second UE are at different azimuths relative to the base station. The beams do not interfere with each other because they are directed toward targets that are separated from each other by some angular distance relative to the base station. In another example, a base station and a UE may each have two panels; one panel for transmission and a second panel for reception. Even though the two panels on each device are co-located, full-duplex simultaneous reception and transmission may be achieved in the FD mode.

A UE may be configured to estimate a channel between the UE and a base station (e.g., a gNB) and to report channel state information (CSI) indicating the quality of the channel to the base station. The channel state between a base station may change based on the duplex modes (i.e., full-duplex mode and half-duplex mode) of the base station and the UE.

BRIEF SUMMARY OF SOME EXAMPLES

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

A user equipment for wireless communication is disclosed. The user equipment includes a transceiver, a memory, and a processor communicatively coupled to the transceiver and the memory. The processor and the memory are configured to obtain a first channel state information (CSI)-related quantity and a second CSI-related quantity in at least one of: respective first and second CSI-interference measurement (CSI-IM) resources, or respective first and second CSI-reference signal (CSI-RS) resources in respective first and second slots, and transmit a baseline CSI report based on the first CSI-related quantity in the first slot, and a differential CSI report based on the second CSI-related quantity in the second slot, the baseline CSI report being linked to the differential CSI report.

A method of wireless communication at a user equipment is disclosed. The method includes obtaining a first channel state information (CSI)-related quantity and a second CSI-related quantity in at least one of: respective first and second CSI-interference measurement (CSI-IM) resources, or respective first and second CSI-reference signal (CSI-RS) resources in respective first and second slots; and transmitting a baseline CSI report based on the first CSI-related quantity in the first slot, and a differential CSI report based on the second CSI-related quantity in the second slot, the baseline CSI report being linked to the differential CSI report.

A user equipment configured for wireless communication is disclosed. The user equipment includes means for obtaining a first channel state information (CSI)-related quantity and a second CSI-related quantity in at least one of: respective first and second CSI-interference measurement (CSI-IM) resources, or respective first and second CSI-reference signal (CSI-RS) resources in respective first and second slots; and means for transmitting a baseline CSI report based on the first CSI-related quantity in the first slot, and a differential CSI report based on the second CSI-related quantity in the second slot, the baseline CSI report being linked to the differential CSI report.

These and other aspects will become more fully understood upon a review of the detailed description, which follows. Other aspects, features, and examples will become apparent to those of ordinary skill in the art upon reviewing the following description of specific exemplary aspects in conjunction with the accompanying figures. While features may be discussed relative to certain examples and figures below, all examples can include one or more of the advantageous features discussed herein. In other words, while one or more examples may be discussed as having certain advantageous features, one or more of such features may also be used in accordance with the various examples discussed herein. Similarly, while examples may be discussed below as device, system, or method examples, it should be understood that such examples can be implemented in various devices, systems, and methods.

BRIEF DESCRIPTION OF THE DRAWINGS

FIG. 9A is a diagram illustrating two examples of in-band full-duplex modulation according to some aspects.

FIG. 9B is a diagram illustrating an example of sub-band full-duplex according to some aspects.

FIGS. 13A and 13B are a first table and a second table illustrating examples of various CSI fields that may be included in a CSI report of a CSI Part1 and a CSI report of a CSI Part2, respectively, according to some aspects.

DETAILED DESCRIPTION

Figure 1:
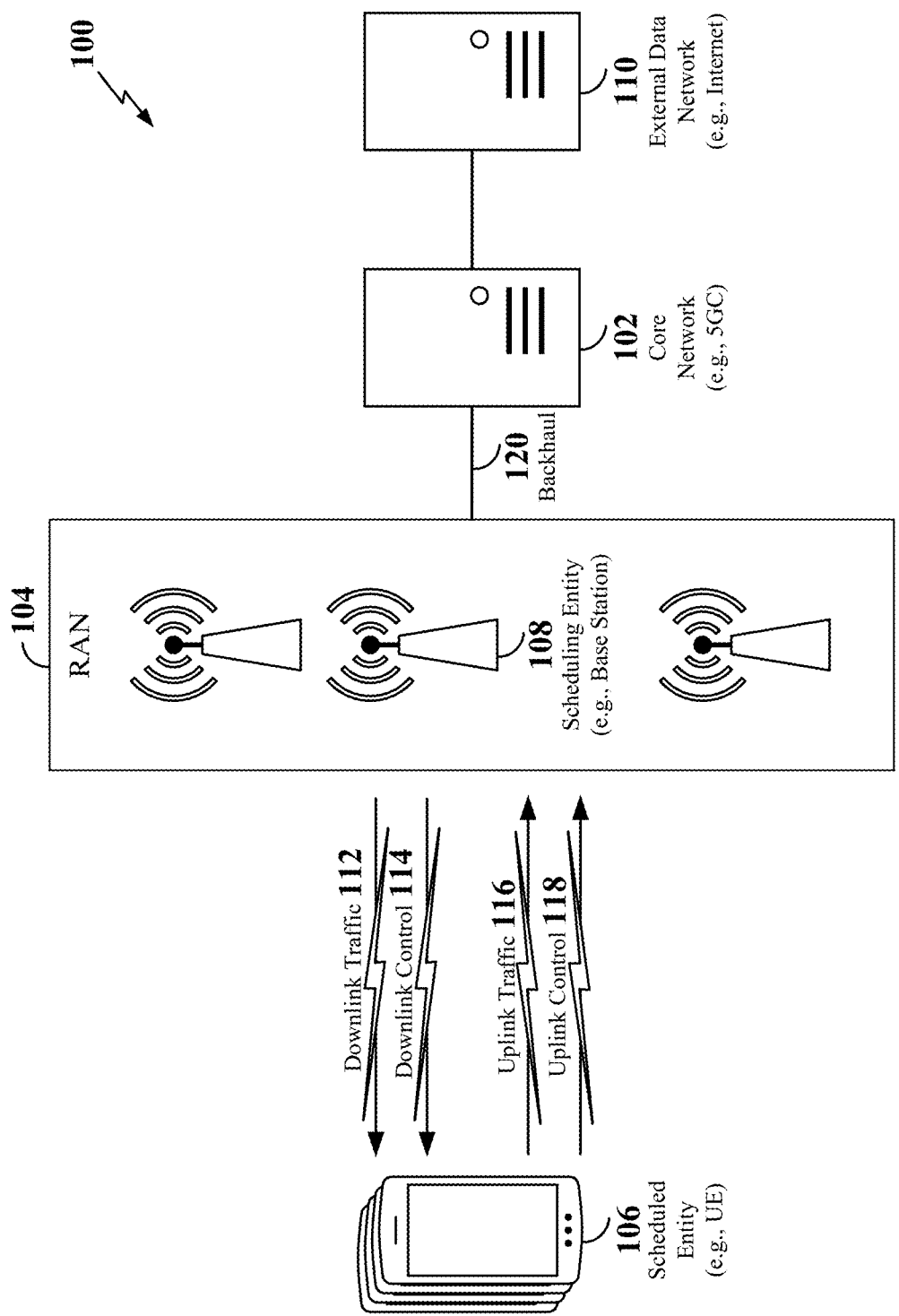
FIG. 1 is a schematic illustration of a wireless communication system according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and examples are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, aspects and/or uses may come about via integrated chip examples and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described examples. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, disaggregated arrangements (e.g., base station and/or UE), end-user devices, etc. of varying sizes, shapes, and constitution.

The electromagnetic spectrum is often subdivided, based on frequency/wavelength, into various classes, bands, channels, etc. In 5G NR two initial operating bands have been identified as frequency range designations FR1 (410 MHz- 7.125 GHz) and FR2 (24.25 GHz-52.6 GHz). It should be understood that although a portion of FR1 is greater than 6 GHZ, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4-a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHZ, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and at least one scheduled entity 106. The at least one scheduled entity 106 may be referred to as a user equipment (UE) 106 in the discussion that follows. The RAN 104 includes at least one scheduling entity 108. The at least one scheduling entity 108 may be referred to as a base station (BS) 108 in the discussion that follows. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3rd Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a network access node, a transmission and reception point (TRP) or some other suitable terminology. In some examples, a base station may include two or more TRPs that may be co-located or non-co-located. Each TRP may communicate on the same or different carrier frequency within the same or different frequency band. In examples where the RAN 104 operates according to both the LTE and 5G NR standards, one of the base stations may be an LTE base station, while another base station may be a 5G NR base station. In addition, one or more of the base stations may have a disaggregated configuration.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move and may be stationary. The term mobile apparatus or mobile device broadly refers to a diverse array of devices and technologies. UEs may include a number of hardware structural components sized, shaped, and arranged to help in communication; such components can include antennas, antenna arrays, radio frequency (RF) chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of Things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc.

A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, an industrial automation and enterprise device, a logistics controller, agricultural equipment, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., similar to UE 106) may be referred to as downlink (DL) transmission. In accordance with certain aspects of the present disclosure, the term downlink may refer to a point-to-multipoint transmission originating at a base station (e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a UE (e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities (e.g., UE 106). That is, for scheduled communication, a plurality of UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs). And as discussed more below, UEs may communicate directly with other UEs in peer-to-peer fashion and/or in relay configuration.

As illustrated in FIG. 1, a scheduling entity 108 may broadcast downlink traffic 112 to one or more scheduled entities (e.g., one or more UEs 106). Broadly, the scheduling entity 108 is a node or device responsible for scheduling traffic in a wireless communication network, including the downlink traffic 112 and, in some examples, uplink traffic 116 from one or more scheduled entities (e.g., one or more UEs 106) to the scheduling entity 108. On the other hand, the scheduled entity (e.g., a UE 106) is a node or device that receives downlink control information 114, including but not limited to scheduling information (e.g., a grant), synchronization or timing information, or other control information from another entity in the wireless communication network such as the scheduling entity 108. The scheduled entity 106 may further transmit uplink control information 118, including but not limited to a scheduling request or feedback information, or other control information to the scheduling entity 108.

In addition, the uplink and/or downlink control information 114 and/or 118 and/or traffic 112 and/or 116 information may be transmitted on a waveform that may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Within the present disclosure, a frame may refer to a predetermined duration (e.g., 10 ms) for wireless transmissions, with each frame consisting of, for example, 10 subframes of 1 ms each. Of course, these definitions are not required, and any suitable scheme for organizing waveforms may be utilized, and various time divisions of the waveform may have any suitable duration.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100 and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
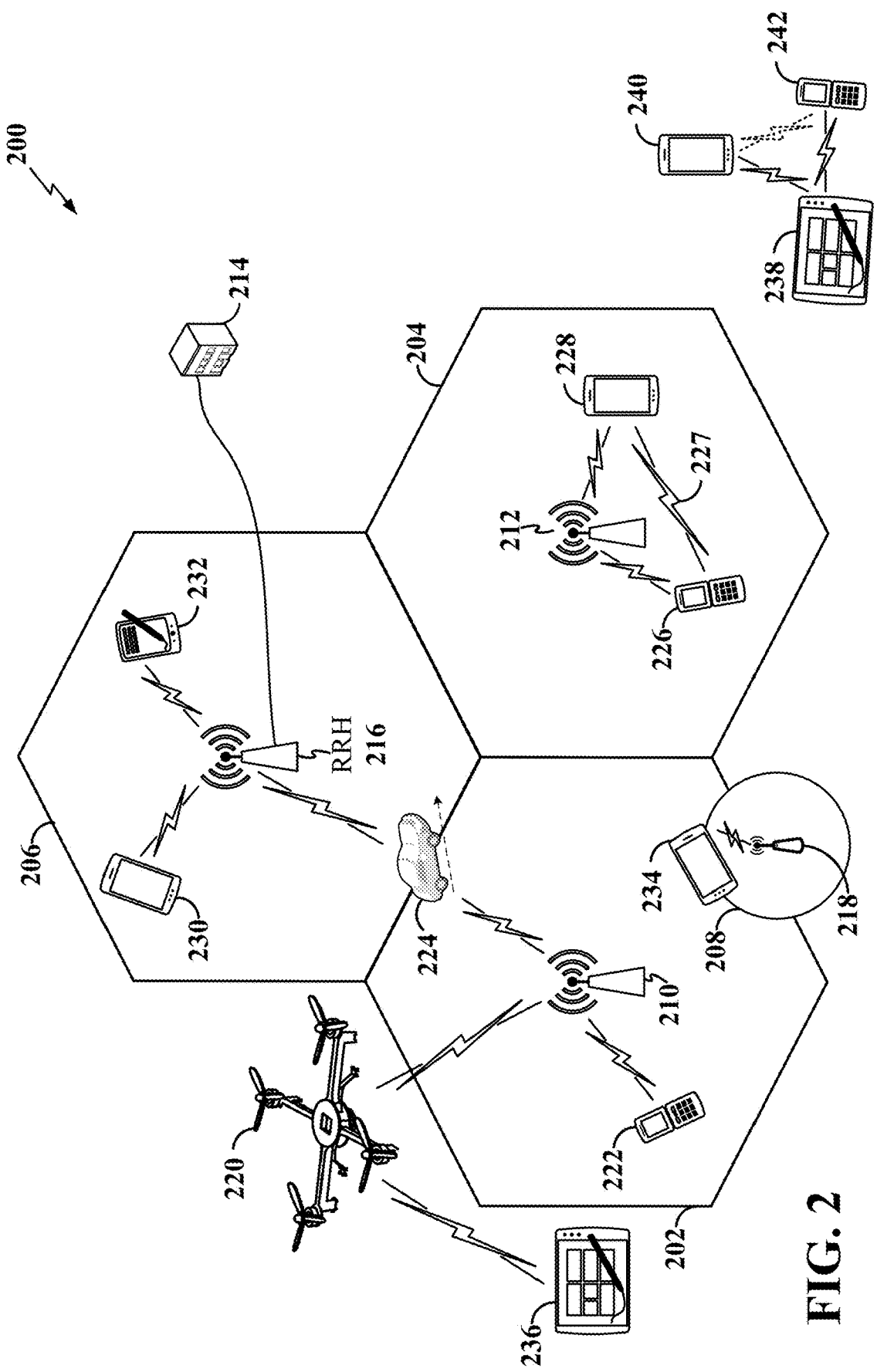
FIG. 2 is a schematic illustration of an example of a radio access network according to some aspects.

Referring now to FIG. 2, by way of example and without limitation, a schematic illustration of an example of a RAN 200 is provided. In some examples, the RAN 200 may be the same as the RAN 104 described above and illustrated in FIG. 1.

The geographic area covered by the RAN 200 may be divided into cellular regions (cells) that can be uniquely identified by a user equipment (UE) based on an identification broadcasted from one access point or base station. FIG. 2 illustrates cells 202, 204, 206, and 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

Various base station arrangements can be utilized. For example, in FIG. 2, two base stations, base station 210 and base station 212 are shown in cells 202 and 204. A third base station, base station 214 is shown controlling a remote radio head (RRH) 216 in cell 206. That is, a base station can have an integrated antenna or can be connected to an antenna or RRH 216 by feeder cables. In the illustrated example, cells 202, 204, and 206 may be referred to as macrocells, as the base stations 210, 212, and 214 support cells having a large size. Further, a base station 218 is shown in the cell 208, which may overlap with one or more macrocells. In this example, the cell 208 may be referred to as a small cell (e.g., a microcell, picocell, femtocell, home base station, home Node B, home eNode B, etc.), as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

FIG. 2 further includes an unmanned aerial vehicle (UAV) 220, which may be a drone or quadcopter. The UAV 220 may be configured to function as a base station, or more specifically as a mobile base station. That is, in some examples, a cell may not necessarily be stationary, and the geographic area of the cell may move according to the location of a mobile base station, such as the UAV 220.

Within the RAN 200, the cells may include UEs that may be in communication with one or more sectors of each cell. Further, each base station 210, 212, 214, and 218 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; and UE 234 may be in communication with base station 218. In some examples, the UEs 222, 224, 226, 228, 230, 232, 234, 236, 238, 240, and/or 242 may be the same as the UE/scheduled entity 106 described above and illustrated in FIG. 1. In some examples, the UAV 220 (e.g., the quadcopter) can be a mobile network node and may be configured to function as a UE. For example, the UAV 220 may operate within cell 202 by communicating with base station 210.

In a further aspect of the RAN 200, sidelink signals may be used between UEs without necessarily relying on scheduling or control information from a base station. Sidelink communication may be utilized, for example, in a device-to-device (D2D) network, peer-to-peer (P2P) network, vehicle-to-vehicle (V2V) network, vehicle-to-everything (V2X) network, and/or other suitable sidelink network. For example, two or more UEs (e.g., UEs 238, 240, and 242) may communicate with each other using sidelink signals 237 without relaying that communication through a base station. In some examples, the UEs 238, 240, and 242 may each function as a scheduling entity or transmitting sidelink device and/or a scheduled entity or a receiving sidelink device to schedule resources and communicate sidelink signals 237 therebetween without relying on scheduling or control information from a base station. In other examples, two or more UEs (e.g., UEs 226 and 228) within the coverage area of a base station (e.g., base station 212) may also communicate sidelink signals 227 over a direct link (sidelink) without conveying that communication through the base station 212. In this example, the base station 212 may allocate resources to the UEs 226 and 228 for the sidelink communication.

In some examples, a D2D relay framework may be included within a cellular network to facilitate relaying of communication to/from the base station 212 via D2D links (e.g., sidelinks 227 or 237). For example, one or more UEs (e.g., UE 228) within the coverage area of the base station 212 may operate as relaying UEs to extend the coverage of the base station 212, improve the transmission reliability to one or more UEs (e.g., UE 226), and/or to allow the base station to recover from a failed UE link due to, for example, blockage or fading.

In the RAN 200, the ability of UEs to communicate while moving, independent of their location, is referred to as mobility. The various physical channels between the UE and the RAN 200 are generally set up, maintained, and released under the control of an access and mobility management function (AMF). In some scenarios, the AMF may include a security context management function (SCMF) and a security anchor function (SEAF) that performs authentication. The SCMF can manage, in whole or in part, the security context for both the control plane and the user plane functionality.

In various aspects of the disclosure, the RAN 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, the UE 224 may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCHs)). The UEs 222, 224, 226, 228, 230, and 232 may receive the unified synchronization signals, derive the carrier frequency, and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the RAN 200. Each of the cells may measure a strength of the pilot signal, and the radio access network (e.g., one or more of the base stations 210 and 214/216 and/or a central node within the core network) may determine a serving cell for the UE 224. As the UE 224 moves through the RAN 200, the RAN 200 may continue to monitor the uplink pilot signal transmitted by the UE 224. When the signal strength or quality of the pilot signal measured by a neighboring cell exceeds that of the signal strength or quality measured by the serving cell, the RAN 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

Devices communicating in the radio access network 200 may utilize one or more multiplexing techniques and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Devices in the radio access network 200 may also utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, in some scenarios, a channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full duplex (SBFD), also known as flexible duplex.

Various aspects of the present disclosure will be described with reference to a diagram illustrating an example of a frame structure that may be utilized with an OFDM waveform, for use in a RAN, schematically illustrated in FIG. 3 according to some aspects. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 3:
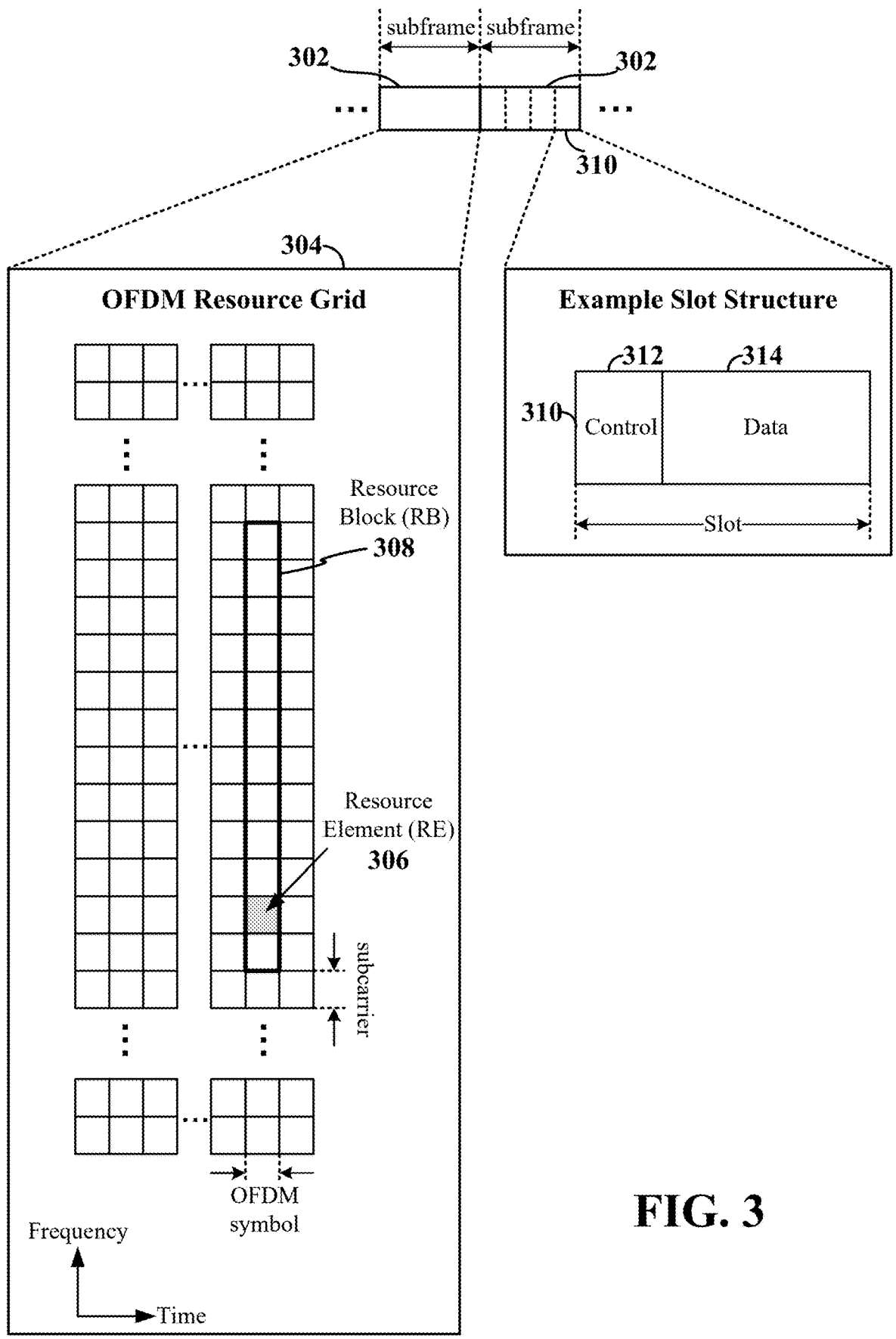
FIG. 3 is a diagram illustrating an example of a frame structure for use in a radio access network according to some aspects.

Referring now to FIG. 3, an expanded view of an example DL subframe 302 is illustrated, showing an OFDM resource grid. However, as those skilled in the art will readily appreciate, the physical (PHY) transmission structure for any particular application may vary from the example described here, depending on any number of factors. Here, time is in the horizontal direction with units of OFDM symbols; and frequency is in the vertical direction with units of subcarriers.

The resource grid 304 may be used to schematically represent time-frequency resources for a given antenna port. That is, in a multiple-input multiple-output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

A set of continuous or discontinuous resource blocks may be referred to herein as a Resource Block Group (RBG), sub-band, or bandwidth part (BWP). A set of sub-bands or BWPs may span the entire bandwidth. Scheduling of scheduled entities (e.g., UEs) for downlink, uplink, or sidelink transmissions typically involves scheduling one or more resource elements 306 within one or more sub-bands or bandwidth parts (BWPs). Thus, a UE generally utilizes only a subset of the resource grid 304. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a base station (e.g., gNB, eNB, etc.), or may be self-scheduled by a UE implementing D2D sidelink communication.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 310 illustrates the slot 310 including a control region 312 and a data region 314. In general, the control region 312 may carry control channels, and the data region 314 may carry data channels. Of course, a slot may contain all DL, all UL, or at least one DL portion and at least one UL portion. The structure illustrated in FIG. 3 is an example, and different slot structures may be utilized, and may include one or more of each of the control region(s) and data region(s).

Although not illustrated in FIG. 3, the various REs 306 within a RB 308 may be scheduled to carry one or more physical channels, including control channels, shared channels, data channels, etc. Other REs 306 within the RB 308 may also carry pilots or reference signals. These pilots or reference signals may provide for a receiving device to perform channel estimation of the corresponding channel, which may enable coherent demodulation/detection of the control and/or data channels within the RB 308.

In some examples, the slot 310 may be utilized for broadcast, multicast, groupcast, or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast or groupcast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 306 (e.g., within the control region 312) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry hybrid automatic repeat request (HARQ) feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 306 (e.g., in the control region 312 or the data region 314) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 40, 80, or 160 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformation Type 1 (SIB1) that may include various additional system information. The MIB and SIB1 together provide the minimum system information (SI) for initial access. Examples of system information transmitted in the MIB may include, but are not limited to, a subcarrier spacing (e.g., default downlink numerology), system frame number, a configuration of a PDCCH control resource set (CORESET) (e.g., PDCCH CORESET0), a cell barred indicator, a cell reselection indicator, a raster offset, and a search space for SIB1. Examples of remaining minimum system information (RMSI) transmitted in the SIB1 may include, but are not limited to, a random access search space, a paging search space, downlink configuration information, and uplink configuration information. A base station may transmit other system information (OSI) as well.

In an UL transmission, the scheduled entity (e.g., UE) may utilize one or more REs 306 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 306 (e.g., within the data region 314) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 306 within the data region 314 may be configured to carry other signals, such as one or more SIBs and DMRSs. In some examples, the PDSCH may carry a plurality of SIBs, not limited to SIB1, discussed above. For example, the OSI may be provided in these SIBs, e.g., SIB2 and above.

In an example of sidelink communication over a sidelink carrier via a proximity service (ProSe) PC5 interface, the control region 312 of the slot 310 may include a physical sidelink control channel (PSCCH) including sidelink control information (SCI) transmitted by an initiating (transmitting) sidelink device (e.g., Tx V2X device or other Tx UE) towards a set of one or more other receiving sidelink devices (e.g., Rx V2X device or other Rx UE). The data region 314 of the slot 310 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 306 within slot 310. For example, HARQ feedback information may be transmitted in a physical sidelink feedback channel (PSFCH) within the slot 310 from the receiving sidelink device to the transmitting sidelink device. In addition, one or more reference signals, such as a sidelink SSB, a sidelink CSI-RS, a sidelink SRS, and/or a sidelink positioning reference signal (PRS) may be transmitted within the slot 310.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers described above in connection with FIGS. 1-3 are not necessarily all of the channels or carriers that may be utilized between a scheduling entity and scheduled entities, and those of ordinary skill in the art will recognize that other channels or carriers may be utilized in addition to those illustrated, such as other traffic, control, and feedback channels.

Figure 4:
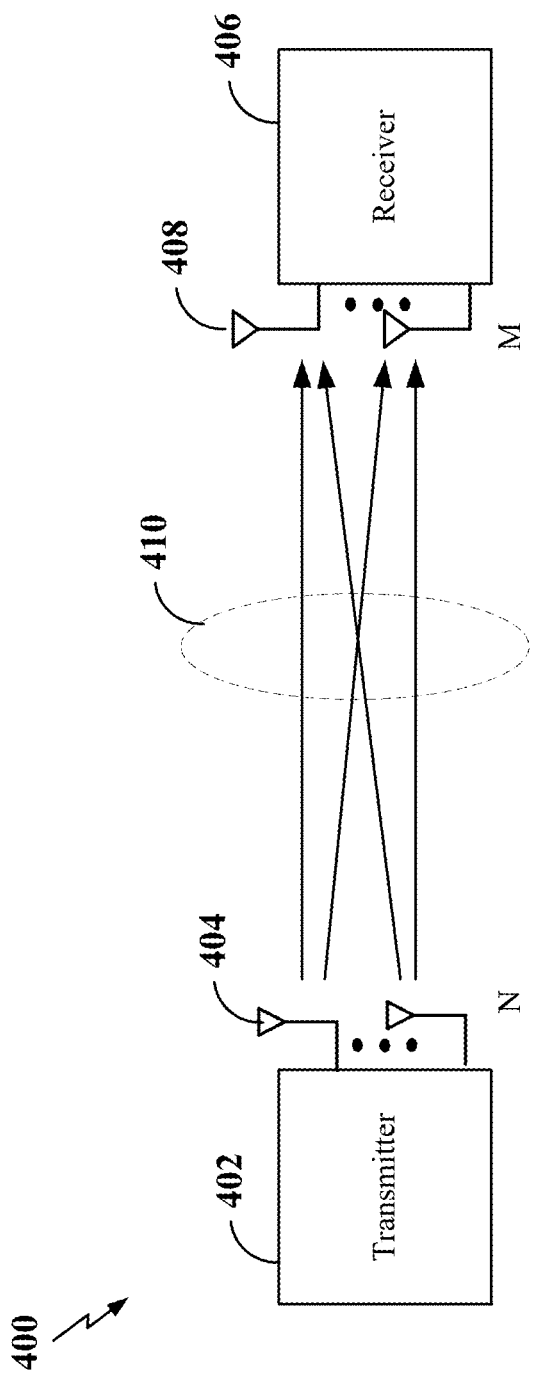
FIG. 4 is a block diagram illustrating an example of a wireless communication system supporting beamforming and/or multiple-input multiple-output (MIMO) communication according to some aspects.

In some aspects of the disclosure, the scheduling entity and/or scheduled entity may be configured for beamforming and/or multiple-input multiple-output (MIMO) technology. FIG. 4 is a block diagram illustrating an example of a wireless communication system supporting beamforming and/or multiple-input multiple-output (MIMO) communication according to some aspects. In a MIMO system, a transmitter 402 includes multiple transmit antennas 404 (e.g., N transmit antennas) and a receiver 406 includes multiple receive antennas 408 (e.g., M receive antennas). Thus, there are N×M signal paths 410 from the transmit antennas 404 to the receive antennas 408. Each of the transmitter 402 and the receiver 406 may be implemented, for example, within a scheduling entity, a scheduled entity, or any other suitable wireless communication device.

The use of such multiple antenna technology enables the wireless communication system to exploit the spatial domain to support spatial multiplexing, beamforming, and transmit diversity. Spatial multiplexing may be used to transmit different streams of data, also referred to as layers, simultaneously on the same time-frequency resource. The data streams may be transmitted to a single UE to increase the data rate or to multiple UEs to increase the overall system capacity, the latter being referred to as multi-user MIMO (MU-MIMO). This is achieved by spatially precoding each data stream (i.e., multiplying the data streams with different weighting and phase shifting) and then transmitting each spatially precoded stream through multiple transmit antennas on the downlink. The spatially precoded data streams arrive at the UE(s) with different spatial signatures, which enables each of the UE(s) to recover the one or more data streams destined for that UE. On the uplink, each UE transmits a spatially precoded data stream, which enables the base station to identify the source of each spatially precoded data stream.

The number of data streams or layers corresponds to the rank of the transmission. In general, the rank of the wireless communication system 400 (MIMO system) is limited by the number of transmit or receive antennas 404 or 408, whichever is lower. In addition, the channel conditions at the UE, as well as other considerations, such as the available resources at the base station, may also affect the transmission rank. For example, the rank (and therefore, the number of data streams) assigned to a particular UE on the downlink may be determined based on the rank indicator (RI) transmitted from the UE to the base station. The RI may be determined based on the antenna configuration (e.g., the number of transmit and receive antennas) and a measured signal-to-interference-and-noise ratio (SINR) on each of the receive antennas. The RI may indicate, for example, the number of layers that may be supported under the current channel conditions. The base station may use the RI, along with resource information (e.g., the available resources and amount of data to be scheduled for the UE), to assign a transmission rank to the UE.

In one example, as shown in FIG. 4, a rank-2 spatial multiplexing transmission on a 2×2 MIMO antenna configuration will transmit one data stream from each transmit antenna 404. Each data stream reaches each receive antenna 408 along a different signal path 410. The receiver 406 may then reconstruct the data streams using the received signals from each receive antenna 408.

Beamforming is a signal processing technique that may be used at the transmitter 402 or receiver 406 to shape or steer an antenna beam (e.g., a transmit beam or receive beam) along a spatial path between the transmitter 402 and the receiver 406. Beamforming may be achieved by combining the signals communicated via antennas 404 or 408 (e.g., antenna elements of an antenna array module) such that some of the signals experience constructive interference while others experience destructive interference. To create the desired constructive/destructive interference, the transmitter 402 or receiver 406 may apply amplitude and/or phase offsets to signals transmitted or received from each of the antennas 404 or 408 associated with the transmitter 402 or receiver 406.

In 5G New Radio (NR) systems, particularly for above 6 GHz or mmWave systems, beamformed signals may be utilized for most downlink channels, including the physical downlink control channel (PDCCH) and physical downlink shared channel (PDSCH). In addition, broadcast control information, such as the SSB, slot format indicator (SFI), and paging information, may be transmitted in a beam-sweeping manner to enable all scheduled entities (UEs) in the coverage area of a transmission and reception point (TRP) (e.g., a gNB) to receive the broadcast control information. In addition, for UEs configured with beamforming antenna arrays, beamformed signals may also be utilized for uplink channels, including the physical uplink control channel (PUCCH) and physical uplink shared channel (PUSCH).

A base station (e.g., gNB) may generally be capable of communicating with UEs using transmit beams (e.g., downlink transmit beams) of varying beam widths. For example, a base station may be configured to utilize a wider beam when communicating with a UE that is in motion and a narrower beam when communicating with a UE that is stationary. The UE may further be configured to utilize one or more downlink receive beams to receive signals from the base station. In some examples, to select one or more downlink transmit beams and one or more downlink receive beams for communication with a UE, the base station may transmit a reference signal, such as an SSB or CSI-RS, on each of a plurality of downlink transmit beams in a beam-sweeping manner. The UE may measure the reference signal received power (RSRP) on each of the downlink transmit beams using one or more downlink receive beams on the UE and transmit a beam measurement report to the base station indicating the RSRP of each of the measured downlink transmit beams. The base station may then select one or more serving downlink beams (e.g., downlink transmit beams and downlink receive beams) for communication with the UE based on the beam measurement report. The resulting selected downlink transmit beam and downlink receive beam may form a downlink beam pair link. In other examples, when the channel is reciprocal, the base station may derive the particular downlink beam(s) to communicate with the UE based on uplink measurements of one or more uplink reference signals, such as sounding reference signals (SRSs).

Similarly, uplink beams (e.g., uplink transmit beam(s) at the UE and uplink receive beam(s) at the base station) may be selected by measuring the RSRP of received uplink reference signals (e.g., SRSs) or downlink reference signals (e.g., SSBs or CSI-RSs) during an uplink or downlink beam sweep. For example, the base station may determine the uplink beams either by uplink beam management via an SRS beam sweep with measurement at the base station or by downlink beam management via an SSB/CSI-RS beam sweep with measurement at the UE. The selected uplink beam may be indicated by a selected SRS resource (e.g., time-frequency resources utilized for the transmission of an SRS) when implementing uplink beam management or a selected SSB/CSI-RS resource when implementing downlink beam management. For example, the selected SSB/CSI-RS resource can have a spatial relation to the selected uplink transmit beam (e.g., the uplink transmit beam utilized for the PUCCH, SRS, and/or PUSCH). The resulting selected uplink transmit beam and uplink receive beam may form an uplink beam pair link.

Figure 5:
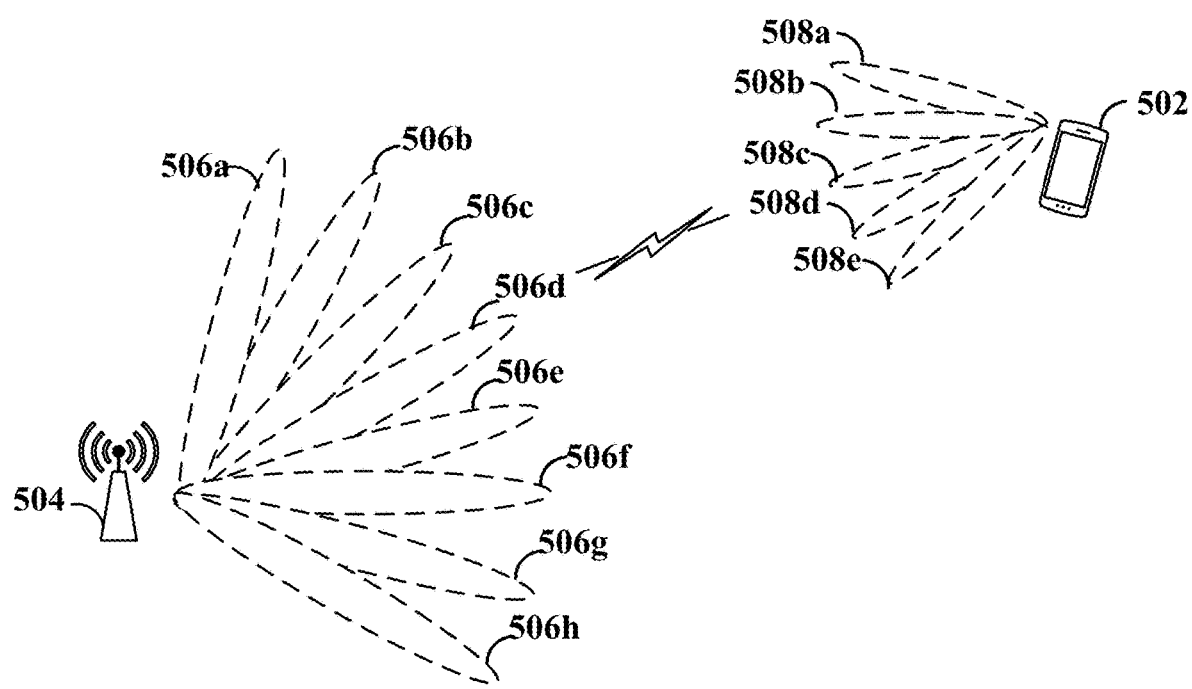
FIG. 5 is a diagram illustrating communication using beamformed signals according to some aspects.

FIG. 5 is a diagram illustrating communication between a base station 504 and a UE 502 using beamformed signals according to some aspects. The base station 504 may be any of the base stations (e.g., gNBs) or scheduling entities illustrated in FIGS. 1, 2, and/or 4, and the UE 502 may be any of the UEs or scheduled entities illustrated in FIGS. 1, 2, and/or 4.

The base station 504 may generally be capable of communicating with the UE 502 using one or more transmit beams, and the UE 502 may further be capable of communicating with the base station 504 using one or more receive beams. As used herein, the term transmit beam refers to a beam on the base station 504 that may be utilized for downlink or uplink communication with the UE 502. In addition, the term receive beam refers to a beam on the UE 502 that may be utilized for downlink or uplink communication with the base station 504.

In the example shown in FIG. 5, the base station 504 is configured to generate a plurality of transmit beams 506a-506h, each associated with a different spatial direction. In addition, the UE 502 is configured to generate a plurality of receive beams 508a-508e, each associated with a different spatial direction. It should be noted that while some beams are illustrated as adjacent to one another, such an arrangement may be different in different aspects. For example, transmit beams 506a-506h transmitted during a same symbol may not be adjacent to one another. In some examples, the base station 504 and UE 502 may each transmit more or less beams distributed in all directions (e.g., 360 degrees) and in three-dimensions. In addition, the transmit beams 506a-506h may include beams of varying beam width. For example, the base station 504 may transmit certain signals (e.g., SSBs) on wider beams and other signals (e.g., CSI-RSs) on narrower beams.

The base station 504 and UE 502 may select one or more transmit beams 506a-506h on the base station 504 and one or more receive beams 508a-508e on the UE 502 for communication of uplink and downlink signals therebetween using a beam management procedure. In one example, during initial cell acquisition, the UE 502 may perform a P1 beam management procedure to scan the plurality of transmit beams 506a-506h on the plurality of receive beams 508a-508e to select a beam pair link (e.g., one of the transmit beams 506a-506h and one of the receive beams 508a-508c) for a physical random access channel (PRACH) procedure for initial access to the cell. For example, periodic SSB beam sweeping may be implemented on the base station 504 at certain intervals (e.g., based on the SSB periodicity). Thus, the base station 504 may be configured to sweep or transmit an SSB on each of a plurality of wider transmit beams 506a-506h. The UE may measure the reference signal received power (RSRP) of each of the SSB transmit beams on each of the receive beams of the UE and select the transmit and receive beams based on the measured RSRP. In an example, the selected receive beam may be the receive beam on which the highest RSRP is measured and the selected transmit beam may have the highest RSRP as measured on the selected receive beam.

After completing the PRACH procedure, the base station 504 and UE 502 may perform a P2 beam management procedure for beam refinement. For example, the base station 504 may be configured to sweep or transmit a CSI-RS on each of a plurality of narrower transmit beams 506a-506h. Each of the narrower CSI-RS beams may be a sub-beam of the selected SSB transmit beam (e.g., within the spatial direction of the SSB transmit beam). Transmission of the CSI-RS transmit beams may occur periodically (e.g., as configured via radio resource control (RRC) signaling by the gNB), semi-persistently (e.g., as configured via RRC signaling and activated/deactivated via medium access control-control element (MAC-CE) signaling by the gNB), or aperiodically (e.g., as triggered by the gNB via downlink control information (DCI)). The UE 502 is configured to scan the plurality of CSI-RS transmit beams 506a-506h on the plurality of receive beams 508a-508e. The UE 502 then performs beam measurements (e.g., RSRP, SINR, etc.) of the received CSI-RSs on each of the receive beams 508a-508e to determine the respective beam quality of each of the CSI-RS transmit beams 506a-506h as measured on each of the receive beams 508a-508e.

The UE 502 can then generate and transmit a Layer 1 (L1) measurement report, including the respective beam index (e.g., CSI-RS resource indicator (CRI)) and beam measurement (e.g., RSRP) of one or more of the CSI-RS transmit beams 506a-506h or one or more of the receive beams 508a-508e to the base station 504. The base station 504 may then select one or more CSI-RS transmit beams on which to transmit unicast downlink control information and/or user data traffic to the UE 502. In some examples, the selected CSI-RS transmit beam(s) have the highest RSRP from the L1 measurement report. Transmission of the L1 measurement report may occur periodically (e.g., as configured via RRC signaling by the gNB), semi-persistently (e.g., as configured via RRC signaling and activated/deactivated via MAC-CE signaling by the gNB), or aperiodically (e.g., as triggered by the gNB via DCI).

The UE 502 may further select a corresponding receive beam on the UE 502 for each selected serving CSI-RS transmit beam to form a respective downlink beam pair link (BPL) for each selected serving CSI-RS transmit beam. For example, the UE 502 can utilize the beam measurements obtained during the P2 procedure or perform a P3 beam management procedure to obtain new beam measurements for the selected CSI-RS transmit beams to select the corresponding receive beam for each selected transmit beam. In some examples, the selected receive beam to pair with a particular CSI-RS transmit beam may be the receive beam on which the highest RSRP for the particular CSI-RS transmit beam is measured.

In some examples, the base station 504 may configure the UE 502 to perform SSB beam measurements and provide an L1 measurement report containing beam measurements of SSB transmit beams 506a-506h. For example, the base station 504 may configure the UE 502 to perform SSB beam measurements and/or CSI-RS beam measurements for beam failure detection (BRD), beam failure recovery (BFR), cell reselection, beam tracking (e.g., for a mobile UE 502 and/or base station 504), or other beam optimization purpose.

In addition, when the channel is reciprocal, the transmit and receive beams may be selected using an uplink beam management scheme. In an example, the UE 502 may be configured to sweep or transmit on each of a plurality of receive beams 508a-508c. For example, the UE 502 may transmit an SRS on each beam in the different beam directions. In addition, the base station 504 may be configured to receive the uplink beam reference signals on a plurality of transmit beams 506a-506h. The base station 504 then performs beam measurements (e.g., RSRP, SINR, etc.) of the beam reference signals on each of the transmit beams 506a-506h to determine the respective beam quality of each of the receive beams 508a-508e as measured on each of the transmit beams 506a-506h.

The base station 504 may then select one or more transmit beams on which to transmit unicast downlink control information and/or user data traffic to the UE 502. In some examples, the selected transmit beam(s) have the highest RSRP. The UE 502 may then select a corresponding receive beam for each selected serving transmit beam to form a respective beam pair link (BPL) for each selected serving transmit beam, using, for example, a P3 beam management procedure, as described above.

In addition to L1 measurement reports, the UE 502 can further utilize the beam reference signals to estimate the channel quality of the channel between the base station 504 and the UE 502. For example, the UE 502 may measure the SINR of each received CSI-RS and generate a CSI report based on the measured SINR. The CSI report may include, for example, a channel quality indicator (CQI), rank indicator (RI), precoding matrix indicator (PMI), and/or layer indicator (LI). The scheduling entity may use the CSI report to select a rank for the scheduled entity, along with a precoding matrix and a MCS to use for future downlink transmissions to the scheduled entity. The MCS may be selected from one or more MCS tables, each associated with a particular type of coding (e.g., polar coding, LDPC, etc.) or modulation (e.g., binary phase shift keying (BPSK), quadrature phase shift keying (QPSK), 16 quadrature amplitude modulation (QAM), 64 QAM, 256 QAM, etc.). The L1 may be utilized to indicate which column of the precoding matrix of the reported PMI corresponds to the strongest layer codeword corresponding to the largest reported wideband CQI.

Figure 6:
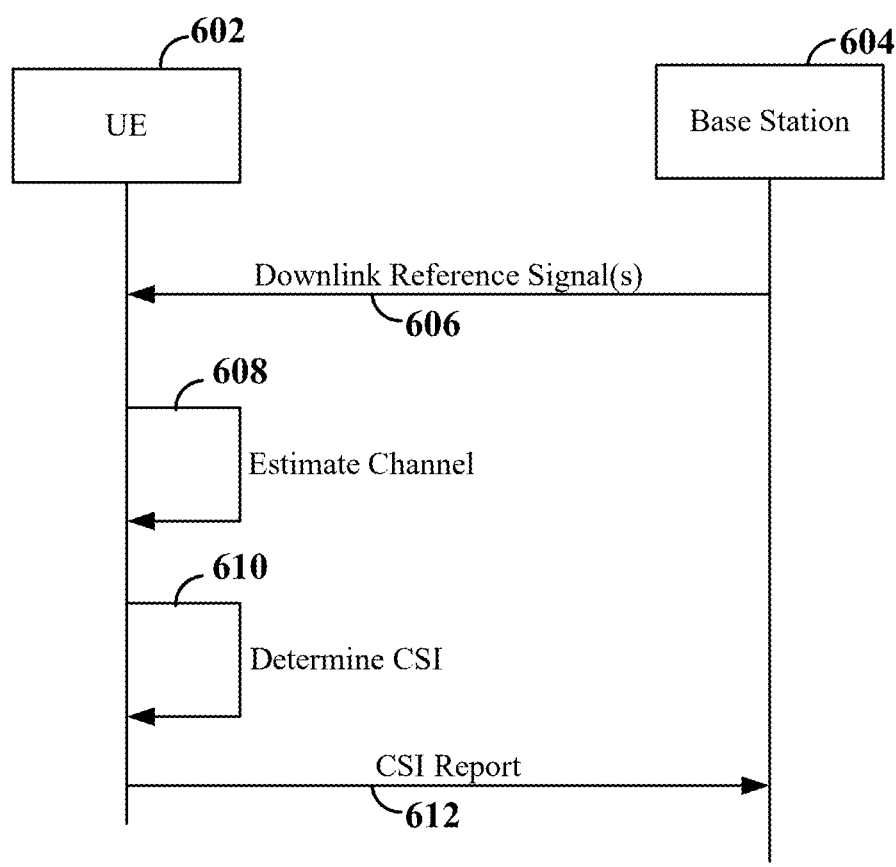
FIG. 6 is a signaling diagram illustrating an example of signaling between a UE and a base station for channel state information (CSI) reporting according to some aspects.

FIG. 6 is a signaling diagram illustrating exemplary signaling between a UE 602 and a base station 604 for channel state information reporting according to some aspects. The UE 602 may correspond, for example, to any of the UEs or other scheduled entities shown in FIGS. 1, 2, 4, and/or 5. The base station 604 may correspond, for example, to any of the base stations (e.g., gNB or eNB) or other scheduling entities as shown in FIGS. 1, 2, 4, and/or 5.

At 606, the base station 604 may transmit a downlink reference signal, such as a CSI-RS, to the UE 602. In some examples, the downlink reference signal may include a plurality of downlink reference signals. Each downlink reference signal may be transmitted via a respective CSI resource. CSI resources may include time-frequency resources, along with a beam direction (spatial direction), within which a particular downlink reference signal can be transmitted. In addition, each downlink reference signal may include a number of pilots allocated within the respective CSI resource. In some examples, the different spatial directions of the CSI resources may support MIMO (e.g., spatial multiplexing).

At 608, the UE 602 can estimate the downlink wireless channel from the downlink reference signal(s). For example, the UE 602 may measure the SINR of one or more of the downlink reference signals to obtain a downlink channel estimate of the downlink wireless channel.

At 610, for example, the UE 602 may determine the CSI. For example, the UE 602 may determine a RI, PMI, CQI, and L1 from the downlink channel estimate. The CQI may include an index (e.g., a CQI index) ranging, for example, from 0 to 16. The CQI index may indicate, for example, the highest MCS at which the Block Error Rate (BLER) of the channel does not exceed 10%. Once selected, the RI, PMI, LI, and CQI index can be fed back in a CSI report. For example, at 612, the UE 602 may transmit the CSI report, including the selected CQI, along with the RI, PMI, and SLI, to the base station 604.

The base station 604 and UE 602 may support different types of CSI reports (including L1 measurement reports) and/or different types of measurements. To distinguish between the different types of CSI reports and different types of measurements, the base station 604 may configure the UE 602 with one or more CSI report settings.

Figure 7:
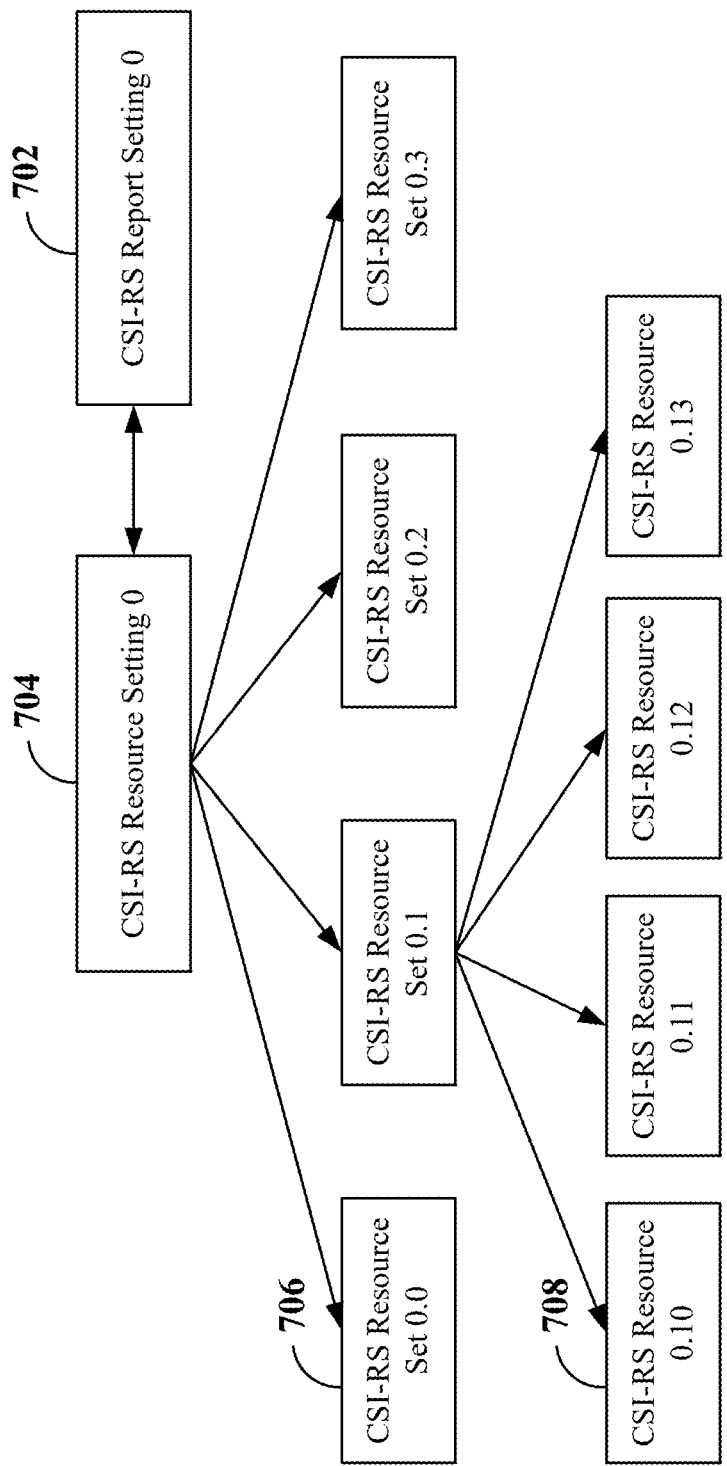
FIG. 7 is a diagram illustrating an example of channel state information (CSI) resource mapping according to some aspects.

FIG. 7 illustrates an exemplary CSI resource mapping to support different report/measurement configurations according to some aspects. The CSI resource mapping includes CSI report setting 702, CSI resource settings 704, CSI resource sets 706, and CSI resources 708. Each CSI resource setting 704 includes one or more CSI resource sets 706, and each CSI resource set 706 includes one or more CSI resources 708. In the example shown in FIG. 7, a single CSI resource setting (e.g., CSI resource setting 0) is illustrated. However, it should be understood that any suitable number of CSI resource settings 704 may be supported.

Each CSI report setting 702 may include a reportQuantity that indicates, for example, the specific CSI values and granularity thereof (e.g., wideband/sub-band CQI, PMI, RI, LI, etc.), or L1 parameters (e.g., L1-RSRP (a.k.a. RSRP), L1-SINR (a.k.a. SINR)) to include in a CSI report. The CSI report setting may further indicate a periodicity of the CSI report. For example, the CSI report setting may indicate that the report should be generated periodically, aperiodically, or semi-persistently. For aperiodic CSI report settings, the CSI report may be sent on the PUSCH and may or may not be multiplexed with uplink data. For periodic CSI report settings, the CSI report may be sent on the PUCCH (e.g., a short PUCCH or a long PUCCH). For semi-persistent CSI report settings, the CSI report may be sent on the PUCCH or the PUSCH. For example, semi-persistent CSI reports sent on the PUCCH may be activated or deactivated using a medium access control (MAC) control element (MAC-CE). Semi-persistent CSI reports sent on the PUSCH may be triggered using downlink control information (DCI) scrambled with a semi-persistent CSI (SP-CP) radio network temporary identifier (SP-CP-RNTI). The DCI triggering the semi-persistent CSI reporting may further allocate semi-persistent resources and an MCS for the CSI report. Semi-persistent CSI report settings may further support Type II codebooks and a minimum periodicity of 5 ms. In some examples, periodic and semi-persistent CSI report settings may support the following periodicities: {5, 10, 20, 40, 80, 160, and 320} slots. CSI report settings may further include a respective priority and other suitable parameters.

Each CSI report setting 702 may further be linked to a CSI resource setting 704 indicating the CSI resources 708 applicable to the CSI report setting 702. Each CSI resource setting 704 may be associated with a particular time domain behavior of reference signals. For example, each CSI resource setting 704 may include periodic, semi-persistent, or aperiodic CSI resources 708. For periodic and semi-persistent CSI resource settings 704, the number of configured CSI resource sets 706 may be limited to one. In general, the CSI resource settings 704 that may be linked to a particular CSI report setting 702 may be limited by the time domain behavior of the CSI resource setting 704 and the CSI report setting 702. For example, an aperiodic CSI report setting 702 may be linked to periodic, semi-persistent, or aperiodic CSI resource settings 704. However, a semi-persistent CSI report setting 702 may be linked to only periodic or semi-persistent CSI resource settings 704. In addition, a periodic CSI report setting 702 may be linked to only a periodic CSI resource setting 704.

Each CSI resource set 706 may be associated with a CSI resource type. For example, CSI resource types may include non-zero-power (NZP) CSI-RS resources, SSB resources, or channel state information interference measurement (CSI-IM) resources. Thus, each CSI resource set 706 includes a list of CSI resources 708 of a particular CSI resource type. In addition, each CSI resource set 706 may further be associated with one or more of a set of frequency resources (e.g., a bandwidth and/or OFDM symbol(s) within a slot), a particular set of ports, a power, or other suitable parameters.

Each CSI resource 708 indicates the particular beam (e.g., one or more ports), frequency resource, and OFDM symbol on which the reference signal may be measured by the wireless communication device. For example, each CSI-RS of the CSI resources 708 may indicate an RE on which a CSI-RS pilot or SSB transmitted from a particular set of ports (e.g., on a particular beam) may be measured. In the example shown in FIG. 7, CSI-RS resource set 0.1 includes four CSI-RS resources (CSI-RS resource 0.10, CSI-RS resource 0.11, CSI-RS resource 0.12, and CSI-RS resource 0.13). Each CSI resource 708 may further be indexed by a respective beam identifier (ID). The beam ID may identify not only the particular beam (e.g., ports), but also the resources on which the reference signal may be measured. For example, the beam ID may include a CSI-RS resource indicator (CRI) or a SSB resource indicator (SSBRI).

The base station may configure the UE with one or more CSI report settings 702 and CSI resource settings 704 via, for example, radio resource control (RRC) signaling. For example, the base station may configure the UE with a list of periodic CSI report settings indicating an associated CSI resource set that the UE may utilize to generate periodic CSI reports. As another example, the base station may configure the UE with a list of aperiodic CSI report settings in a CSI-AperiodicTriggerStateList. Each trigger state in the CSI-AperiodicTriggerStateList may include a list of aperiodic CSI report settings indicating the associated CSI resource sets for channel (and optionally interference) measurement. As another example, the base station may configure the UE with a list of semi-persistent CSI report settings in a CSI-SemiPersistentOnPUSCH-TriggerStateList. Each trigger state in the CSI-SemiPersistentOnPUSCH-TriggerStateList may include one CSI report setting indicating the associated CSI resource set. The base station may then trigger one or more of the aperiodic or semi-persistent trigger states using, for example, DCI. As indicated above, a MAC-CE may be used to activate or deactivate a semi-persistent CSI report setting for a CSI report sent on the PUCCH.

Figure 8A:
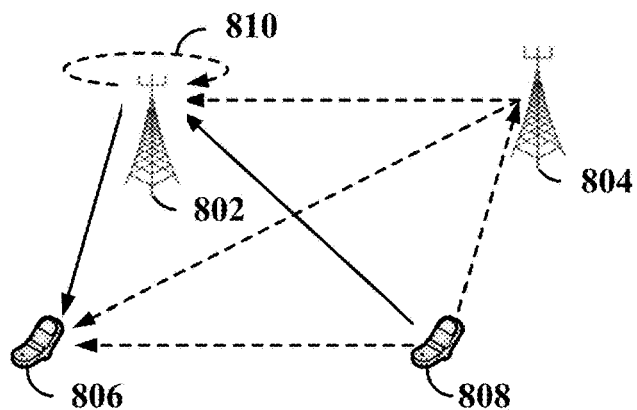
FIGS. 8A, 8B, and 8C are schematic illustrations of a wireless communication network and sources of interference for a full-duplex base station, a half-duplex user equipment, a first full-duplex user equipment, and a second full-duplex user equipment according to some aspects.
Figure 8B:
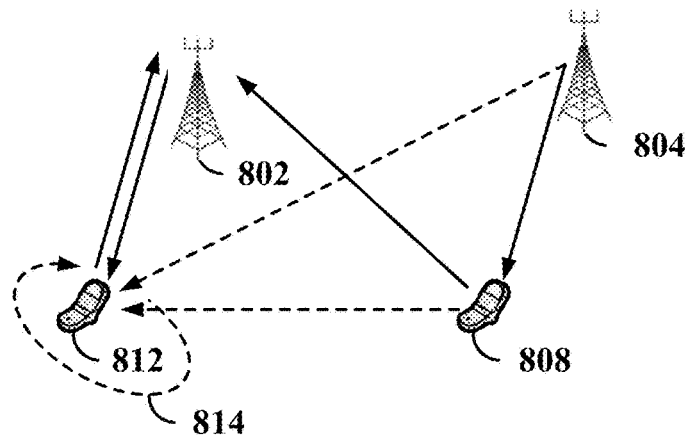
Figure 8C:
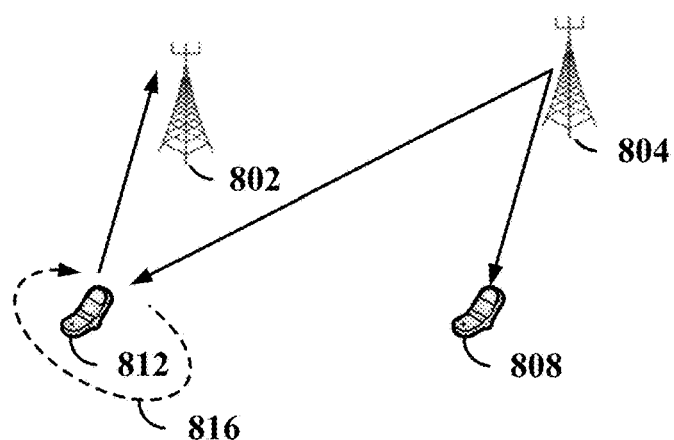

FIGS. 8A, 8B, and 8C are schematic illustrations of a wireless communication network and sources of interference for a full-duplex gNB 802, a first half-duplex UE 806, a first full-duplex UE 812, and a second half-duplex UE 808 according to some aspects. The full-duplex gNB 802 may be any of the base stations (e.g., gNBs) or scheduling entities illustrated in FIGS. 1, 2, 4, and/or 6, and the first half-duplex UE 806, the first full-duplex UE 812, and the second half-duplex UE 808 may be any of the UEs or scheduled entities illustrated in FIGS. 1, 2, 4, and/or 6. As mentioned above, a UE and a base station (e.g., gNB) may use full-duplex communication.

In FIG. 8A, the full-duplex gNB 802 is transmitting to the first half-duplex UE 806. During the time of the transmission from the full-duplex gNB 802 to the first half-duplex UE 806, the full-duplex gNB 802 is receiving, at its receiver (not shown), self-interference 810 from its own transmission to the first half-duplex UE 806 as well as interference (also referred to herein as cross-link interference (CLI)) from a neighboring gNB 804 and an uplink transmission from the second half-duplex UE 808. The first half-duplex UE 806 is also receiving interference from the second half-duplex UE 808 and the neighboring gNB 804. Because it is a half-duplex UE, the first half-duplex UE 806 is not transmitting during the time of the transmission from the full-duplex gNB 802 to the first half-duplex UE 806, and therefore, the first half-duplex UE 806 receives no self-interference. It is noted that the second half-duplex UE 808 may be in the same cell (e.g., if the neighboring gNB 804 was removed from the figure) or a different cell, as inferred from FIG. 8A. The full-duplex gNB 802 and neighboring gNB 804 may each correspond to any of the base stations or scheduling entities shown in FIGS. 1, 2, 4, and/or 6.

In FIG. 8B, the full-duplex gNB 802 is transmitting a downlink transmission to the first full-duplex UE 812. During the time of the transmission of the downlink transmission from the full-duplex gNB 802 to the first full-duplex UE 812, the full-duplex gNB 802 is receiving, at its receiver (not shown), a simultaneous uplink transmission from the first full-duplex UE 812. At the same time as the just mentioned simultaneous downlink and uplink transmissions, the first full-duplex UE 812 is receiving, at its receiver (not shown), self-interference 814 from its own transmission to the full-duplex gNB 802 as well as interference from the neighboring gNB 804 and interference from the second half-duplex UE 808 (i.e., cross-link interference).

In FIG. 8C, the full-duplex gNB 802 is receiving an uplink transmission from the first full-duplex UE 812. During the time of the transmission of the uplink transmission to the full-duplex gNB 802, the first full-duplex UE 812 is also receiving a transmission from the neighboring gNB 804. In addition to the signal received from the neighboring gNB 804, the first full-duplex UE 812 is also receiving, at its receiver (not shown), self-interference 816 from its own transmission to the full-duplex gNB 802. The illustration of FIG. 8C may also be considered, for example, as an illustration depicting two transmission and reception points (TRPs) and two UEs. For example, the first the full-duplex gNB 802 could be replaced with a first TRP and the neighboring gNB 804 could be replaced by a second TRP. The first TRP may be configured to only receive uplink signals and the second TRP may be configured to only transmit downlink signals. The first TRP and the second TRP may be co-located or spaced apart.

For the first half-duplex UE 806 of FIG. 8A, interference may be mitigated if the interference from the neighboring gNB 804 and the second half-duplex UE 808 are at frequencies other than those occupied by the downlink transmission from the full-duplex gNB 802 to the first half-duplex UE 806. Similarly, for the first full-duplex UE 812 of FIGS. 8B and 8C, interference may be mitigated if the self-interference 816 from the first full-duplex UE 812, interference from the neighboring gNB 804, and/or interference from the second half-duplex UE 808 are at frequencies other than those occupied by the downlink transmission from the full-duplex gNB 802 to the first half-duplex UE 806.

Various examples of TDD FD operation are illustrated in FIGS. 9A and 9B. FIG. 9A is a diagram illustrating two examples of in-band full-duplex (IBFD) mode 900 according to some aspects of the disclosure. In the examples shown in FIG. 9A, time is illustrated along the horizontal axis while frequency is illustrated along the vertical axis. A first example 902 of IBFD is depicted on the left while a second example 904 is depicted on the right. In the first example 902, the UL time-frequency resources 906 completely overlap with a portion of the DL time-frequency resources 908. In the second example 904, the UL time-frequency resources 910 partially overlap with a portion of the DL time-frequency resources 912. Accordingly, a device, for example a base station and/or a scheduled entity, employing IBFD may transmit and receive on the same time and frequency resources. That is, the device may transmit and receive at the same time(s) at the same frequency (or frequencies). The UL and DL share the same time and frequency resources. The overlap in time-frequency resources may be complete, as in the first example 902, or partial, as in the second example 904.

FIG. 9B is a diagram illustrating an example of sub-band FDD 914 (also known as flexible duplex) according to some aspects of the disclosure. In the example shown in FIG. 9B, time is illustrated along the horizontal axis while frequency is illustrated along the vertical axis. In sub-band FDD 914, a device may transmit and receive at the same time but on different frequency resources in unpaired spectrum (e.g., within the same carrier bandwidth). The UL resources 916 are separated from the DL resources 918 by a guard band 920.

Figure 10A:
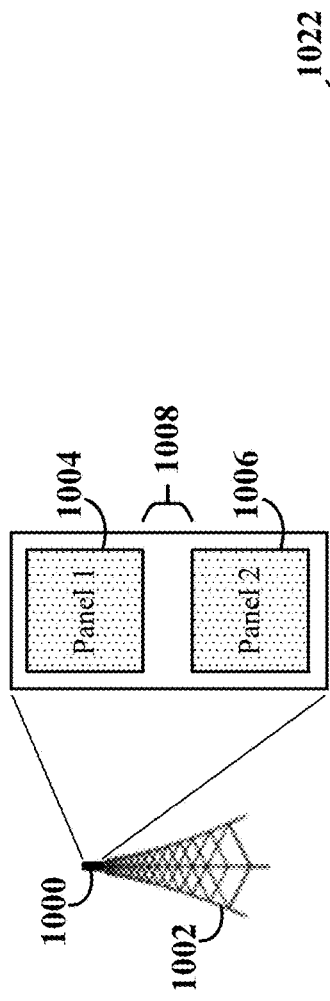
FIG. 10A is a schematic diagram depicting an antenna array including a plurality of panes of a transmission and reception point according to some aspects.

FIG. 10A is a schematic diagram depicting an antenna array 1000 of a TRP 1002 according to some aspects of the disclosure. The antenna array 1000 may be a feature of a TRP according to some examples. The antenna array 1000 is divided into two panels (panel 1 1004, panel 2 1006) with a physical separation 1008 therebetween. Each of the two panels may be a subarray of antennas. A given panel may transmit and/or receive a beam or a beam group. The TRP 1002 may be a base station. The discussion that follows also may be applicable to an antenna array in another type of device, such as UE. If implemented in a UE, the panels of the antenna array would be located at separate locations on the UE (e.g., a front panel, a back panel, etc.).

Figure 10B:
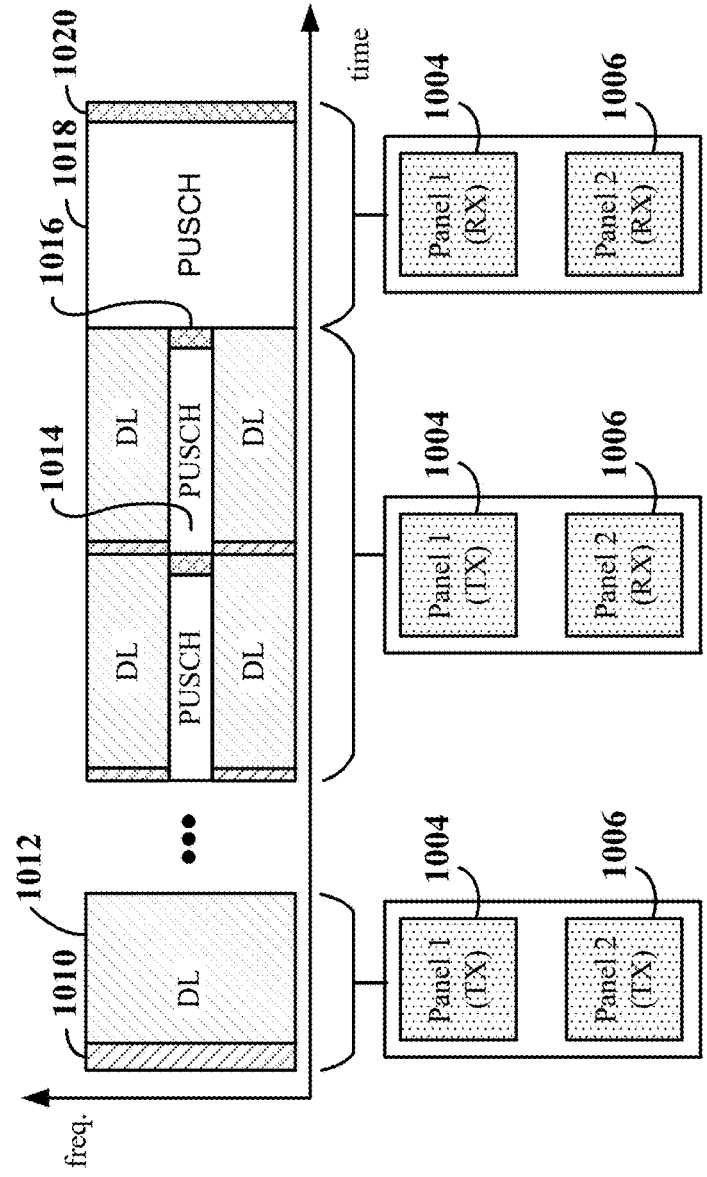
FIG. 10B is a diagram depicting the transmission or reception configuration of two panels of FIG. 10A according to some aspects.

FIG. 10B is a diagram depicting the transmission or reception configuration of the two panels (panel 1 1004, panel 2 1006) of FIG. 10A. The transmission (T) and reception (R) configurations of the two panels are depicted for various DL and UL channels as may be implemented in a device (e.g., a scheduling entity or a scheduled entity). Exemplary signaling 1022 is depicted above the transmission or reception configurations of the two panels. In the example, time is illustrated along the horizontal axis while frequency is illustrated along the vertical axis.

At the left of FIG. 10B, when the antenna array 1000 is communicating in only a single direction at a time, both panel 1 1004 and panel 2 1006 may be configured for the single-direction communication. For example, both panel 1 1004 and panel 2 1006 may be configured to transmit DL control 1010 and DL data 1012. At the center of FIG. 10B, when the antenna array 1000 is simultaneously transmitting a combination of DL control and DL data (similar to DL control 1010 and DL data 1012) and receiving UL data (e.g., PUSCH 1014) and UL control 1016, panel 1 1004 may be configured for DL transmission and panel 2 1006 may be configured for UL reception. This configuration allows for full-duplex operation. According to one aspect, the full-duplex operation depicted at the center of FIG. 10B may be referred to as "sub-band full-duplex" (SBFD) in unpaired spectrum, in which transmissions in different directions are carried in different sub-bands or BWPs of the same carrier bandwidth At the right of FIG. 10B, when the antenna array 1000 is only receiving UL data (e.g., PUSCH 1018) and UL control 1020, both panel 1 1004 and panel 2 1006 may be configured for UL reception. The antenna array 1000 may thus be configured for TDD or full-duplex operation (e.g., flexible TDD). The physical separation 1008 between panel 1 1004 and panel 2 1006 may provide improved isolation between the panels (e.g., greater than about 50 dB of improved isolation) when compared to two panels without the physical separation 1008. By way of example, flexible TDD may describe the use of two panels to operate in either: a TDD mode (with both panels on the gNB and one or more panels on the UE configured for either DL or UL), or a sub-band full-duplex (SBFD) mode (with one panel on each of the gNB and UE configured for UL and another panel on each of the gNB and UE configured for DL). Accordingly, SBFD provides for simultaneous uplink and downlink communication. In-band full-duplex (IBFD) also provides for simultaneous uplink and downlink communication. In IBFD uplink time-frequency resources may completely or partially overlap with downlink time-frequency resources. Flexible TDD, SBFD, and IBFD are some examples of full-duplex multiplexing, which provide for simultaneous transmission and reception.

Figure 11:
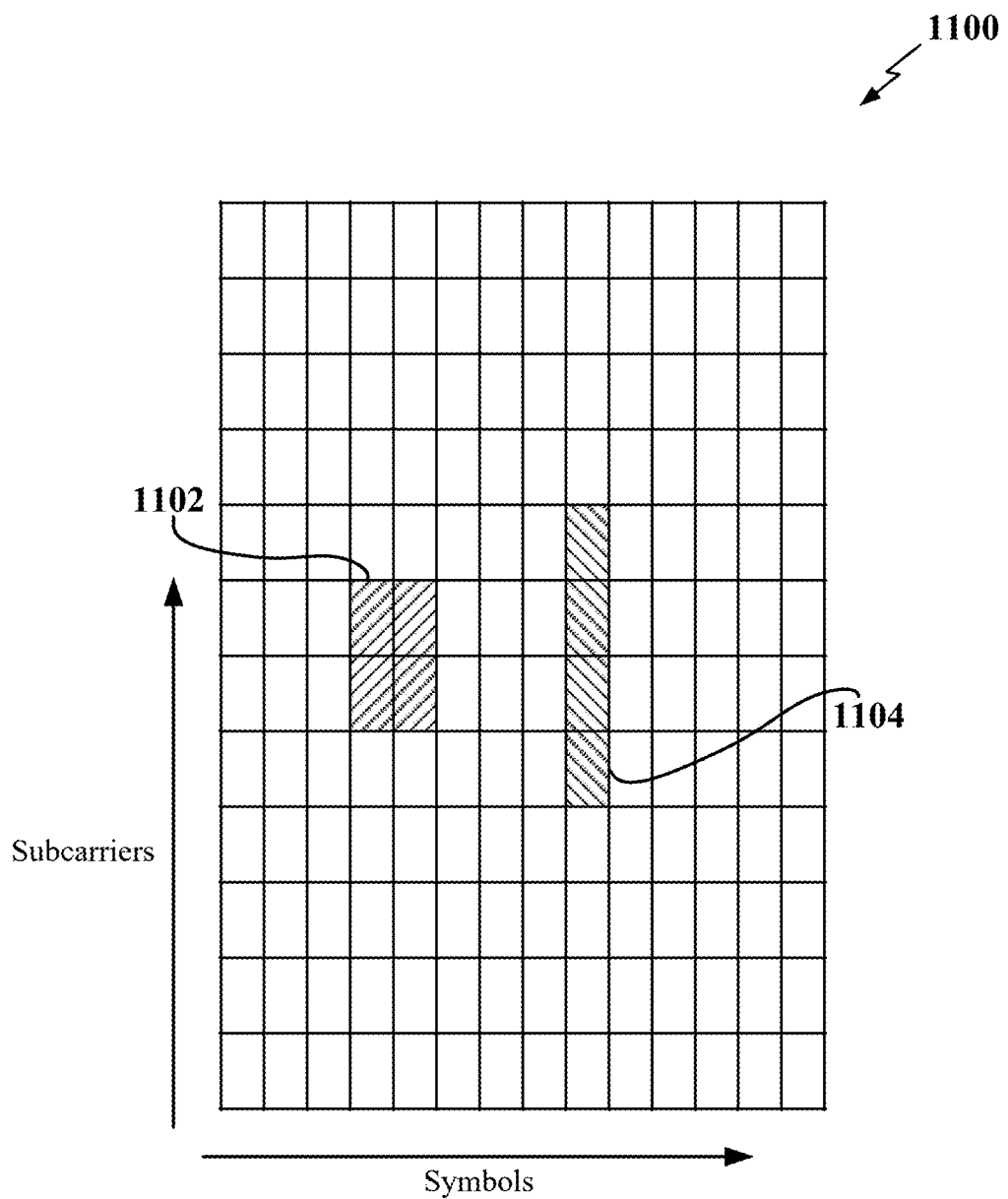
FIG. 11 is a portion of an orthogonal frequency division multiplexing resource grid depicting two patterns of resource elements that may be utilized for channel state information-interference measurement according to some aspects.

FIG. 11 is a portion of a OFDM resource grid 1100 depicting two patterns of resource elements (REs) that may be utilized for channel state information (CSI)-interference measurement (CSI-IM) according to some aspects. A base station may configure a UE to measure interference power in CSI-IM resources. The base station may not transmit in the CSI-IM resources; therefore, any power measured within the CSI-IM resource is power transmitted by interfering base stations and/or UEs. A first pattern of first CSI-IM resources 1102 may include two contiguous REs in two contiguous OFDM symbols. A second pattern of second CSI-IM resources 1104 may include four contiguous REs in one OFDM symbol. Other patterns of REs configured as CSI-IM resources are within the scope of the disclosure. According to some aspects, a size of a given CSI-IM resource in the frequency domain may be configured by defining a starting resource block (RB) and a quantified number of resource blocks. A CSI-report configuration may include a CSI-IM resource set for interference measurement. The configured resources may be used by a UE to measure interference.

Components of CSI, also referred to as CSI-related quantities, may include, for example, channel quality indicator (CQI), precoding matrix indicator (PMI), CSI-RS resource indicator (CRI), a synchronization signal block (SSB) resource indicator (SSBRI), layer indicator (LI), rank indicator (RI), reference signal received power (RSRP), and/or signal to interference plus noise ratio (SINR). In one non-limiting example related to the RSRP CSI-related quantity, CSI-IM may be configured to overlap with a sounding reference signal (SRS) transmitted by an interfering entity (e.g., an aggressor); therefore, the interfered with entity (e.g., a victim) may measure the RSRP of an interfering reference signal-such as that of the SRS transmitted by the interfering entity.

Figure 12:
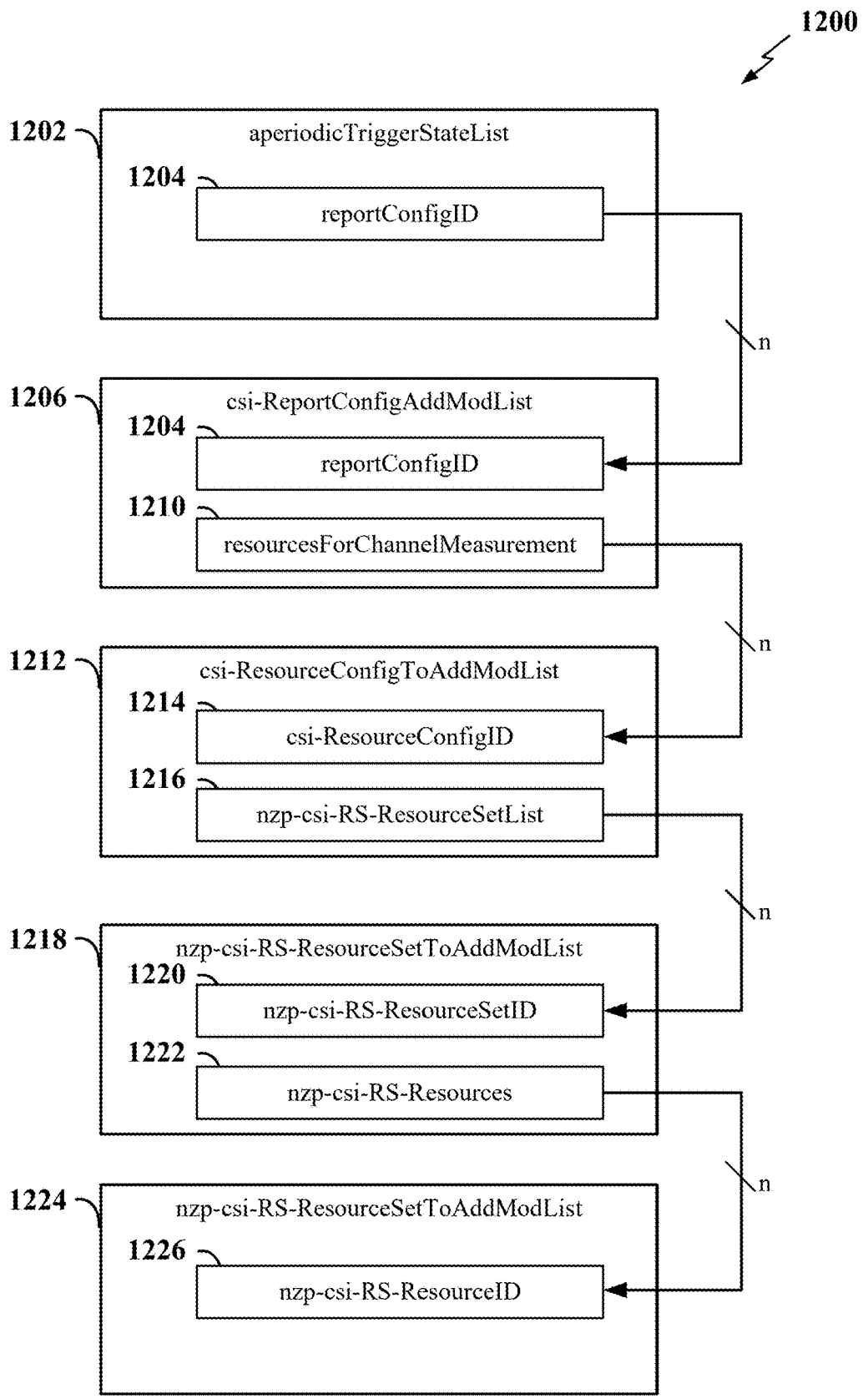
FIG. 12 is an example of a channel state information (CSI) report framework according to some aspects.

FIG. 12 is an example of a CSI report framework 1200 according to some aspects. The CSI report framework 1200 may include a configuration aspect and triggering states that may be associated with specific configurations. A non-zero power (nzp)-csi-RS-Resource may define the physical location (i.e., the location of physical resource element(s)) of the nzp-csi-related-reference signal (e.g., CSI-RS or SSB). Here, nzp refers to a transmitted power. There may be three types of resources in this category: nzp-csi-RS-Resource, zero power (zp)-csi-RS-Resource, and IM-Resource. A radio resource control (RRC) message information element (IE) for these resources may include, for PDSCH-Config: zp-csi-RS-ResourceToAddModList, which may identify zp-csi-RS-Resource, which may identify a csi-RS-ResourceMapping. For csi-MeasConfig: nzp-csi-RS-ResourceToAddModList may identify a nzp-csi-RS-Resource, which may identify a csi-RS-ResourceMapping. A csi-IM-ResourceToAddModList, may identify a csi-IM-Resource.

In FIG. 12, resources, such as the nzp-csi-RS-Resource may be grouped into ResourceSets. The ResourceSet may be configured in the following RRC: nzp-csi-RS-ResourceSetToAddModList may identify an nzp-csi-RS-ResourceSet, which may identify nzp-csi-RS-Resources. csi-SSB-ResourceSetToAddModList may identify csi-SSB-ResourceSet, which may identify an SSB-Index.

In FIG. 12, csi-ResourceConfig may indicate a type of reference signal (e.g., nzp-csi-RS-SSB, csi-IM-Resource) to be transmitted. It may be used to configure the types of the transmission (periodic, aperiodic, semipersistent). In other words, the parameters, such as nzp-csi-RS-Resource and ResourceSet may define the structure of the CSI resources; however, they may not be used to trigger the transmission of the resources. Instead, the parameter csi-ResourceConfig may trigger the transmission of the resources.

In FIG. 12, csi-ReportConfig may indicate which csi-ResourceConfig may be used for a given measurement. A csi-ResourceConfig may have a mapping table between the measurement type and the corresponding csi-ResourceConfig 1D.

In the example of FIG. 12, the ID of each higher layer data table (e.g., a Primary Key) appears in the block representing each Primary Key. For example, the highest Primary Key table in FIG. 12 is identified as an aperiodic TriggerStateList 1202. The ID of another data table (e.g., a Foreign Key) included within the Primary Key appears in the block representing the respective Foreign Key. For example, the Foreign Key in the aperiodicTriggerStateList 1202 is identified as reportConfigID 1204. The terminology "\n" along with its respective arrow indicates that one or more (e.g., n, where n is an integer) Foreign Keys, identified at the head of a given arrow, are contained within the Primary Key, identified at the tail of the arrow.

An aperiodic trigger state list (aperiodicTriggerStateList 1202) is depicted in FIG. 12. According to some aspects, an aperiodic (AP) CSI report may be triggered by a DCI and transmitted on a PUSCH. According to other aspects, a semi-persistent (SP) CSI report may be triggered by a DCI and transmitted on a PUSCH or may be activated by a MAC-CE and transmitted on a PUCCH. According to other aspects, a periodic (P) CSI report may be transmitted on a PUCCH (the P CSI report need not be triggered as it is preconfigured to transmit periodically).

In more detail, the aperiodicTriggerStateList 1202 may include the reportConfigIDs 1204. The reportConfigIDs 1204 may include the reportConfigIDs 1204, which may be included in a csi-ReportConfigAddMod list 1206. The csi-ReportConfigAddMod list 1206 may include the reportConfigIDs 1204 and a resourcesForChannelMeasurement 1210.

The resourcesForChannelMeasurement 1210 may include a csiResourceConfigIDs 1214, which may be included in a csi-RespourceConfig ToAddModList 1212. The csi-RespourceConfigToAddModList 1212 may include the csiResourceConfigIDs 1214 and a non-return-to-zero (nzp)-csi-RS-ResourceSetList 1216. The resources of the nzp-csi-RS-ResourceSetList 1216 may be resources in which a reference signal is transmitted (i.e., a transmission of a non-zero power). This stands in contrast to the first CSI-IM resources 1102 and the second CSI-IM resources 1104 of FIG. 11, which may be resources in which a base station associated with a given UE does not transmit power.

The nzp-csi-RS-ResourceSetList 1216 may include a nzp-csi-RS-Resources 1222, which may be included in a nzp-csi-RS-resourceSetToAddModList 1218. The nzp-csi-RS-resourceSetToAddModList 1218 may include a nzp-csi-RS-ResourceSetID 1220 and the nzp-csi-RS-Resources 1222.

The nzp-csi-RS-Resources 1222 may include a nzp-csi-RS-ResourceID 1226, which may be included in a nzp-csi-RS-ResourceSetToAdddModList 1224. The nzp-csi-RS-ResourceSetToAdddModList 1224 may include the nzp-csi-RS-ResourceID 1226.

In some examples, CSI (as well as, for example, ACK/NACK, scheduling request (SR), etc.) may be transmitted on uplink control information (UCI). UCI (and therefore CSI) may be sent on PUCCH or PUSCH. A CSI report may be sent as one part or as two parts in the PUCCH and/or the PUSCH. Determining whether to send the CSI report in one part or two parts, may depend on a reporting quantity and type (e.g., wideband vs. subband reporting type). If sent as one part, the CSI report may be identified as a CSI report #n herein, where n is an integer, and may stand for the CSI report number. If sent in two parts, the parts of the CSI report may be referred to as CSI report #n CSI Part1 (or CSI Part1) and CSI report #n CSI Part2 (or CSI Part2) herein. The payload size of the CSI Part1 may be fixed. The CSI Part1 may use zero padding. The payload size of the CSI Part2 may be derived from information in the CSI Part1.

FIGS. 13A and 13B are a first table 1300 and a second table 1301 illustrating examples of various CSI fields 1302, 1303 that may be included in a CSI report #n, CSI Part1 1304 and the CSI report #n, CSI Part2 1305, respectively, according to some aspects. In the examples of FIGS. 13A and 13B, the CSI Part1 1304 and the CSI Part2 1305 may be transmitted on a PUSCH. The collective values attributed to each of the CSI fields 1302 of the first table 1300 (the CSI Part1 1304) may be referred to as the CSI Part1 payload. The collective values attributed to each of the fields of the second table 1301 (the CSI Part2 1305) may be referred to as the CSI Part2 payload.

The first table 1300 provides a mapping order of the CSI fields 1302 of the CSI Part1 1304 according to some aspects. The second table 1301 provides a mapping order of the CSI fields 1303 of the CSI Part2 1305 according to some aspects.

Various parameters may be included in the CSI fields 1302 of the first table 1300 of FIG. 13A. For example, a first field 1306 may include a CSI resource indicator (CRI) or a SSB resource indicator (SSBRI), if reported. A second field 1308 may include a rank indicator (RI), if reported. A third field 1310 may include a wideband channel quality information (CQI) for the first transport block (TB), if reported. A fourth field 1312 may include a subband differential CQI for the first TB with increasing order of subband number, if reported. A fifth field 1314 may include an indicator of the number of non-zero wideband amplitude coefficients, $M_0$ for layer 0, if reported. A sixth field 1316 may include an indicator of the number of non-zero wideband amplitude coefficients, $M_1$, For layer 1, 2-layer precoding matrix indicator (PMI) reporting is allowed according to a given rank restriction that may be specified according to a given standard. A seventh field 1318 may include an RSRP, if reported. An eighth field 1320 may include a differential RSRP, if reported. It is noted that subbands for a given CSI report #n indicated by a higher layer parameter such as, for example, csi-ReportingBand, may be numbered consecutively in an increasing order with a lowest subband of csi-ReportingBand being identified as subband 0.

Various parameters may be included in the fields of the second table 1301 of FIG. 13B. For example, a first field 1322 may include a wideband CQI for the second TB, if present and reported. A second field 1324 may include a layer indicator (LI), if reported. A third field 1326 may include PMI wideband information fields $X_1$, from left to right, if reported. A fourth field 1328 may include PMI wideband information fields $X_2$, from left to right, or a codebook index for two antenna ports, if pmi-FormatIndicator=widebandPMI and if reported.

Figure 14:
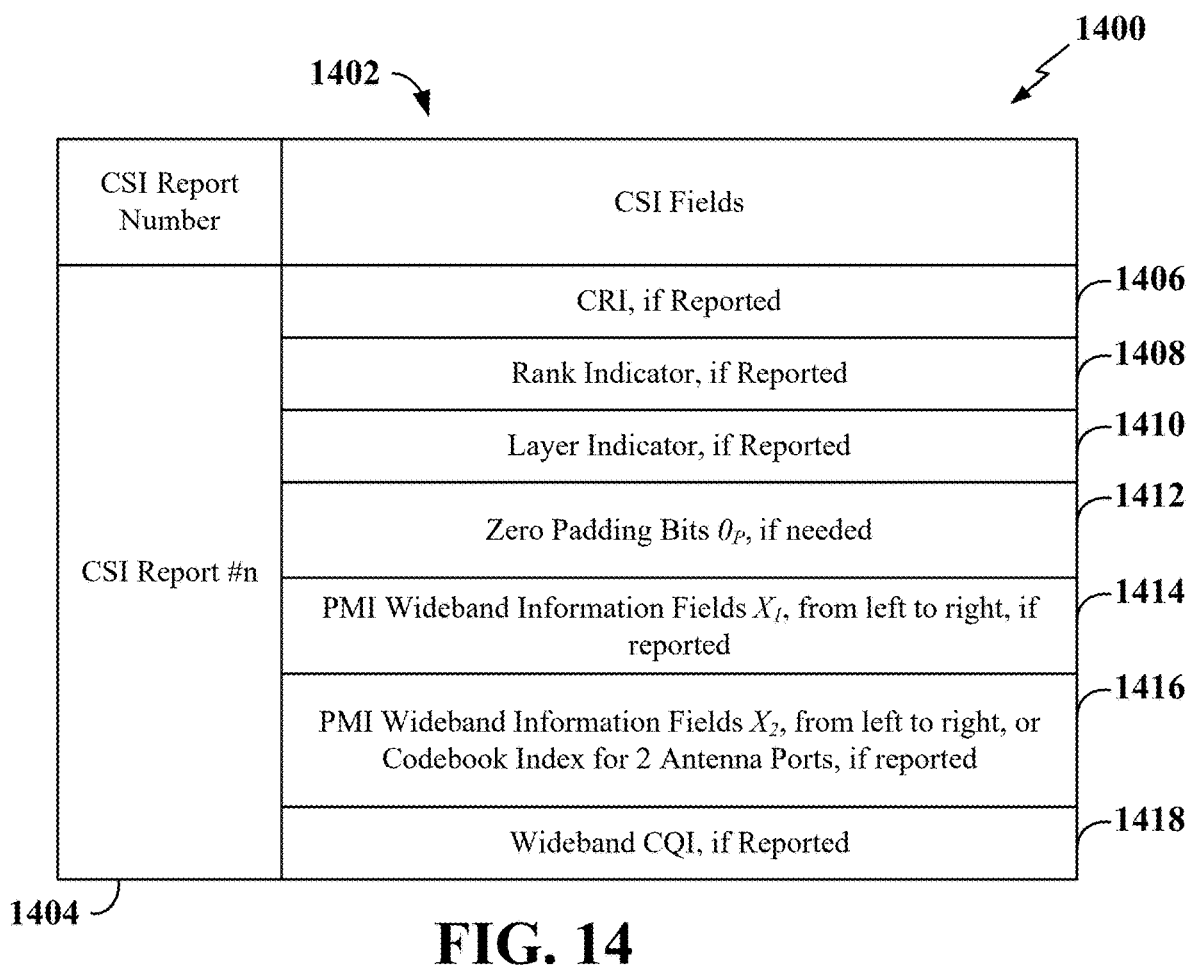
FIG. 14 is a table identifying examples of various CSI fields that may be included in a CSI report configured as a one-part CSI report, according to some aspects.

FIG. 14 is a table 1400 identifying examples of various CSI fields 1402 that may be included in a CSI report configured as a one-part CSI report, according to some aspects. FIG. 14 may be an example of a CSI report transmitted on a PUCCH. The table 1400 of FIG. 14 provides a mapping order of the CSI fields 1402 of a CSI report #n 1404, where n is an integer, according to some aspects. For example, in the CSI report #n 1404 of FIG. 14, a first field 1406 may include channel state information (CSI)-reference symbol (RS) resource indicator (CRI), if present and reported. A second field 1408 may include a rank indicator (RI), if reported. A third field 1410 may include a layer indicator (LI), if reported. A fourth field 1412 may include zero padding bits Or, if needed. A fifth field 1414 may include PMI wideband information fields $X_1$, from left to right, if reported. A sixth field 1416 may include PMI wideband information fields $X_2$, from left to right, or a codebook index for two antenna ports, if reported. A seventh field 1418 may include wideband CQI, if reported.

The tables of FIGS. 13A, 13B, and 14 provide the mapping order of the data in CSI reports. The tables of FIGS. 13A, 13B, and 13C define the number of bits (i.e., bitwidth) allocated or allocatable to the various CSI fields 1302, 1303, and 1402 of FIGS. 13A, 13B, and 14 according to some aspects. In general, the bitwidth of each CSI field in a CSI payload may depend on various configuration parameters, such as, but not limited to, the number of ports, the codebook type, etc. The antenna ports referred to in FIGS. 13B and 14, for example, may refer to the antenna ports at the gNB side. For example, the antenna ports may logically map to physical antenna elements of one or more antenna panels of a TRP. Thus, antenna ports (e.g., at the gNB side) may be considered as logical ports herein.

According to some examples, bitwidths may be defined for certain parameters, such as, for example, rank indicator (RI), a layer indicator (LI), wideband and subband channel quality indicators (CQIs), CRI, and PMI (e.g., wideband PMI and subband PMI). Bitwidths may be based on entries in codebooks of various types, such as, for example codebook types typeI-SinglePanel, typeII, or typeII-PortSelection. Bitwidths may be based on codebook modes, such as codebookMode 1 and codebookMode 2, where the various codebooks may specify bitwidths based on the codebook mode and, for example, the rank and the number of CSI-RS ports utilized. The preceding lists are exemplary and non-limiting. Other codebooks, codebook modes, codebook types and/or or codebook-like collections that provide bitwidth values are within the scope of the disclosure.

Table 1 below depicts an exemplary mapping order, for transmission on a PUCCH, of CSI reports to a UCI bit sequence, where the CSI reports are not two-part reports.

TABLE 1

Mapping order for transmission on a PUCCH of CSI reports to UCI bit sequence, for CSI reports that are not two-part reports

| UCI Bit Sequence | CSI Report Number |
|---|---|
| $a_0$ | CSI report #1 |
| $a_1$ | CSI report #2 |
| $a_2$ | . . . |
| $a_3$ | CSI report #n |
| . | |
| . | |
| . | |
| $a_{A-1}$ | |

As depicted in Table 1, the UCI bit sequence may be given as $a_0, a_1, a_2, a_3, \ldots, a_{A-1}$. The table illustrates the mapping of the CSI reports from CSI report #1 to CSI report #n, where n is an integer. Each CSI report may include a plurality of bits. According to the table, a first plurality of bits attributed to CSI report #1 is mapped to UCI bit sequence $a_0$; a second plurality of bits attributed to CSI report #2 is mapped to UCI bit sequence $a_1$; a third plurality of bits attributed to CSI report #n is mapped to UCI bit sequence $a_{A-1}$.

Table 2 and Table 3 depict exemplary mapping orders, for transmission on a PUCCH, of CSI reports to UCI bit sequences, where at least one of the CSI reports for transmission on the PUCCH is a two-part report.

TABLE 2

Mapping order for transmission on a PUCCH of CSI reports to a first UCI bit sequence, for CSI reports that are either not two-part report or are two-part reports

| First UCI Bit Sequence | CSI Report Number |
|---|---|
| $a_0^{(1)}$ | CSI report #1 if CSI report #1 is not of two parts, or |
| $a_1^{(1)}$ | CSI report #1-CSI Part1, if CSI report #1 is of two parts |
| $a_2^{(1)}$ | CSI report #2 if CSI report #2 is not of two parts, or |
| $a_3^{(1)}$ | CSI report #2-CSI Part1, if CSI report #2 is of two parts |
| . | ... |
| . | CSI report #n if CSI report #n is not of two parts, or |
| . | CSI report #n-CSI Part1, if CSI report #n is of two parts |
| $a_{A^{(1)}-1}^{(1)}$ | |

Table 2 illustrates the mapping of a first part (e.g., CSI Part1), or an entire CSI report (if the CSI report is not of two-part from), of a plurality of CSI reports to a first UCI bit sequence, according to CSI report numbers. As shown, the first UCI bit sequence may be given as $a_0^{(1)}$, $a_1^{(1)}$, $a_2^{(1)}$, $a_3^{(1)}$, . . . , $a_{A^{(1)}-1}^{(1)}$ Each respective row of Table 2 corresponds to either a CSI report that is not in two-part form, in which case the content of the entire CSI report is present in the respective row, or a CSI report that is in two-part form, in which case the content of the first part (CSI Part1) of the CSI report is present in the respective row.

For example, the first row of CSI report numbers in Table 2 corresponds to CSI report #1 if CSI report #1 is not of two parts, or CSI report #1-CSI Part1, if CSI report #1 is of two parts. The second row of CSI report numbers in Table 2 corresponds to CSI report #2 if CSI report #2 is not of two parts, or CSI report #2-CSI Part1, if CSI report #2 is of two parts. The $n^{th}$ row of CSI report numbers in Table 2 corresponds to CSI report #n if CSI report #n is not of two parts, or CSI report #n-CSI Part1, if CSI report #n is of two parts (where n is an integer). The first row of CSI report number is associated with $a_0^{(1)}$ of the first UCI bit sequence; the second row is associated with $a_1^{(1)}$ of the first UCI bit sequence, and so on.

TABLE 3

Mapping order for transmission on a PUCCH of CSI Part2 reports to a second UCI bit sequence, if a CSI Part2 report exists for a given CSI report

| Second UCI Bit Sequence | CSI Report Number |
|---|---|
| $a_0^{(2)}$ | CSI report #1-CSI Part2 wideband, |
| $a_1^{(2)}$ | if CSI Part2 exists for CSI report #1 |
| $a_2^{(2)}$ | CSI report #2-CSI Part2 wideband, |
| $a_3^{(2)}$ | if CSI Part2 exists for CSI report #2 |
| . | ... |
| . | CSI report #n-CSI Part2 wideband, |
| . | if CSI Part2 exists for CSI report #n |
| $a_{A^{(2)}-1}^{(2)}$ | CSI report #1-CSI Part2 subband, |
| | if CSI Part2 exists for CSI report #1 |
| | CSI report #2-CSI Part2 subband, |
| | if CSI Part2 exists for CSI report #2 |
| | ... |
| | CSI report #n-CSI Part2 subband, |
| | if CSI Part2 exists for CSI report #n |

Table 3 illustrates the mapping of a second part (e.g., CSI Part2) (if the CSI report is of two-part form) of the plurality of CSI reports of Table 2 to a second UCI bit sequence, according to the CSI report numbers of Table 2 and according to an indication of wideband or subband for a given CSI report. As shown, the second UCI bit sequence may be given as $a_0^{(2)}$, $a_1^{(2)}$, $a_2^{(2)}$, $a_3^{(2)}$, . . . , $a_{A^{(2)}-1}^{(2)}$. In Table 3, the CSI reports are arranged in a first order according to whether the CSI Part2 report is a wideband or a subband CSI report. A wideband CSI report may report the channel state in a complete band (e.g., one or more bandwidth parts), while a subband CSI report may report the channel state in a subband of a given band (e.g., a portion of a bandwidth part). In the example of Table 3, CSI Part1 wideband CSI reports are listed before CSI Part1 subband CSI reports. Within each category (e.g., wideband and subband), the CSI reports are ordered according to report number. Each respective row of Table 3 corresponds to a second part of a CSI report in Table 2, if the CSI report in Table 2 is in two-part form (i.e., if a CSI Part2 exists for a given CSI report). Accordingly, in the example of Tables 2 and 3, two UCI bit sequences may be generated.

As explained, CSI Part2 wideband CSI reports are listed first, in CSI report number order from report #1 through report #n; the CSI Part2 subband CSI reports are listed following the wideband CSI reports, again in CSI report number order, beginning again from report #1 through report #n (where n is an integer).

For example, the first row of CSI report numbers in Table 3 corresponds to CSI report #1-CSI Part2 wideband, if a CSI Part2 exists for CSI report #1 (i.e., if CSI #1 is in two-part form). The second row of CSI report numbers in Table 3 corresponds to CSI report #2-CSI Part2 wideband, if a CSI Part2 exists for CSI report #2. The $n^{th}$ row of CSI report numbers in Table 3 corresponds to CSI report #n-CSI Part2 wideband, if a CSI Part2 exists for CSI report #n. The n+1 row of CSI report numbers in Table 3 corresponds to CSI report #1-CSI Part2 subband, if a CSI Part2 exists for CSI report #1. The n+2 row of CSI report numbers in Table 3 corresponds to CSI report #2-CSI Part2 subband, if a CSI Part2 exists for CSI report #2. The n+$n^{th}$ row of CSI report numbers in Table 3 corresponds to CSI report #n-CSI Part2 subband, if a CSI Part2 exists for CSI report #n. The first row is associated with $a_0^{(2)}$ of the second bit sequence; the second row is associated with $a_1^{(2)}$ of the second bit sequence, and so on.

Table 4 and Table 5 depict exemplary mapping orders, for transmission on a PUSCH, of CSI reports to UCI bit sequences, where all CSI reports for transmission on the PUSCH are in two-part form.

TABLE 4

Mapping order for transmission on a PUSCH of CSI reports to a first UCI bit sequence, for CSI reports that are two-part reports

| First UCI Bit Sequence | CSI Report Number |
|---|---|
| $a_0^{(1)}$ | CSI Part1 of CSI report #1 |
| $a_1^{(1)}$ | CSI Part1 of CSI report #2 |
| $a_2^{(1)}$ | ... |
| $a_3^{(1)}$ | CSI Part1 of CSI report #n |
| . | |
| . | |
| . | |
| $a_{A^{(1)}-1}^{(1)}$ | |

Table 4 illustrates the mapping of a first part (e.g., CSI Part1) of a plurality of CSI reports to a first UCI bit sequence, according to CSI report numbers. As shown, the first UCI bit sequence may be given as $a_0^{(1)}, a_1^{(1)}, a_2^{(1)}, a_3^{(1)}, \ldots, a_{A^{(1)}-1}^{(1)}$ Each respective row of Table 4 corresponds to the first part (CSI Part1) of the CSI report.

For example, the first row of CSI report numbers in Table 4 corresponds to CSI report #1-CSI Part1. The second row of CSI report numbers in Table 4 corresponds to CSI report #2-CSI Part1. The $n^{th}$ row of CSI report numbers in Table 4 corresponds to CSI report #n-CSI Part1. The first row of CSI report number is associated with $a_0^{(1)}$ of the first UCI bit sequence; the second row is associated with $a_1^{(1)}$ of the first UCI bit sequence, and so on.

TABLE 5

Mapping order for transmission on a PUSCH of CSI Part2 reports to a second UCI bit sequence, if a CSI Part2 report exists for a given CSI report

| Second UCI Bit Sequence | CSI Report Number |
| --- | --- |
| $a_0^{(2)}$ | CSI report #1-CSI Part2 wideband, |
| $a_1^{(2)}$ | if CSI Part2 exists for CSI report #1 |
| $a_2^{(2)}$ | CSI report #2-CSI Part2 wideband, |
| $a_3^{(2)}$ | if CSI Part2 exists for CSI report #2 |
| . | ... |
| . | CSI report #n-CSI Part2 wideband, |
| . | if CSI Part2 exists for CSI report #n |
| $a_{A^{(2)}-1}^{(2)}$ | CSI report #1-CSI Part2 subband, |
| | if CSI Part2 exists for CSI report #1 |
| | CSI report #2-CSI Part2 subband, |
| | if CSI Part2 exists for CSI report #2 |
| | ... |
| | CSI report #n-CSI Part2 subband, |
| | if CSI Part2 exists for CSI report #n |

Table 5 illustrates the mapping of a second part (e.g., CSI Part2) (if the CSI report is of two-part form) of the plurality of CSI reports of Table 4 to a second UCI bit sequence, according to the CSI report numbers of Table 2 and according to an indication of CSI Part2 wideband or subband and an indication of CSI Part2 with group 0 or with group 1 and 2 for a given CSI report. As shown, the second UCI bit sequence may be given as $a_0^{(2)}, a_1^{(2)}, a_2^{(2)}, a_3^{(2)}, \ldots, a_{A^{(2)}-1}^{(2)}$ In Table 5, the CSI reports are arranged in a first order according to whether the CSI Part2 report is a wideband or a subband CSI report or according to whether the CSI report is a CSI Part2 with group 0 or a CSI Part2 with group 1 and 2 CSI report. CSI Part2 group 0 denotes CSI Part2 wideband information. CSI Part2 with group 1 and 2 denotes CSI Part2 subband information. In the example of Table 5, CSI Part2 wideband or CSI Part2 with group 1 reports are listed before CSI Part2 subband or CSI Part2 with group 1 and 2. Within each category (e.g., Part2 wideband or Part2 with group 0 and Part2 subband or CSI Part2 with group 1 and 2) the CSI reports are ordered according to report number. Each respective row in Table 4 corresponds to a second part of a CSI report in Table 4, if the CSI report in Table 4 is in two-part form. Accordingly, in the example of Tables 4 and 5, two UCI bit sequences may be generated.

As explained, CSI Part2 wideband or CSI Part2 with group 0 CSI reports are listed first, in CSI report number order from report #1 through report #n; the CSI Part2 subband or CSI Part2 with group 1 and 2 are listed following the CSI Part2 wideband and CSI Part2 with group 0 CSI reports, again in CSI report number order, beginning again from report #1 through report #n (where n is an integer).

For example, the first row of CSI reports in Table 5 corresponds to CSI report #1-CSI Part2 wideband or CSI Part2 with group 0, if a CSI Part2 exists for CSI report #1.

The second row of CSI report numbers in Table 5 corresponds to CSI report #2-CSI Part2 wideband or CSI Part2 with group 0, if a CSI Part2 exists for CSI report #2. The $n^{th}$ row of CSI report numbers in Table 5 corresponds to CSI report #n-CSI Part2 wideband or CSI Part2 with group 0, if a CSI Part2 exists for CSI report #n. The n+1 row of CSI report numbers in Table 5 corresponds to CSI report #1-CSI Part2 subband or CSI Part2 with group 1 and 2, if a CSI Part2 exists for CSI report #2. The n+2 row of CSI report numbers in Table 5 corresponds to CSI report #2-CSI Part2 subband or CSI Part2 with group 1 and 2, if a CSI Part2 exists for CSI report #2. The n+n$^{th}$ row of CSI report numbers in Table 5 corresponds to CSI report #n-CSI Part2 subband or CSI Part2 with group 1 and 2, if a CSI Part2 exists for CSI report #n. The first row is associated with $a_0^{(2)}$ of the second bit sequence; the second row is associated with $a_1^{(2)}$ of the second bit sequence, and so on.

When listing CSI reports according to Tables 1-5, the CSI reports may be listed in increasing order of CSI priority. In other words, the lower the report number, the higher the priority. Accordingly, CSI report #1 has a CSI priority value that is higher than CSI report #2, CSI report #2 has a CSI priority value that is higher than CSI report #3, and so on.

Figure 15:
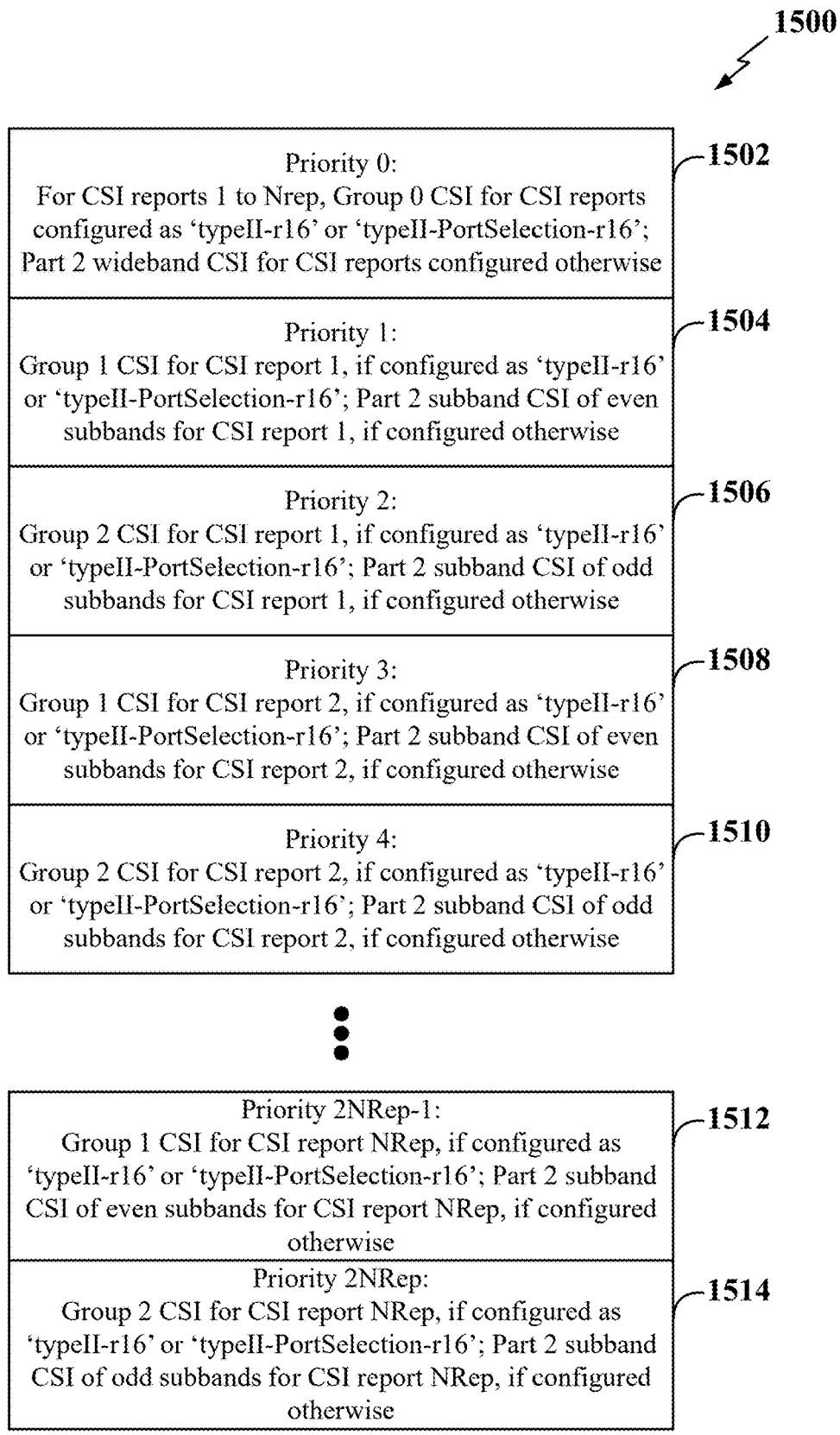
FIG. 15 is a schematic representation of priority reporting levels/priority order for CSI Part2 according to some aspects.

FIG. 15 is a schematic representation of priority reporting levels/priority order 1500 for CSI Part2 according to some aspects. The priority takes into consideration whether the CSI Part2 is concerned with wideband or subband information. In the example shown in FIG. 1, Group 0 refers to CSI reports related to wideband, Group 1 refers to CSI reports related to even-numbered subbands, and Group 2 refers to CSI reports related to odd-numbered subbands. It is noted that Priority 0 1502 covers CSI wideband reports #1 to #$N_{Rep}$, where $N_{Rep}$ is an integer and corresponds to a number of CSI reports configured to be carried, while the remaining priorities (Priority 1 1504-Priority $2N_{Rep}$ 1514) each relate to a single CSI subband report. The listing supports a practice of assigning a higher priority to wideband reports than subband reports. Thus, according to the priority reporting levels/priority order 1500 for CSI Part2, all wideband reports have a priority that is higher than the priorities assigned to all subband reports. The example of FIG. 15 may be associated with CSI report dropping rules in connection with UCI on PUSCH and UCI on PUSCH. In connection with UCI on PUSCH, in some examples, when CSI reporting on PUSCH includes two parts, a UE may omit a portion of the CSI Part2.

Omission of CSI Part2 may be made according to the priority reporting levels/priority order 1500 shown in FIG. 15, where:

$N_{Rep}$ may be a number of CSI reports configured to be carried on the PUSCH;

Priority 0 1502 is the highest priority and priority $2N_{Rep}$ 1514 is the lowest priority;

the subbands for a given CSI report n, indicated by a higher layer parameter (e.g., the higher layer parameter csi-ReportingBand), may be numbered continuously in increasing order with the lowest subband identified in the higher layer parameter (e.g., in csi-ReportingBand) as subband 0;

CSI reports (e.g., Group 2 CSI for CSI report $N_{Rep}$, included under Priority $2N_{Rep}$ 1514) are omitted beginning at the lowest priority level (e.g., Priority $2N_{Rep}$ 1514) and proceeding upward as priority levels increase (e.g., Priority $2N_{Rep}$-1 1512 has a higher priority than Priority $2N_{Rep}$ 1514); and when omitting the CSI Part2 information for a particular priority level, the UE may omit all the information at that priority level.

In connection with UCI on PUCCH, in some examples, a UE may not be expected to report CSI with a total number of UCI bits and cyclic redundancy check (CRC) bits larger than a predefined number of bits (e.g., 115 bits when configured with PUCCH format 4). For CSI reports transmitted on a PUCCH, if all CSI reports consist of one part, the UE may omit a portion of CSI reports. Omission of the portion of CSI reports may be carried out according to a predefined priority order. According to some aspects, CSI report(s) may be omitted beginning with the lowest priority level (e.g., Priority $2N_{Rep}$ 1514) until a CSI report code rate is less or equal to one configured by a higher layer parameter (e.g., the higher layer parameter maxCodeRate). The CSI code rate may be defined as the number of uplink information bits (including CRC bits) divided by the number of physical channel bits on the PUSCH. If any of the CSI reports consist of two parts, the UE may omit a portion of CSI Part2. Omission of CSI Part2 may be according to the priority order shown in FIG. 15 and described above.

CSI reports may be associated with a priority value, where the lower the priority value, the higher the priority. According to some examples, the priority value may be referred to as $Pri_{iCSI}(y, k, c, s)$ and given by the equation:

$$Pri_{iCSI}(y,k,c,s)=2 \cdot N_{cells} \cdot M_S \cdot y + N_{cells} \cdot M_S \cdot k + M_S \cdot c + s \quad (1)$$

where:
y is related to the timing behavior, where y=0 for aperiodic CSI reports to be carried on PUSCH, y=1 for semi-persistent CSI report to be carried on PUSCH, y=2 for semi-persistent CSI reports to be carried on PUCCH, and y=3 for periodic CSI reports to be carried on PUCCH;
k relates to the reporting quantity, where k=0 for CSI reports carrying L1-RSRP or L1-SINR, and k=1 for CSI reports not carrying L1-RSRP or L1-SINR (accordingly, reports carrying information for beam reporting, e.g., L1-RSRP or L1-SINR, have higher priority than other reports);
c relates to the carrier, where c is the serving cell index and $N_{cells}$ is a maximum number of cells expressed as a first predetermined value given by a higher layer parameter (e.g., the higher layer parameter maxNrof-ServingCells) (accordingly, the lowest component carrier, for example, the component carrier with the lowest serving cell index, c, is given the highest priority); and
s relates to the report ID, where s is the reportConfigID and $M_S$ is a maximum number of CSI reports expressed as a second predetermined value given by a higher layer parameter (e.g., the higher layer parameter maxN-rofCSI-ReportConfigurations) (accordingly, the lowest report ID is given the highest priority).

A first CSI report is said to have priority over a second CSI report if the associated $Pri_{iCSI}(y, k, c, s)$ value is lower for the first report than for the second report.

According to some aspects, rules may exist relating to collisions of CSI reports. For example, two CSI reports are said to collide if the time occupancy of the physical channels scheduled to carry the CSI reports overlap in at least one OFDM symbol and are transmitted on the same carrier. When a UE is configured to transmit two colliding CSI reports, the UE may make use of rules that obviate the collision. For example, some rules may state:
if y values are different between the two CSI reports, the following rules may apply except for the case when one of the y values is 2 and the other y value is 3 (for CSI reports transmitted on PUSCH), for CSI reports transmitted on PUCCH:
the CSI report with higher $Pri_{iCSI}(y, k, c, s)$ value shall not be sent (i.e., it will be dropped) by the UE:
otherwise, the two CSI reports are multiplexed together or either is dropped based on the priority values as described in connection with FIG. 9 and its associated text.

According to the rule, and as a first example, if an aperiodic CSI report (y=0) is configured to transmit with a periodic CSI report (y=3) (i.e., the y values are different and one y value is not 2 while the other is 3), then the CSI report with the highest priority may be transmitted while the other CSI report may be dropped. In this example, if all other things are equal, the transmitted CSI report would be the aperiodic CSI report, because y=0 yields a lower value (and thus a higher priority) of $Pri_{iCSI}(y, k, c, s)$ in comparison to y=3. The periodic CSI report could be dropped.

According to the rule, and as a second example, if a semi-persistent CSI report (y=2) is configured to transmit with a periodic CSI report (y=3), then the two CSI reports are multiplexed together, or either is dropped based on their priority values and predetermined rules related to the priority values in this circumstance. In this example, the y values are different but one y value is 2 while the other is 3, therefore the first branch of the rule (i.e., the branch reciting: "the CSI report with higher $Pri_{CSI}(y,k,c,s)$ value shall not be sent (i.e., it will be dropped) by the UE") does not apply and the decision based on the second branch of the rule (i.e., the branch reciting: "otherwise, the two CSI reports are multiplexed together or either is dropped based on the priority values as described in connection with FIG. 9 and its associated text") may be applied.

According to some aspects, when a UE determines to transmit control information on PUSCH (e.g., send UCI (including CSI) on PUSCH), the UE is provided with a flexibility to allocate more resources to the control information. Allocating more resources to the control information provides greater protection to the control information. The allocation of more resources to the control information may be adjusted using an offset referred to herein as a "beta value" (e.g., $\beta_{offset}^{PUSCH}$, beta value, beta, beta offset, or offset). Offset values are defined for a UE to determine a number of resources for multiplexing HARQ-ACK information and for multiplexing CSI reports in a PUSCH. The offset values may be signaled to a UE either by a DCI format scheduling the PUSCH transmission or by higher layers. If the beta value is equal to 1, there is a one-to-one mapping between the length of the control information (e.g., where the length may be given by the parameters $O_{ACK}$ and $L_{ACK}$ in equation (2), below) and the number of subcarriers scheduled for the UCI on the PUSCH transmission. If beta is greater than one, then more resources are allocated for the transmission of the UCI (e.g., the control information) in comparison to the quantity of resources allocated with beta equal to 1.

The beta value may be used, for example, for UCI on PUSCH for the transmission of uplink-shared channel (UL-SCH), where the amount (e.g., number of, quantity of) of resources used for HARQ-ACK may be calculated based on the following equation for the number of resources allocated to HARQ-ACK on a PUSCH:

$$Q'_{ACK} = \min \left\{ \left\lceil \frac{(O_{ACK} + L_{ACK}) \cdot \beta^{PUSCH}_{offset} \cdot \sum_{l=0}^{N^{PUSCH}_{symb,all}-1} M^{UCI}_{sc}(l)}{\sum_{r=0}^{C_{UL-SCH}-1} K_r} \right\rceil, \left\lceil \alpha \cdot \sum_{l=l_0}^{N^{PUSCH}_{symb,all}-1} M^{UCI}_{sc}(l) \right\rceil \right\} \quad (2)$$

The beta value may be used, for example, for UCI on PUSCH without UL-SCH, where the amount of resources used for HARQ-ACK may be calculated based on the following equation:

$$Q'_{ACK} = \min \left\{ \left\lceil \frac{(O_{ACK} + L_{ACK}) \cdot \beta^{PUSCH}_{offset}}{R \cdot Q_m} \right\rceil, \left\lceil \alpha \cdot \sum_{l=l_0}^{N^{PUSCH}_{symb,all}-1} M^{UCI}_{sc}(l) \right\rceil \right\} \quad (3)$$

Figure 16:
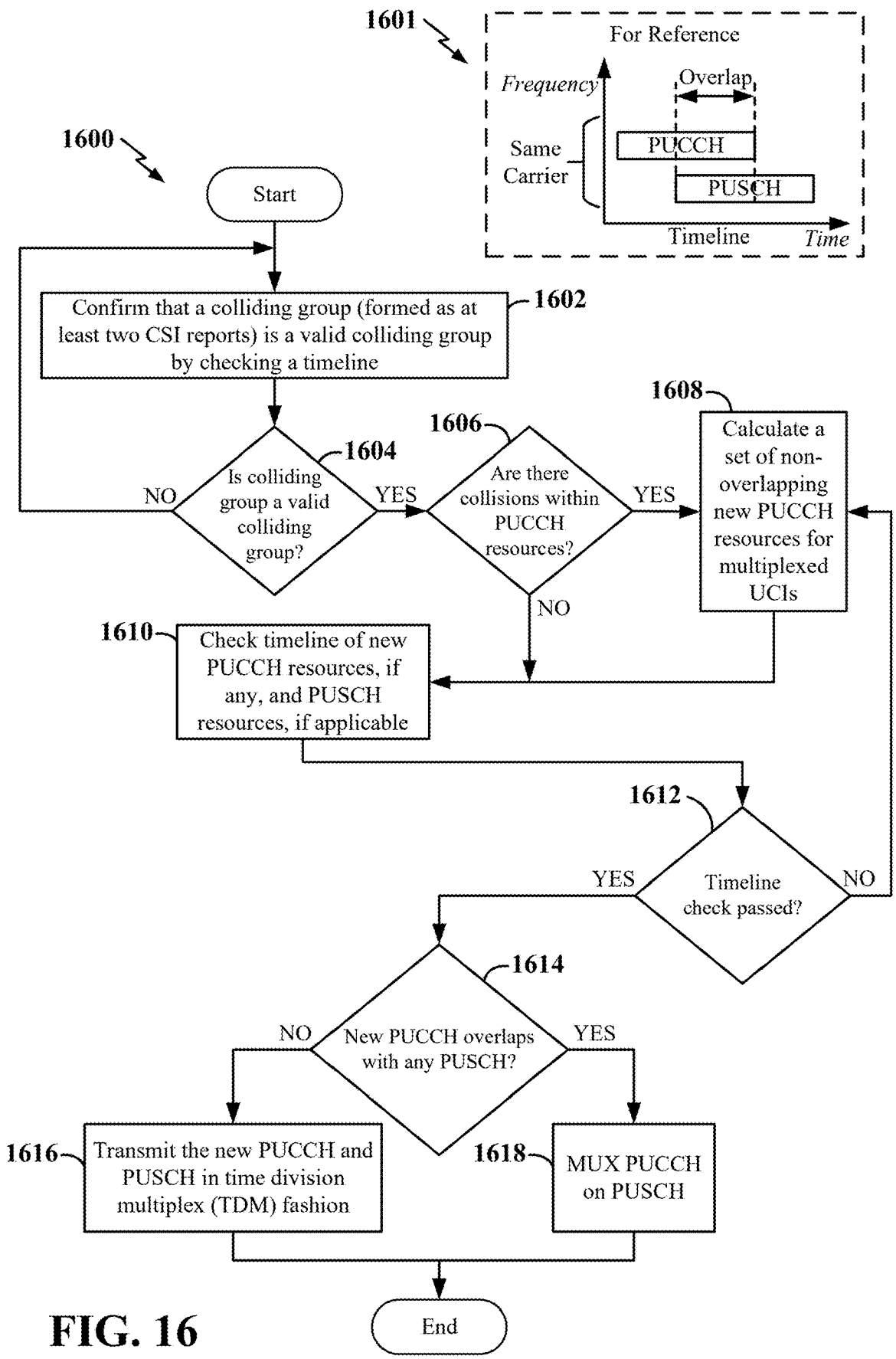
FIG. 16 is a flow diagram providing an overview of a UCI/CSI multiplexing procedure at a UE according to some aspects.

FIG. 16 is a flow diagram providing an overview of a UCI/CSI multiplexing procedure 1600 at a UE according to some aspects. An example of a configured, but not yet occurred, transmission in an overlapped state 1601 in at least one OFDM symbol between one PUCCH and one PUSCH using the same carrier is provided for reference in the upper right corner of FIG. 16. It is noted that the same example with multiple PUCCH and/or multiple PUSCH is within the scope of the disclosure. In the example, time is represented on the horizontal axis with units of OFDM symbols, frequency is on the vertical axis with units of subcarriers. The horizontal axis is labeled with the word "Timeline." A UE detecting that the PUSCH and PUCCH, as shown in the overlapped state 1601, will collide, may employ rules so that only one of the PUSCH or PUCCH are transmitted, or so that the PUSCH and PUCCH may be multiplexed.

At block 1602, the UE may confirm that a colliding group is a valid colliding group by, for example, checking a timeline and confirming that at least one OFDM symbol between one PUCCH and one PUSCH using the same carrier is configured.

At block 1604, if the colliding group is not a valid colliding group, then the UE may return to block 1602 to confirm new colliding groups as they may occur. However, if at block 1604, the colliding group is a valid colliding group, then at block 1606 the UE may determine if there are collisions within PUCCH resources if PUCCH resources are present. According to some aspects, collisions within PUCCH resources may be resolved before resolving collisions between PUCCH and PUSCH resources and before resolving collisions within PUSCH resources, if any. If the UE determines that there are collisions within PUCCH resources, then at block 1608 the UE may, for example, resolve the collisions within PUCCH resources by calculating a set of non-overlapping PUCCH resources (hereinafter referred to as new PUCCH resources) for multiplexed UCIs based on the overlapped PUCCHs in the valid colliding group. Following the negative path from block 1606 or after the calculation at block 1608, the UE, at block 1610 may check a timeline to determine if the UE has enough time to prepare and transmit an uplink channel. At block 1612, if the timeline check fails, then the UE may return to block 1608 to recalculate a new set of non-overlapping new PUCCH resources for multiplexed UCIs. However, if the timeline check passed at block 1612, then at block 1614 the UE may determine if any new PUCCH overlaps with any PUSCH. If a new PUCCH is not overlapped with any PUSCH at block 1616, then at block 1616 the UE may transmit the new PUCCH and the PUSCH in a time domain multiplexing fashion (e.g., where the PUCCH is transmitted at a first time and the PUSCH is transmitted at a second, non-overlapping, time). Returning to block 1614, if the UE determines that the new PUCCH overlaps with any PUSCH, then at block 1618 the UE may multiplex (MU) the control information of the PUCCH on the PUSCH (e.g., MU the UCI (including the CSI) on the PUSCH).

The channel characteristics of a downlink (DL) are different in half-duplex (HD) mode versus full-duplex (FD) mode at least because of the existence of cross-link interference (CLI) and self-interference. For several reasons, a gNB may use the channel state information (CSI) in both FD and HD slots. For example, the gNB may be configured to use the CSI in both the FD and the HD slots to estimate the impact of different types of interference on a UE in an FD slot; the gNB may allow for a combination of the two CSI values (i.e., a first CSI of the HD slot and a second CSI of the FD slot) to decide on one set of transmission (Tx) parameters (e.g., MCS, Rank, . . . , etc.) for both types of slots (i.e., the FD slot and the HD slot); and/or the gNB may use the CSI in both the FD and the HD slots to make a scheduling decision, for example as to whether a particular UE might be scheduled in FD slots. As used herein, a reference to a CSI value may refer to any parameter measured/reported in a CSI report.

Accordingly, a gNB may configure a UE to report differential CSI (also referred to herein as compressed CSI) in one of two CSI reports (e.g., a first CSI report of the HD slot or a second CSI report of the FD slot). The CSI feedback overhead at the UE may be reduced by configuring the UE to report differential CSI. For example, if a baseline CSI report is an HD CSI report, then the differential CSI report may be the FD CSI report. Using the differential FD CSI report may result in a smaller payload for the differential FD CSI report (relative to the baseline HD CSI report) because the differential FD CSI report may be smaller than the baseline HD CSI report. For example, four bits may be used to represent the values 0, 1, 2, and 3 (e.g., for a given parameter). However, if a first baseline CSI report utilized the four bits for a given parameter, the second differential report may only use one bit to represent the same parameter, where the one bit would indicate either that the parameter value should be incremented by 1 (e.g., by indicating addition to the baseline parameter, as represented by the value 0) or decremented by 1 (e.g., by indicating subtraction to the baseline parameter, as represented by the value 1). Accordingly, the use of differential reporting reduces payload (relative to not using differential reporting).

This disclosure relates to definitions of the priority and multiplexing rules that may be utilized with the two types of CSI reports (i.e., a baseline type CSI report and a differential type CSI report). Either the HD CSI report or the FD CSI report may be the baseline report. In a first example, the two types of CSI reports may be a baseline HD CSI report and a differential FD CSI report. In a second example, the two types of CSI reports may be a baseline FD CSI report and a differential HD CSI report.

In a first scenario, a full-duplex mode from a perspective of a gNB may be considered. In the first scenario, according to a first case, the gNB may be in the full-duplex mode, while according to a second case, the gNB may be in a half-duplex mode. In both cases, the UE may be in half-duplex mode (e.g., the UE may be a half-duplex UE or a full-duplex-aware UE). In a second scenario, a full-duplex mode from a perspective of a UE may be considered. In the second scenario, like the first scenario, the gNB may be in the full-duplex mode or in a half-duplex mode. In both cases, the UE may be in a full-duplex mode (e.g., with self-interference (SI) mitigation) or in a half-duplex mode.

According to both scenarios, the UE may send a baseline CSI report relative to one duplex mode, and a differential CSI report relative to the other duplex mode. For example, according to both scenarios, the UE may send a baseline half-duplex CSI report and a differential full-duplex CSI report. In another example, according to both scenarios, the UE may send a baseline full-duplex CSI report and a differential half-duplex CSI report.

Figure 17A:
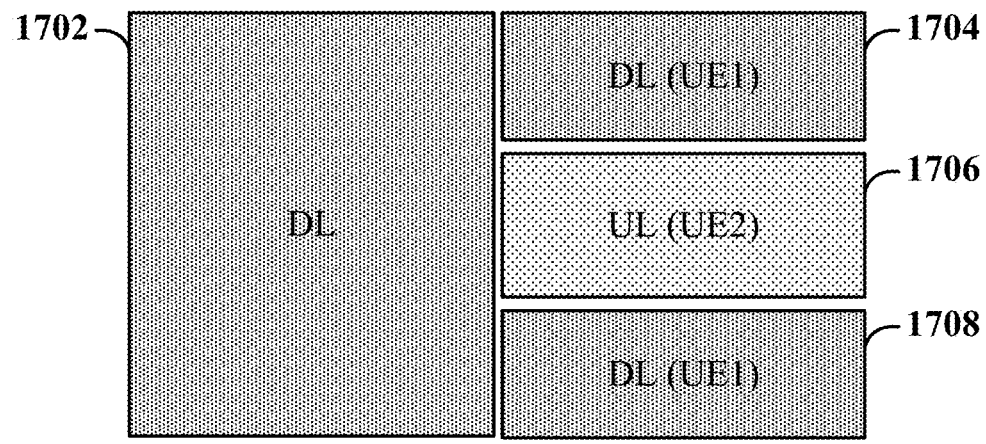
FIGS. 17A and 17B depict a first scenario and a second scenario, respectively, of half-duplex/full-duplex slots in connection with a description of differential CSI reporting according to some aspects.

FIG. 17A depicts the first scenario 1700 of half-duplex/full-duplex slots in connection with a description of differential CSI reporting according to aspects described herein. In FIG. 17A, two slots are illustrated. A first slot includes a downlink resource 1702. Accordingly, the first slot represents a half-duplex slot, and the UE may measure a downlink reference signal for a half-duplex CSI report. A second slot includes two downlink resources 1704, 1708 associated with a first UE (UE1) and one uplink resource 1706 associated with a second UE (UE2). The downlink resources 1704, 1708 and the uplink resource 1706 overlap, at least, in time (e.g., in OFDM symbols). Accordingly, the second slot of FIG. 17A represents a subband full-duplex slot. In this first scenario, each UE is a half-duplex UE, so this first scenario is full-duplex from the perspective of the gNB only. In this first scenario, only UE1 is configured with downlink resources so only UE1 may be configured with CSI computation in the second slot and only UE1 may transmit a baseline half-duplex CSI report for the first slot and a differential half-duplex CSI report for the second slot.

Figure 17B:
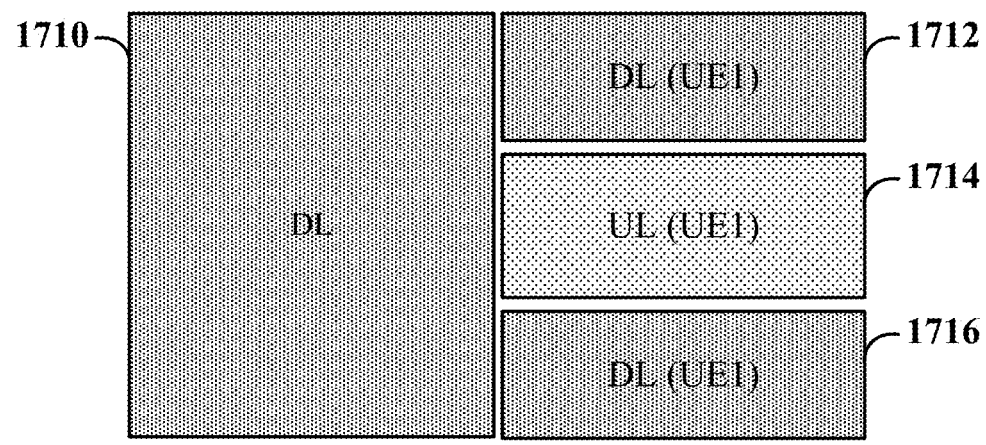

FIG. 17B depicts the second scenario 1701 of half-duplex/full-duplex slots in connection with a description of differential CSI reporting according to aspects described herein. In FIG. 17B, two slots are illustrated. A first slot includes a downlink resource 1710. Accordingly, the first slot represents a half-duplex slot, and the UE may measure a downlink reference signal for a half-duplex CSI report. A second slot includes two downlink resources 1712, 1716 associated with a first UE (UE1) and one uplink resource 1714 also associated with the first UE (UE1). In the second slot, the downlink resources 1712, 1716 and the uplink resource 1714 overlap, at least, in time (e.g., in OFDM symbols). Accordingly, the second slot represents a full-duplex slot and the UE may measure for a full-duplex CSI report. In this second scenario, the UE is a full-duplex UE, so this second scenario is full-duplex from the perspective of the UE and the gNB. In this second scenario, the UE may transmit a baseline half-duplex CSI report for the first slot and a differential full-duplex CSI report for the second slot.

According to aspects described herein, a gNB may configure a UE to report half-duplex CSI reports and full-duplex CSI reports as a combination of a baseline CSI report and a differential CSI report, where the baseline CSI report and the differential CSI report are linked together. By way of example, the baseline CSI report may be a baseline half-duplex CSI report and the differential CSI report may be a differential full-duplex CSI report. In one example, the baseline CSI report may be a baseline full-duplex CSI report and the differential CSI report may be a differential half-duplex CSI report.

According to some aspects, the baseline CSI report and the differential CSI report may be assigned the same priority level. In other words, the differential CSI report priority may follow the baseline CSI report priority. According to some aspects, multiplexing rules may be defined (e.g., established) to resolve conflicts/collision between reports having the same priority.

For example, at least two examples of multiplexing rules may be defined to resolve conflicts/collision between reports having the same priority. According to a first multiplexing rule, the baseline CSI report and the differential CSI report may not be multiplexed on the same PUCCH or PUSCH. According to a second multiplexing rule, multiplexing rules may be established to combine the payload of the linked baseline CSI report and differential CSI report to construct one combined CSI report.

According to some aspects, a priority equation, such as the priority equation (1) for $Pri_{iCSI}(y, k, c, s)$, may be used to determine priority, where CSI report IDs may be incorporated into the priority equation and used to order the CSI reports.

According to another aspect, the priority equation, such as the priority equation (1) for $Pri_{iCSI}(y, k, c, s)$, may be redefined to account for differential CSI reporting. For example, the parameter k in the priority equation could be redefined such that k=0 or 1 may be used to signify baseline CSI reports, while k=2 or k=2 or 3 may be used to signify differential CSI reports. According to another example, a new parameter may be added to the priority equation to account for duplex mode. For example, the new parameter may be given as "d," where d=0 corresponds to a baseline CSI report and d=1 corresponds to a differential report.

According to a fourth rule, the priority may be made slot-dependent. For example, in an FD slot, when reporting an FD CSI report (baseline or differential), assign a higher priority to the FD CSI report (in comparison to an HD CSI report), and in an HD slot, when reporting an HD CSI report (baseline or differential), assign a higher priority to the HD CSI report (in comparison to the FD CSI report).

According to one example, if two CSI reports (e.g., a baseline CSI report and a differential CSI report) are assigned different priority levels using an updated priority equation (as described above, for example), then the UE may follow preexisting rules that have already been defined for handling conflicts/collisions between two full CSI reports (e.g., effectively between two baseline CSI reports).

According to another example, if two reports (e.g., a baseline CSI report linked to a differential CSI report) are assigned the same priority level, then at least four rules may be considered.

According to a first rule, overlap between the baseline CSI report and the differential CSI report would be prevented.

According to a second rule, if the two reports (e.g., a baseline CSI report linked to a differential CSI report) are overlapped (or are configured to be overlapped), then either the baseline CSI report or the differential CSI report would be dropped according to, for example, one or more of the following rules: 1) always drop the differential CSI report; 2) report the differential CSI report for the last reported baseline CSI report (e.g., the baseline CSI report linked to the differential CSI report) or aperiodic CSI reports that are based on a timer, where following an expiration of the timer, the UE reports the baseline CSI report; 3) alternate between reporting the baseline CSI report and the differential CSI report for periodic or semi-persistent CSI reporting; and/or report the baseline CSI report or the differential CSI report that has the most recent parameter (measurement) update, for periodic or semi-persistent CSI reporting.

According to a third rule, a combined CSI report (e.g., combining the payloads of the baseline CSI report and differential CSI report) may be constructed if the combined payloads of the baseline CSI report and differential CSI report is less than a predetermined threshold. For example, the payloads of the baseline CSI report and differential CSI report may be combined such that all of the fields of the baseline CSI report-CSI Part1 are included in the combined CSI report, and a subset of the fields of the baseline CSI report-CSI Part2 are included in the combined CSI report. The combined CSI report may further include a subset (or all) of the corresponding fields in the differential CSI report (where the correspondence may be between the fields of the baseline CSI report and the differential CSI report). In another example, the combination of the baseline CSI report and the differential CSI report may be limited or restricted to allow combinations only for certain CSI report quantities (e.g., where the CSI report quantities correspond to the number of CSI reports configured for transmission). According to another example, the combined payload of the baseline CSI report and the differential CSI report may be limited to a predefined maximum allowed payload for a single CSI report.

In conjunction with the use of a baseline CSI report and a differential CSI report, control information (e.g., a UCI (including CSI)) may be multiplexed onto the PUSCH. It is noted that the payload of a differential CSI report is expected to be less than the payload of a baseline CSI report.

In connection with the multiplexing of the UCI (including CSI) on the PUSCH, the UE may be configured with a beta value (e.g., the $\beta_{offset}^{PUSCH}$ value described in connection with equations (2) and (3) herein), for payload scaling. The beta value may thus be used to determine the number of resource elements configured for transmission of the UCI (including CSI(s)). Under this example, at least two rules may be considered.

According to a first rule, the same beta value may be used for CSI Part1 and CSI Part2. These same beta values may be used for both the baseline CSI report and the differential CSI report (e.g., beta_csi_part1=beta_csi_part2). According to this first rule, the baseline CSI report and the differential CSI report may be treated as two reports with different priorities.

According to a second rule, different beta values (e.g., beta offsets) may be used for the baseline CSI report and the differential CSI report. According to this second rule, the payloads of the baseline CSI report and the differential CSI report may be different. This may facilitate the gNB to use the different beta values to scale the two CSI reports differently, for example, to achieve a target UCI (including CSI) payload. According to this second rule, for semi-statically configured between values, the different beta values may be RRC configured for the baseline CSI report and the differential CSI report. Still further, according to the second rule, for a dynamic beta value, if a DCI triggers two reports (e.g., the baseline CSI report and the differential CSI report), then two bits in the DCI may be used to identify one of three rules.

For example, identifying the first rule would configure the UE to use the same beta value for the baseline CSI report and the differential CSI report. Identifying the second rule would indicate that a beta value for a baseline CSI report and a relative offset (a relative change to the beta value of the baseline CSI report) for the differential CSI report are to be RRC configured. Identifying the third rule would indicate that the UE is configured with a table that enables joint selection of beta values for the baseline CSI report and the differential CSI report.

As indicated above, two reports may not be configured as a baseline CSI report and a differential CSI report, but instead may be configured as two baseline CSI reports. The two baseline CSI reports (e.g., a baseline half-duplex CSI report and a baseline full-duplex CSI report) may be combined into a single combined CSI report. In the case of the single combined CSI report, a gNB may configure similar priority and multiplexing rules for the single combined CSI report as those described above for the baseline CSI reports and differential CSI reports. For example, the priority equation described above may be rewritten to reflect the priority of the single combined (half-duplex and full-duplex) CSI report.

Figure 18:
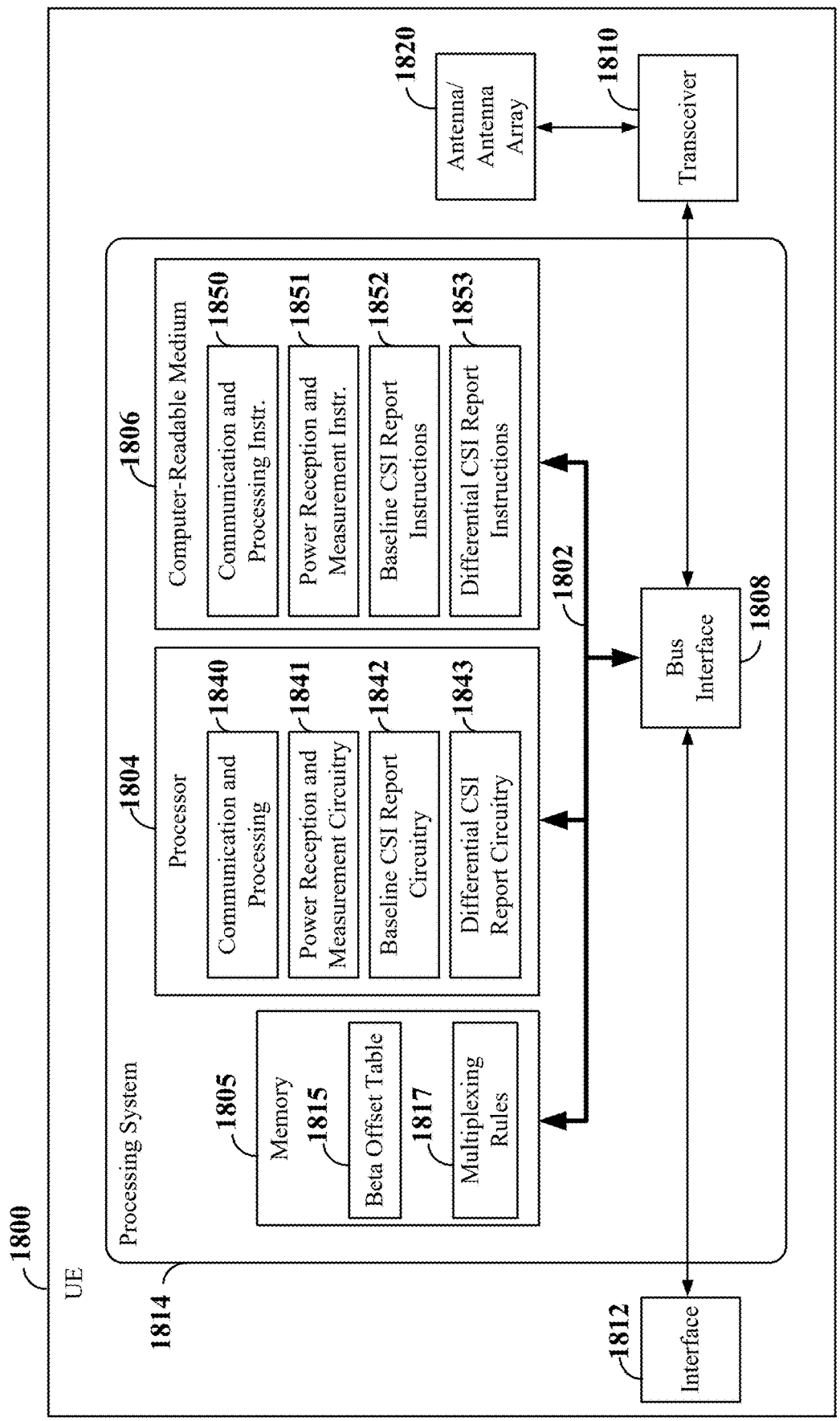
FIG. 18 is a block diagram illustrating an example of a hardware implementation of a user equipment employing a processing system according to some aspects.

FIG. 18 is a block diagram illustrating an example of a hardware implementation of a user equipment (UE) 1800 (e.g., a scheduled entity) employing a processing system 1814 according to some aspects. For example, the UE 1800 may correspond to any UEs or scheduled entities configured for wireless communication, as shown and described in connection with FIGS. 1, 2, 4, 6, 8, and/or 10.

In accordance with various aspects of the disclosure, an element, or any portion of an element, or any combination of elements may be implemented with a processing system 1814 that includes one or more processors, such as processor 1804. Examples of processor 1804 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the UE 1800 may be configured to perform any one or more of the functions described herein. That is, the processor 1804, as utilized in the UE 1800, may be used to implement any one or more of the methods or processes described and illustrated, for example, in FIGS. 6, 8A, 8B, 8C, 15, and/or 16.

The processor 1804 may in some instances be implemented via a baseband or modem chip and in other implementations, the processor 1804 may include a number of devices distinct and different from a baseband or modem chip (e.g., in such scenarios as may work in concert to achieve examples discussed herein). And as mentioned above, various hardware arrangements and components outside of a baseband modem processor can be used in implementations, including radio frequency (RF)-chains, power amplifiers, modulators, buffers, interleavers, adders/summers, etc.

In this example, the processing system 1814 may be implemented with a bus architecture, represented generally by the bus 1802. The bus 1802 may include any number of interconnecting buses and bridges depending on the specific application of the processing system 1814 and the overall design constraints. The bus 1802 links together various circuits, including one or more processors (represented generally by the processor 1804), a memory 1805, and computer-readable media (represented generally by the computer-readable medium 1806). The bus 1802 may also link various other circuits such as timing sources, peripherals, voltage regulators, and power management circuits, which are well known in the art and will not be described any further.

A bus interface 1808 provides an interface between the bus 1802, a transceiver 1810. The transceiver 1810 may be operationally coupled to an antenna/antenna array 1820. The transceiver 1810 in combination with the antenna/antenna array 1820 may provide a communication interface or a means for communicating with various other apparatus over a transmission medium (e.g., air interface). Depending upon the nature of the apparatus, a user interface 1812 (e.g., keypad, display, touch screen, speaker, microphone, control knobs, etc.) may also be provided. Of course, such a user interface 1812 is optional, and may be omitted in some examples.

The processor 1804 is responsible for managing the bus 1802 and general processing, including the execution of software stored on the computer-readable medium 1806. The software, when executed by the processor 1804, causes the processing system 1814 to perform the various functions described below for any particular apparatus. The computer-readable medium 1806 and the memory 1805 may also be used for storing data that is manipulated by the processor 1804 when executing software. For example, the memory 1805 may store beta offset values in a beta offset table 1815, which may be used by the processor 1804 in connection with calculating an amount of resources used for HARQ-ACK for UCI (including CSI) on a PUSCH with or without UL-SCH (e.g., utilizing equations (2) or (3) herein). For example, the memory 1805 may store a predefined set of multiplexing rules 1817, which may be used by the processor 1804 to resolve a conflict between respective transmissions of a baseline CSI report and a differential CSI report based on a detected use of a same carrier and at least one overlapped orthogonal frequency division multiplexed (OFDM) symbol for the respective transmissions. In one example, the predefined set of multiplexing rules 1817 may be based on a first priority value and a second priority value. In one example, the first priority value may be based on at least one of a baseline CSI report identification number or a parameter that distinguishes the baseline CSI report from the differential CSI report. The second priority value may be based on at least one of a differential CSI report identification number or the parameter that distinguishes the baseline CSI report from the differential CSI report.

One or more processors 1804 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1806.

The computer-readable medium 1806 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1806 may reside in the processing system 1814, external to the processing system 1814, or distributed across multiple entities including the processing system 1814. The computer-readable medium 1806 may be embodied in a computer program product. By way of example, a computer program product may include a computer-readable medium in packaging materials. In some examples, the computer-readable medium 1806 may be part of the memory 1805. Those skilled in the art will recognize how best to implement the described functionality presented throughout this disclosure depending on the particular application and the overall design constraints imposed on the overall system. In some examples, the computer-readable medium 1806 may be implemented on an article of manufacture, which may further include one or more other elements or circuits, such as the processor 1804 and/or memory 1805.

In some aspects of the disclosure, the processor 1804 may include circuitry configured for various functions. For example, the processor 1804 may include communication and processing circuitry 1840, configured to communicate with one or more base stations via a cellular (Uu) interface and with one or more other UEs via a sidelink (PC5) interface. In some examples, the communication and processing circuitry 1840 may include one or more hardware components that provide the physical structure that performs processes related to wireless communication (e.g., signal reception and/or signal transmission) and signal processing (e.g., processing a received signal and/or processing a signal for transmission). For example, the communication and processing circuitry 1840 may include one or more transmit/receive chains.

In some implementations where the communication involves receiving information, the communication and processing circuitry 1840 may obtain information from a component of the UE 1800 (e.g., from the transceiver 1810 that receives the information via radio frequency signaling or some other type of signaling suitable for the applicable communication medium), process (e.g., decode) the information, and output the processed information. For example, the communication and processing circuitry 1840 may output the information to another component of the processor 1804, to the memory 1805, or to the bus interface 1808. In some examples, the communication and processing circuitry 1840 may receive one or more of signals, messages, other information, or any combination thereof. In some examples, the communication and processing circuitry 1840 may receive information via one or more channels. In some examples, the communication and processing circuitry 1840 may include functionality for a means for receiving. In some examples, the communication and processing circuitry 1840 may include functionality for a means for processing, including a means for demodulating, a means for decoding, etc.

In some implementations where the communication involves sending (e.g., transmitting) information, the communication and processing circuitry 1840 may obtain information (e.g., from another component of the processor 1804, the memory 1805, or the bus interface 1808), process (e.g., modulate, encode, etc.) the information, and output the processed information. For example, the communication and processing circuitry 1840 may output the information to the transceiver 1810 (e.g., that transmits the information via radio frequency signaling or some other type of signaling suitable for the applicable communication medium). In some examples, the communication and processing circuitry 1840 may send one or more of signals, messages, other information, or any combination thereof. In some examples, the communication and processing circuitry 1840 may send information via one or more channels. In some examples, the communication and processing circuitry 1840 may include functionality for a means for sending (e.g., a means for transmitting). In some examples, the communication and processing circuitry 1840 may include functionality for a means for generating, including a means for modulating, a means for encoding, etc. The communication and processing circuitry 1840 may further be configured to execute communication and processing instructions 1850 stored on the computer-readable medium 1806 to implement one or more functions described herein.

In some aspects of the disclosure, the processor 1804 may include power reception and measurement circuitry 1841 configured for various functions, including, for example, obtaining (e.g., determining, measuring) a first channel state information (CSI)-related quantity and a second CSI-related quantity in at least one of: respective first and second CSI-interference measurement (CSI-IM) resources, or respective first and second CSI-reference signal (CSI-RS) resources in respective first and second slots. The power reception and measurement circuitry 1841 may also be configured for obtaining non-zero power reference signals in the respective first and second slots. In some examples, CSI-related quantities may include, but are not limited to, at least one of: reference signal received power (RSRP), or signal to interference plus noise ratio (SINR). In some examples, the power reception and measurement circuitry 1841 may include one or more hardware components that provide the physical structure that performs processes related to obtaining the first CSI-related quantity and the second CSI-related quantity in at least one of: respective first and second CSI-IM resources, or respective first and second CSI-reference signal (CSI-RS) resources in respective first and second slots and measuring non-zero power reference signals in the respective first and second slots. The power reception and measurement circuitry 1841 may further be configured to execute power reception and measurement software 1851 stored on the computer-readable medium 1806 to implement one or more functions described herein.

In some aspects of the disclosure, the processor 1804 may include baseline CSI report circuitry 1842 configured for various functions, including, for example, transmitting a baseline channel state information (CSI) report based on the first interference power received and measured in the first slot in CSI-IM resources. In some examples, the baseline CSI report circuitry 1842 may be configured for transmitting the differential CSI report based on non-zero-power reference signals received in reference signal resources received in the first slot. In some examples, the baseline CSI report circuitry 1842 may include one or more hardware components that provide the physical structure that performs processes related to transmitting a baseline CSI report based on the first interference power received and measured in the first slot in CSI-IM resources and/or based on non-zero-power reference signals received in reference signal resources in the first slot. The baseline CSI report circuitry 1842 may further be configured to execute baseline CSI report software 1852 stored on the computer-readable medium 1806 to implement one or more functions described herein.

In some aspects of the disclosure, the processor 1804 may include differential CSI report circuitry 1843 configured for various functions, including, for example, transmitting a differential channel state information (CSI) report based on the second interference power received and measured in the second slot in CSI-IM resources, or more particularly, based on a difference between the power received and measured in the first slot and the power received and measured in the second slot. In some examples, the differential CSI report circuitry 1843 may be configured for transmitting the differential CSI report based on non-zero-power reference signals received in reference signal resources received in the second slot, or more particularly based on a difference between the power received and measured in the first slot and the power received and measured in the second slot. Or more particularly, based on the differential between the power received and measured in the first slot and the power received and measured in the second slot. In some examples, the differential CSI report circuitry 1843 may include one or more hardware components that provide the physical structure that performs processes related to transmitting a differential CSI report based on the second interference power received and measured in the second slot in CSI-IM resources and/or based on non-zero-power reference signals received in reference signal resources in the second slot, or more particularly, based on the differential between the power received and measured in the first slot and the power received and measured in the second slot. The differential CSI report circuitry 1843 may further be configured to execute differential CSI report software 1853 stored on the computer-readable medium 1806 to implement one or more functions described herein.

Figure 19:
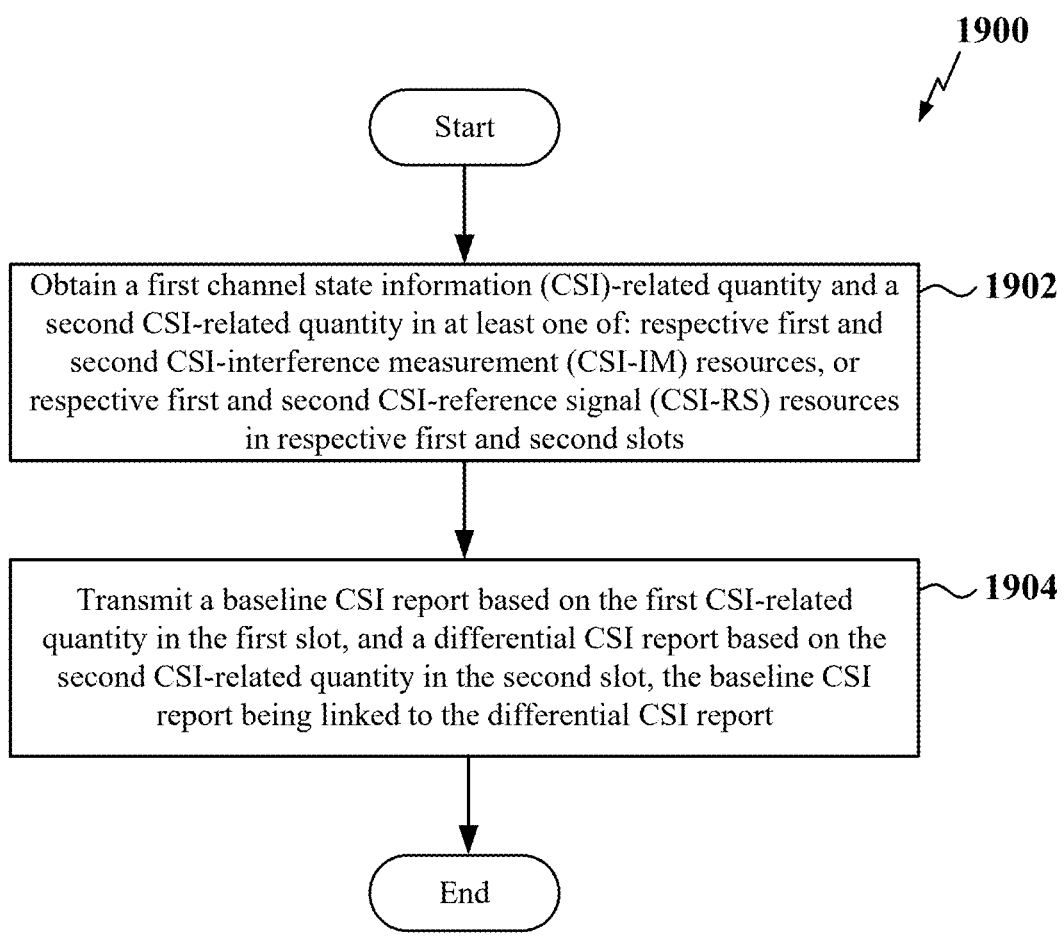
FIG. 19 is a flow chart illustrating an example process of wireless communication at a user equipment according to some aspects.

FIG. 19 is a flow chart illustrating an example process 1900 (e.g., a method) of wireless communication at a user equipment (UE) according to some aspects. As described below, some or all illustrated features may be omitted in a particular implementation within the scope of the present disclosure, and some illustrated features may not be required for implementation of all examples. In some examples, the process 1900 may be carried out by the UE 1800 (e.g., a scheduled entity) illustrated in FIG. 18. The UE 1800 may be similar to, for example, any of the UEs or scheduled entities of FIGS. 1, 2, 4, 5, 6, 8, 10, and/or 18. In some examples, the process 1900 may be carried out by any suitable apparatus or means for carrying out the functions or algorithm described below.

At block 1902, the UE may obtain a first channel state information (CSI)-related quantity and a second CSI-related quantity in at least one of: respective first and second CSI-interference measurement (CSI-IM) resources, or respective first and second CSI-reference signal (CSI-RS) resources in respective first and second slots. For example, the antenna/antenna array 1820 and the transceiver 1810, in combination with the power reception and measurement circuitry 1841, shown and described above in connection with FIG. 18, may provide a means for obtaining a first channel state information (CSI)-related quantity and a second CSI-related quantity in at least one of: respective first and second CSI-interference measurement (CSI-IM) resources, or respective first and second CSI-reference signal (CSI-RS) resources in respective first and second slots.

At block 1904, the UE may transmit a baseline CSI report based on the first CSI-related quantity in the first slot, and a differential CSI report based on the second CSI-related quantity in the second slot, the baseline CSI report being linked to the differential CSI report. For example, the antenna/antenna array 1820 and the transceiver 1810, in combination with the baseline CSI report circuitry 1842 and the differential CSI report circuitry 1843, shown and described above in connection with FIG. 18, may provide a means for transmitting a baseline CSI report based on the first CSI-related quantity in the first slot, and a differential CSI report based on the second CSI-related quantity in the second slot, the baseline CSI report being linked to the differential CSI report. In one example, the first slot may be a half-duplex slot, the baseline CSI report may be a baseline half-duplex CSI report, the second slot may be a full-duplex slot, and the differential CSI report may be a differential full-duplex CSI report. In another example, the first slot may be a full-duplex slot, the baseline CSI report may be a baseline full-duplex CSI report, the second slot may be a half-duplex slot, and the differential CSI report may be a differential half-duplex CSI report.

According to some aspects, the UE may be configured to determine (e.g., calculate, obtain) at least one of: CSI-related quantities, measurement results based on the first interference power and the second interference power, or first and second non-zero-power reference signals. According to some aspects, the UE may be configured to measure the first interference power and the second interference power and determine respective CSI-related quantities included in a baseline CSI report and a differential CSI report based on the measure of the first interference power and the second interference power, respectively. According to some examples, a CSI report may include CSI-related quantities including, but not limited to, at least one of: channel quality indicator (CQI), precoding matrix indicator (PMI), CSI-RS resource indicator (CRI), a synchronization signal block (SSB) resource indicator (SSBRI), layer indicator (LI), and/or rank indicator (RI), reference signal received power (RSRP), and/or signal to interference plus noise ratio (SINR). For example, the baseline CSI report circuitry 1842, the differential CSI report circuitry 1843, and the power reception and measurement circuitry 1841 as shown and described in connection with FIG. 18, either alone or in any combination, may provide a means for determining at least one of: CSI-related quantities, measurement results based on the first interference power and the second interference power, or first and second non-zero-power reference signals, and/or provide means for measuring the first interference power and the second interference power, and determining respective CSI-related quantities included in a baseline CSI report and a differential CSI report based on the measurements of the first interference power and the second interference power, respectively.

According to some aspects, the baseline CSI report and the differential CSI report may have equal priority values. According to these aspects, the UE may be configured to prevent multiplexing of the baseline CSI report and the differential CSI report on a PUSCH. In other words, in cases where the baseline CSI report and the differential CSI report may have equal priority values, the UE may be configured to at least one of: multiplex the baseline CSI report and the differential CSI report on a PUCCH or a PUSCH, transmit the baseline CSI report on the PUSCH and the differential CSI report on a different PUSCH, or transmit the baseline CSI report on the PUCCH and the differential CSI report on a different PUCCH.

According to some aspects, transmitting the baseline CSI report and the differential CSI report may include transmitting a combined CSI report including a combined respective payload of payloads of the baseline CSI report and the differential CSI report. The combined CSI report may be transmitted only for a predetermined report quantity in some examples. The report quantity (also referred to herein as the reportQuantity) may be included in an RRC configuration of a CSI report. The report quantity specifies the parameters to be determined (e.g., calculated, obtained) and reported to a gNB. For example, reportQuantity=CRI-CQI-RI may be used to configure a UE to report the CQI and RI for a CSI-RS resource indicator (CRI). In some examples, the combined respective payload may include data from all fields of a first CSI Part1 of the baseline CSI report and a subset of all fields of a second CSI Part1 of the differential CSI report. For example, the antenna/antenna array 1820 and the transceiver 1810, in combination with the baseline CSI report circuitry 1842 and the differential CSI report circuitry 1843, shown and described above in connection with FIG. 18, may provide a means for transmitting a combined CSI report including a combined respective payload of payloads of the baseline CSI report and the differential CSI report.

According to another aspect, the baseline CSI report may have a baseline CSI report identification number and the differential CSI report may have a differential CSI report identification number that is different from the baseline CSI report identification number. According to this aspect, transmitting the baseline CSI report and the differential CSI report may further include: detecting a conflict between respective transmissions of the baseline CSI report and the differential CSI report based on a detected use of a same carrier and at least one overlapped orthogonal frequency division multiplexed (OFDM) symbol for the respective transmissions, assigning a first priority value to the baseline CSI report in response to the conflict, the first priority value based on at least one of the baseline CSI report identification number or a parameter that distinguishes the baseline CSI report from the differential CSI report; assigning a second priority value to the differential CSI report in response to the conflict, the second priority value based on at least one of the differential CSI report identification number or the parameter that distinguishes the baseline CSI report from the differential CSI report; and applying a predefined set of multiplexing rules that are based on the first priority value and the second priority value to resolve the conflict. For example, the communication and processing circuitry 1840, shown and described above in connection with FIG. 18, may provide a means for detecting a conflict between respective transmissions of the baseline CSI report and the differential CSI report based on a detected use of a same carrier and at least one overlapped orthogonal frequency division multiplexed (OFDM) symbol for the respective transmissions, assigning a first priority value to the baseline CSI report in response to the conflict, the first priority value based on at least one of the baseline CSI report identification number or a parameter that distinguishes the baseline CSI report from the differential CSI report; assigning a second priority value to the differential CSI report in response to the conflict, the second priority value based on at least one of the differential CSI report identification number or the parameter that distinguishes the baseline CSI report from the differential CSI report; and applying a predefined set of multiplexing rules that are based on the first priority value and the second priority value to resolve the conflict.

According to another aspect, the baseline CSI report may be associated with a first slot-type and the differential CSI report may be associated with a second slot-type, and the transmitting the baseline CSI report and the differential CSI report by the UE may also include: detecting a conflict between respective transmissions of the baseline CSI report and the differential CSI report based on a detected use of a same carrier and at least one overlapped orthogonal frequency division multiplexed (OFDM) symbol for the respective transmissions; assigning a first priority value to the baseline CSI report and a second priority value to the differential CSI report based on slot-type in response to the conflict; and applying a predefined set of multiplexing rules that are based on the first priority value and the second priority value to resolve the conflict. For example, the communication and processing circuitry 1840, shown and described above in connection with FIG. 18, may provide a means for detecting a conflict between respective transmissions of the baseline CSI report and the differential CSI report based on a detected use of a same carrier and at least one overlapped orthogonal frequency division multiplexed (OFDM) symbol for the respective transmissions; assigning a first priority value to the baseline CSI report and a second priority value to the differential CSI report based on slot-type in response to the conflict; and applying a predefined set of multiplexing rules that are based on the first priority value and the second priority value to resolve the conflict.

According to one example, the baseline CSI report and the differential CSI report may have equal priority values, and to transmit the baseline CSI report and the differential CSI report, the UE may be further configured to: detect a conflict between respective transmissions of the baseline CSI report and the differential CSI report based on a detected use of a same carrier and at least one overlapped orthogonal frequency division multiplexed (OFDM) symbol for the respective transmissions; and at least one of: drop the differential CSI report and transmitting the baseline CSI report, drop, for aperiodic reports based on a timer, the baseline CSI report and transmitting the differential CSI report before the expiration of the timer, or drop the differential CSI report and transmit the baseline CSI report following the expiration of the timer; alternate, for periodic and semi-persistent CSI reports, between dropping and transmitting the differential CSI report and the baseline CSI report; or drop, for periodic and semi-persistent CSI reports, one of the baseline CSI report or the differential CSI report that has a later parameter update than the differential CSI report or the baseline CSI report respectively and transmitting a remaining un-dropped CSI report. For example, the communication and processing circuitry 1840, shown and described above in connection with FIG. 18, may provide a means for detecting a conflict between respective transmissions of the baseline CSI report and the differential CSI report based on a detected use of a same carrier and at least one overlapped orthogonal frequency division multiplexed (OFDM) symbol for the respective transmissions; and at least one of: dropping the differential CSI report and transmitting the baseline CSI report, dropping, for aperiodic reports based on a timer, the baseline CSI report and transmitting the differential CSI report before the expiration of the timer, or dropping the differential CSI report and transmitting the baseline CSI report following the expiration of the timer; alternating, for periodic and semi-persistent CSI reports, between dropping and transmitting the differential CSI report and the baseline CSI report; or dropping, for periodic and semi-persistent CSI reports, one of the baseline CSI report or the differential CSI report that has a later parameter update than the differential CSI report or the baseline CSI report respectively and transmitting a remaining un-dropped CSI report.

In some examples, the baseline CSI report and the differential CSI report may be multiplexed on a physical uplink shared channel (PUSCH). For example, the communication and processing circuitry 1840 in combination with the transceiver 1810, shown and described above in connection with FIG. 18, may provide a means for multiplexing the baseline CSI report and the differential CSI report on a physical uplink shared channel (PUSCH).

According to some aspects, a quantity of resource elements (REs) allocated to a given CSI report that is multiplexed on a physical uplink shared channel (PUSCH) may be based on an offset value (e.g., a beta offset value) that may be associated with the user equipment, the UE may then receive a first offset value associated with a first CSI Part1 of the baseline CSI report; receive a second offset value associated with a first CSI Part2 of the baseline CSI report; receive a third offset value associated with a second CSI Part1 of the differential CSI report; receive a fourth offset value associated with a second CSI Part2 of the differential CSI report; and compute respective quantities of resource elements allotted to the baseline CSI report and the differential CSI report using the first offset value, the second offset value, the third offset value, and the fourth offset value respectively, where a given offset value greater than 1 increases the quantity of resource elements allocated to the given CSI report multiplexed on the PUSCH relative to a number of resource elements allocated with the given offset value being less than or equal to 1. Furthermore, where the first offset value is equal to the third offset value and the second offset value is equal to the fourth offset value, the UE may further consider the baseline CSI report, including the first CSI Part1 of the baseline CSI report and the first CSI Part2 of the baseline CSI report, as a first CSI report; consider the differential CSI report, including the second CSI Part1 of the differential CSI report and the second CSI Part2 of the differential CSI report, as a second CSI report, different from the first CSI report; determine a first priority of the first CSI report and a second priority of the second CSI report; order the first CSI report and the second CSI report according to their respective priorities; and apply a predefined set of multiplexing rules, that are a based on priority values, to transmissions of the baseline CSI report and the differential CSI report.

In some examples, for semi-static offset values, the first offset value, the second offset value, the third offset value, and the fourth offset values may be RRC configured; and for dynamic offset values, a downlink control information (DCI) may indicate that at least one of: the first offset value and the third offset value are equal and the second offset value and the fourth offset value are equal, the first offset value and the second offset value associated with the baseline CSI report, and relative offset values for the third offset value and the fourth offset value associated with the differential CSI report, are RRC configured, or the user equipment is configured with a table from which the first offset value, the second offset value, the third offset value, and the fourth offset value are selected.

Figure 20:
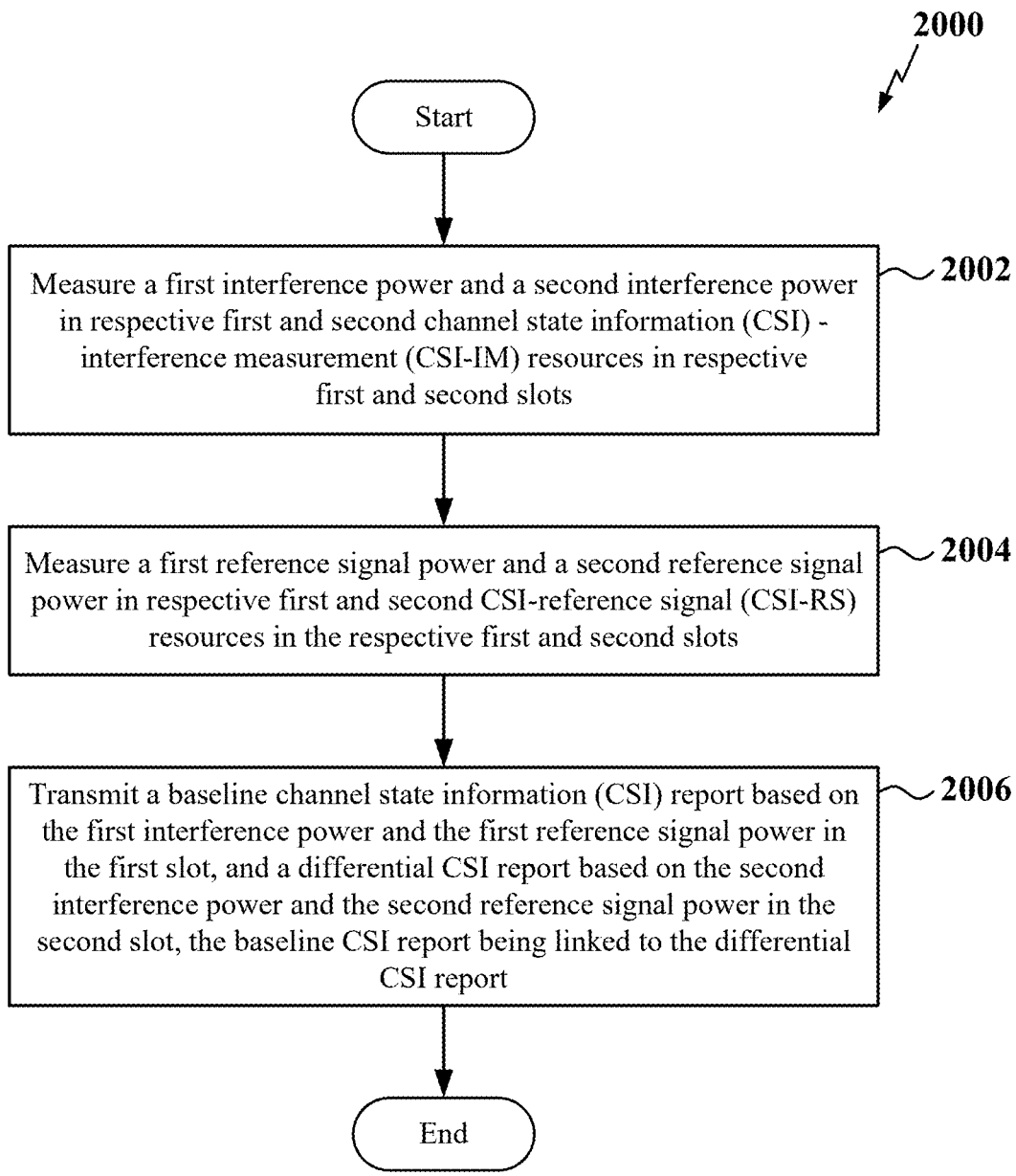
FIG. 20 is a flow chart illustrating an example process of wireless communication at a user equipment according to some aspects.

FIG. 20 is a flow chart illustrating an example process 2000 (e.g., a method) of wireless communication at a user equipment (UE) according to some aspects. As described below, some or all illustrated features may be omitted in a particular implementation within the scope of the present disclosure, and some illustrated features may not be required for implementation of all examples. In some examples, the process 2000 may be carried out by the UE 1800 (e.g., a scheduled entity) illustrated in FIG. 18. The UE 1800 may be similar to, for example, any of the UEs or scheduled entities of FIGS. 1, 2, 4, 5, 6, 8, 10, and/or 18. In some examples, the process 2000 may be carried out by any suitable apparatus or means for carrying out the functions or algorithm described below.

At block 2002, the UE may measure a first interference power and a second interference power in respective first and second channel state information (CSI)-interference measurement (CSI-IM) resources in respective first and second slots. For example, the antenna/antenna array 1820 and the transceiver 1810, in combination with the power reception and measurement circuitry 1841, shown and described above in connection with FIG. 18, may provide a means for measuring a first interference power and a second interference power in respective first and second CSI-IM resources in respective first and second slots.

At block 2004, the UE may receive a first reference signal power and a second reference signal power in respective first and second CSI-reference signal (CSI-RS) resources in the respective first and second slots. For example, the antenna/antenna array 1820 and the transceiver 1810, in combination with the power reception and measurement circuitry 1841, shown and described above in connection with FIG. 18, may provide a means for receiving a first reference signal power and a second reference signal power in respective first and second CSI-RS resources in the respective first and second slots.

At block 2006, the UE may transmit a baseline channel state information (CSI) report based on the first interference power and the first reference signal power in the first slot, and a differential CSI report based on the second interference power and the second reference signal power in the second slot (or more particularly based on a difference between the first interference power and the first reference signal power in the first slot and the second interference power and the second reference signal power in the second slot), the baseline CSI report being linked to the differential CSI report. For example, the antenna/antenna array 1820 and the transceiver 1810, in combination with the baseline CSI report circuitry 1842 and the differential CSI report circuitry 1843, shown and described above in connection with FIG. 18, may provide a means for transmitting a baseline channel state information (CSI) report based on the first interference power and the first reference signal power in the first slot, and a differential CSI report based on the second interference power and the second reference signal power in the second slot (or more particularly based on a difference between the first interference power and the first reference signal power in the first slot and the second interference power and the second reference signal power in the second slot), the baseline CSI report being linked to the differential CSI report.

Figure 21:
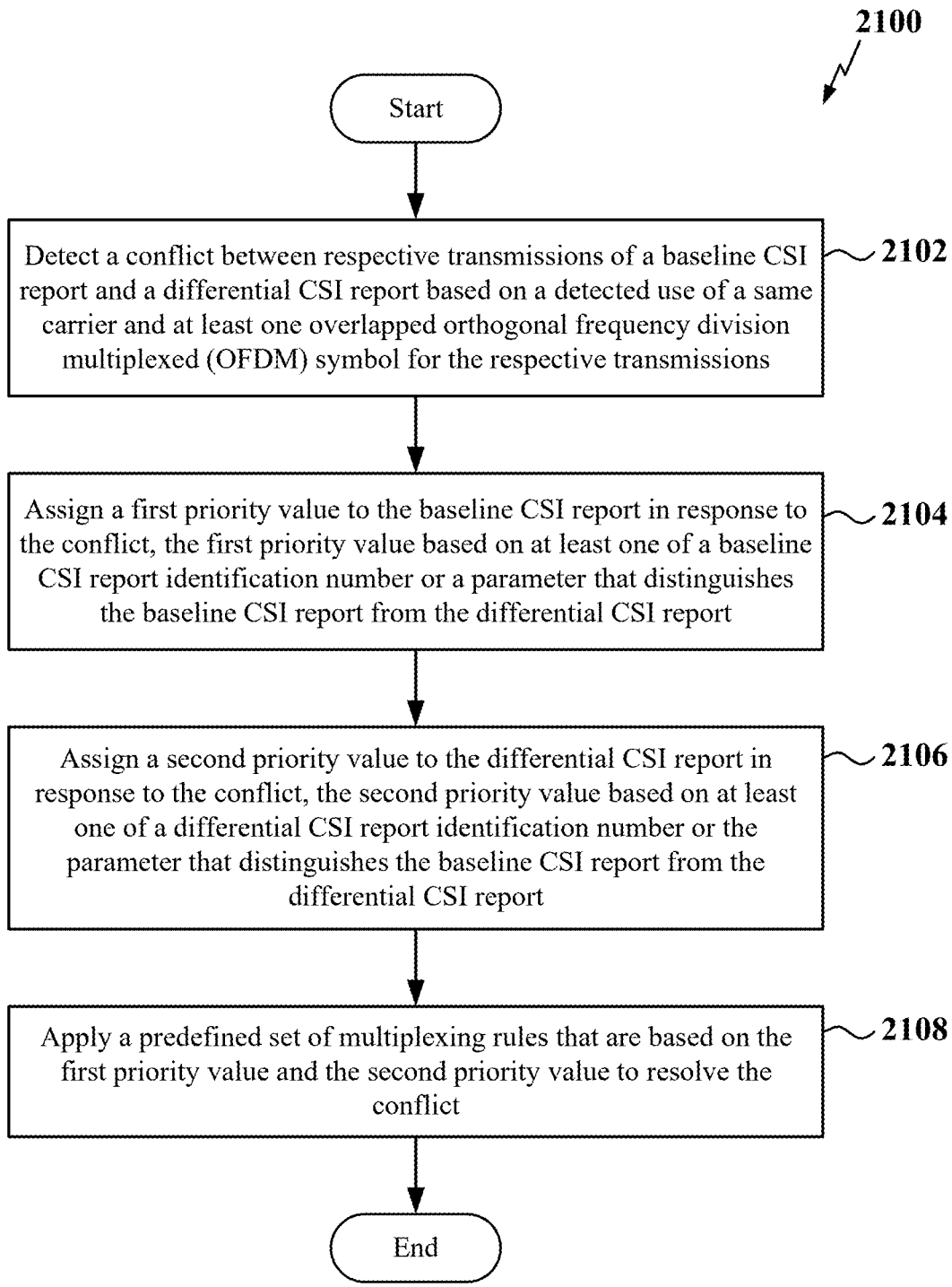
FIG. 21 is a flow chart illustrating an example process of wireless communication at a user equipment according to some aspects.

FIG. 21 is a flow chart illustrating an example process 2100 (e.g., a method) of wireless communication at a user equipment (UE) according to some aspects. As described below, some or all illustrated features may be omitted in a particular implementation within the scope of the present disclosure, and some illustrated features may not be required for implementation of all examples. In some examples, the process 2100 may be carried out by the UE 1800 (e.g., a scheduled entity) illustrated in FIG. 18. The UE 1800 may be similar to, for example, any of the UEs or scheduled entities of FIGS. 1, 2, 4, 5, 6, 8, 10, and/or 18. In some examples, the process 2100 may be carried out by any suitable apparatus or means for carrying out the functions or algorithm described below.

At block 2102, the UE may detect a conflict between respective transmissions of a baseline CSI report and a differential CSI report based on a detected use of a same carrier and at least one overlapped orthogonal frequency division multiplexed (OFDM) symbol for the respective transmissions. For example, the communication and processing circuitry 1840, shown and described above in connection with FIG. 18, may provide a means for detecting a conflict between respective transmissions of a baseline CSI report and a differential CSI report based on a detected use of a same carrier and at least one overlapped orthogonal frequency division multiplexed (OFDM) symbol for the respective transmissions.

At block 2104, the UE may assign a first priority value to the baseline CSI report in response to the conflict, the first priority value based on at least one of a baseline CSI report identification number or a parameter that distinguishes the baseline CSI report from the differential CSI report. For example, the communication and processing circuitry 1840, shown and described above in connection with FIG. 18, may provide a means for assigning a first priority value to the baseline CSI report in response to the conflict, the first priority value based on at least one of a baseline CSI report identification number or a parameter that distinguishes the baseline CSI report from the differential CSI report.

At block 2106, the UE may assign a second priority value to the differential CSI report in response to the conflict, the second priority value based on at least one of a differential CSI report identification number or the parameter that distinguishes the baseline CSI report from the differential CSI report. For example, the communication and processing circuitry 1840, shown and described above in connection with FIG. 18, may provide a means for assigning a second priority value to the differential CSI report in response to the conflict, the second priority value based on at least one of a differential CSI report identification number or the parameter that distinguishes the baseline CSI report from the differential CSI report.

Figure 22:
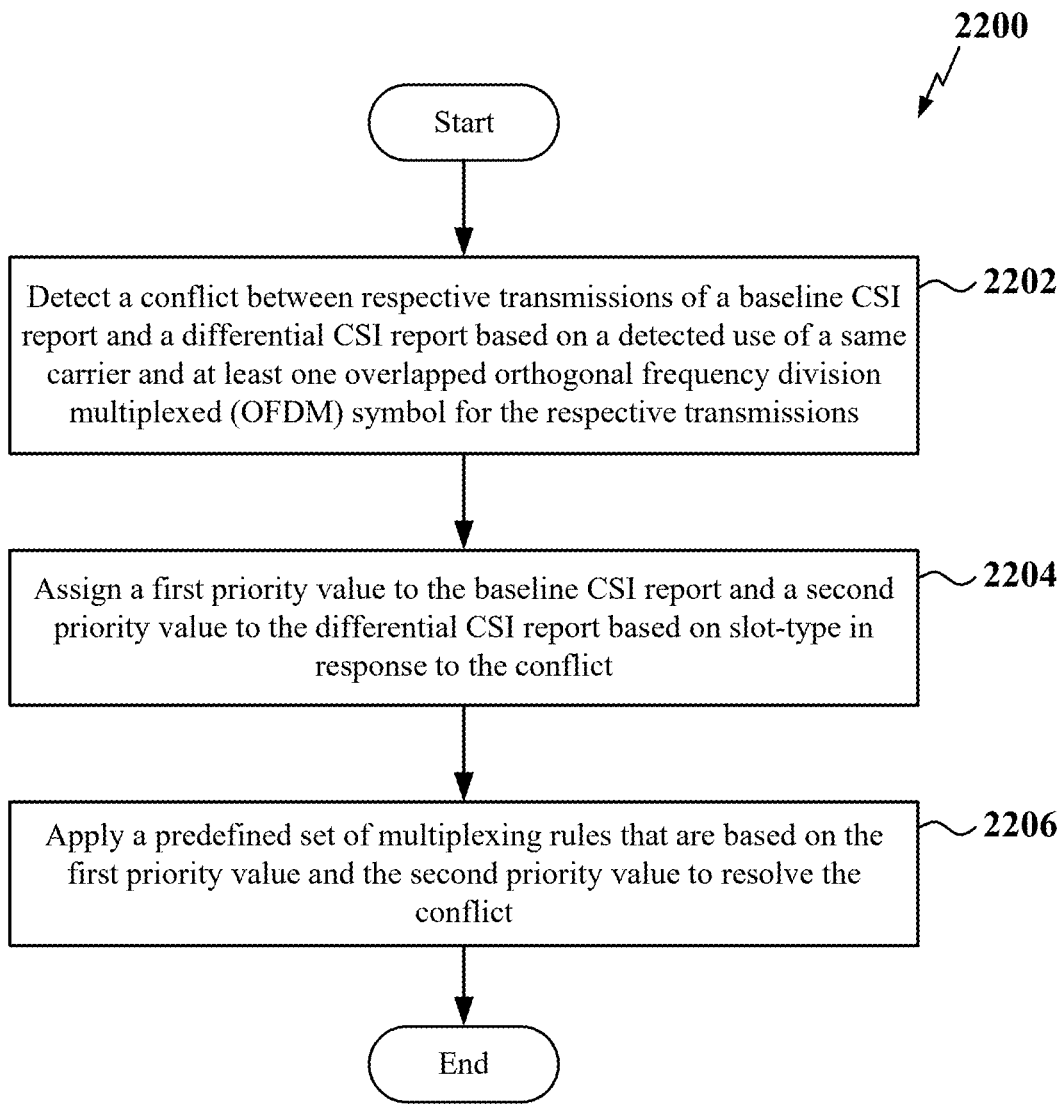
FIG. 22 is a flow chart illustrating an example process of wireless communication at a user equipment according to some aspects.

At block 2108, the UE may apply a predefined set of multiplexing rules that are based on the first priority value and the second priority value to resolve the conflict. For example, the communication and processing circuitry 1840, shown and described above in connection with FIG. 18, may provide a means for applying a predefined set of multiplexing rules that are based on the first priority value and the second priority value to resolve the conflict. The predefined set of multiplexing rules may be stored, for example, in the memory 1805 in a multiplexing rules 1817 location in the UE 1800 as shown and described in connection with FIG. 18. FIG. 22 is a flow chart illustrating an example process 2200 (e.g., a method) of wireless communication at a user equipment (UE) according to some aspects. As described below, some or all illustrated features may be omitted in a particular implementation within the scope of the present disclosure, and some illustrated features may not be required for implementation of all examples. In some examples, the process 2200 may be carried out by the UE 1800 (e.g., a scheduled entity) illustrated in FIG. 18. The UE 1800 may be similar to, for example, any of the UEs or scheduled entities of FIGS. 1, 2, 4, 5, 6, 8, 10, and/or 18. In some examples, the process 2200 may be carried out by any suitable apparatus or means for carrying out the functions or algorithm described below.

At block 2202, the UE may detect a conflict between respective transmissions of a baseline CSI report and a differential CSI report based on a detected use of a same carrier and at least one overlapped orthogonal frequency division multiplexed (OFDM) symbol for the respective transmissions. For example, the communication and processing circuitry 1840, shown and described above in connection with FIG. 18, may provide a means for detecting a conflict between respective transmissions of a baseline CSI report and a differential CSI report based on a detected use of a same carrier and at least one overlapped orthogonal frequency division multiplexed (OFDM) symbol for the respective transmissions.

At block 2204, the UE may assign a first priority value to the baseline CSI report and a second priority value to the differential CSI report based on slot-type in response to the conflict. For example, the communication and processing circuitry 1840, shown and described above in connection with FIG. 18, may provide a means for assigning a first priority value to the baseline CSI report and a second priority value to the differential CSI report based on slot-type in response to the conflict.

At block 2206, the UE may apply a predefined set of multiplexing rules that are based on the first priority value and the second priority value to resolve the conflict. For example, the communication and processing circuitry 1840, shown and described above in connection with FIG. 18, may provide a means for applying a predefined set of multiplexing rules that are based on the first priority value and the second priority value to resolve the conflict. The predefined set of multiplexing rules may be stored, for example, in the memory 1805 in a multiplexing rules 1817 location in the UE 1800 as shown and described in connection with FIG. 18.

Figure 23:
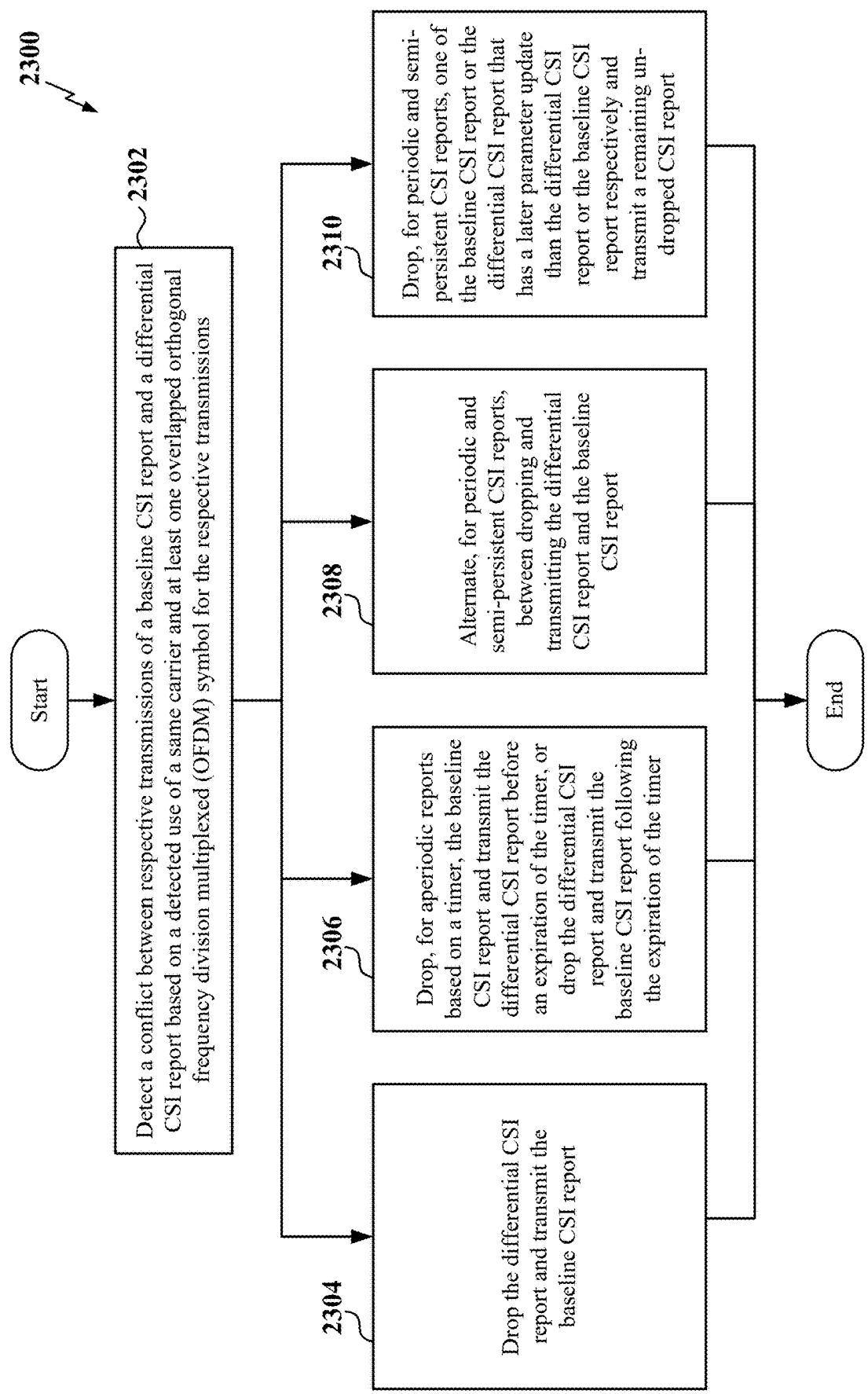
FIG. 23 is a flow chart illustrating an example process of wireless communication at a user equipment according to some aspects.

FIG. 23 is a flow chart illustrating an example process 2300 (e.g., a method) of wireless communication at a user equipment (UE) according to some aspects. As described below, some or all illustrated features may be omitted in a particular implementation within the scope of the present disclosure, and some illustrated features may not be required for implementation of all examples. In some examples, the process 2300 may be carried out by the UE 1800 (e.g., a scheduled entity) illustrated in FIG. 18. The UE 1800 may be similar to, for example, any of the UEs or scheduled entities of FIGS. 1, 2, 4, 5, 6, 8, 10, and/or 18. In some examples, the process 2300 may be carried out by any suitable apparatus or means for carrying out the functions or algorithm described below.

At block 2302, the UE may detect a conflict between respective transmissions of a baseline CSI report and a differential CSI report based on a detected use of a same carrier and at least one overlapped orthogonal frequency division multiplexed (OFDM) symbol for the respective transmissions. For example, the communication and processing circuitry 1840, shown and described above in connection with FIG. 18, may provide a means for detecting a conflict between respective transmissions of a baseline CSI report and a differential CSI report based on a detected use of a same carrier and at least one overlapped orthogonal frequency division multiplexed (OFDM) symbol for the respective transmissions.

At block 2304, the UE may drop the differential CSI report and transmit the baseline CSI report. For example, the communication and processing circuitry 1840, shown and described above in connection with FIG. 18, may provide a means for dropping the differential CSI report and transmitting the baseline CSI report.

At block 2306, the UE may drop, for aperiodic reports based on a timer, the baseline CSI report and transmit the differential CSI report before an expiration of the timer, or drop the differential CSI report and transmit the baseline CSI report following the expiration of the timer. For example, the communication and processing circuitry 1840, shown and described above in connection with FIG. 18, may provide a means for dropping, for aperiodic reports based on a timer, the baseline CSI report and transmitting the differential CSI report before an expiration of the timer, or dropping the differential CSI report and transmitting the baseline CSI report following the expiration of the timer.

At block 2308, the UE may alternate, for periodic and semi-persistent CSI reports, between dropping and transmitting the differential CSI report and the baseline CSI report. For example, the communication and processing circuitry 1840, shown and described above in connection with FIG. 18, may provide a means for alternating, for periodic and semi-persistent CSI reports, between dropping and transmitting the differential CSI report and the baseline CSI report.

At block 2310, the UE drop, for periodic and semi-persistent CSI reports, one of the baseline CSI report or the differential CSI report that has a later parameter update than the differential CSI report or the baseline CSI report respectively and transmit a remaining un-dropped CSI report. For example, the communication and processing circuitry 1840, shown and described above in connection with FIG. 18, may provide a means for dropping, for periodic and semi-persistent CSI reports, one of the baseline CSI report or the differential CSI report that has a later parameter update than the differential CSI report or the baseline CSI report respectively and transmitting a remaining un-dropped CSI report.

Several aspects of a wireless communication network have been presented with reference to an example implementation. As those skilled in the art will readily appreciate, various aspects described throughout this disclosure may be extended to other telecommunication systems, network architectures and communication standards.

Aspect 1: A user equipment for wireless communication, comprising: a transceiver, a memory, and a processor communicatively coupled to the transceiver and the memory, the processor and the memory being configured to: obtain a first channel state information (CSI)-related quantity and a second CSI-related quantity in at least one of: respective first and second CSI-interference measurement (CSI-IM) resources, or respective first and second CSI-reference signal (CSI-RS) resources in respective first and second slots, and transmit a baseline CSI report based on the first CSI-related quantity in the first slot, and a differential CSI report based on the second CSI-related quantity in the second slot, the baseline CSI report being linked to the differential CSI report.

Aspect 2: The user equipment of aspect 1, wherein the first slot is a half-duplex slot, the baseline CSI report is a baseline half-duplex CSI report, the second slot is a full-duplex slot, and the differential CSI report is a differential full-duplex CSI report.

Aspect 3: The user equipment of aspect 1 or 2, wherein the baseline CSI report and the differential CSI report have equal priority values, and the processor and the memory are further configured to at least one of: multiplex the baseline CSI report and the differential CSI report on a physical uplink control channel (PUCCH) or a physical uplink shared channel (PUSCH), transmit the baseline CSI report on the PUSCH and the differential CSI report on a different PUSCH, or transmit the baseline CSI report on the PUCCH and the differential CSI report on a different PUCCH.

Aspect 4: The user equipment of any of aspects 1 through 3, wherein to transmit the baseline CSI report and the differential CSI report, the processor and the memory are further configured to transmit a combined CSI report comprising a combined respective payload of payloads of the baseline CSI report and the differential CSI report.

Aspect 5: The user equipment of any of aspects 1 through 4, wherein the combined CSI report is transmitted only for a predetermined report quantity.

Aspect 6: The user equipment of aspect 4, wherein the combined respective payload comprises data from all fields of a first CSI Part1 of the baseline CSI report and all fields of a second CSI Part1 of the differential CSI report.

Aspect 7: The user equipment of any of aspects 1 through 6, wherein the baseline CSI report has a baseline CSI report identification number and the differential CSI report has a differential CSI report identification number that is different from the baseline CSI report identification number, and the processor and the memory are further configured to: detect a conflict between respective transmissions of the baseline CSI report and the differential CSI report based on a detected use of a same carrier and at least one overlapped orthogonal frequency division multiplexed (OFDM) symbol for the respective transmissions, assign a first priority value to the baseline CSI report in response to the conflict, the first priority value based on at least one of the baseline CSI report identification number or a parameter that distinguishes the baseline CSI report from the differential CSI report, assign a second priority value to the differential CSI report in response to the conflict, the second priority value based on at least one of the differential CSI report identification number or the parameter that distinguishes the baseline CSI report from the differential CSI report, and apply a predefined set of multiplexing rules that are based on the first priority value and the second priority value to resolve the conflict.

Aspect 8: The user equipment of any of aspects 1 through 7, wherein the baseline CSI report is associated with a first slot-type and the differential CSI report is associated with a second slot-type, and the processor and the memory are further configured to: detect a conflict between respective transmissions of the baseline CSI report and the differential CSI report based on a detected use of a same carrier and at least one overlapped orthogonal frequency division multiplexed (OFDM) symbol for the respective transmissions, assign a first priority value to the baseline CSI report and a second priority value to the differential CSI report based on slot-type in response to the conflict, and apply a predefined set of multiplexing rules that are based on the first priority value and the second priority value to resolve the conflict.

Aspect 9: The user equipment of any of aspects 1 through 8, wherein the baseline CSI report and the differential CSI report have equal priority values, and the processor and the memory are further configured to: detect a conflict between respective transmissions of the baseline CSI report and the differential CSI report based on a detected use of a same carrier and at least one overlapped orthogonal frequency division multiplexed (OFDM) symbol for the respective transmissions; and at least one of: drop the differential CSI report and transmit the baseline CSI report, drop, for aperiodic reports based on a timer, the baseline CSI report and transmit the differential CSI report before an expiration of the timer, or drop the differential CSI report and transmit the baseline CSI report following the expiration of the timer, alternate, for periodic and semi-persistent CSI reports, between dropping and transmitting the differential CSI report and the baseline CSI report, or drop, for periodic and semi-persistent CSI reports, one of the baseline CSI report or the differential CSI report that has a later parameter update than the differential CSI report or the baseline CSI report respectively and transmit a remaining un-dropped CSI report.

Aspect 10: The user equipment of any of aspects 1 through 9, wherein the baseline CSI report and the differential CSI report are multiplexed on a physical uplink shared channel (PUSCH).

Aspect 11: The user equipment of any of aspects 1 through 10, wherein a quantity of resource elements allocated to a given CSI report that is multiplexed on a physical uplink shared channel (PUSCH) is based on an offset value that is associated with the user equipment, and the processor and the memory are further configured to: receive a first offset value associated with a first CSI Part1 of the baseline CSI report, receive a second offset value associated with a first CSI Part2 of the baseline CSI report; receive a third offset value associated with a second CSI Part1 of the differential CSI report, receive a fourth offset value associated with a second CSI Part2 of the differential CSI report, and compute respective quantities of resource elements allotted to the baseline CSI report and the differential CSI report using the first offset value, the second offset value, the third offset value, and the fourth offset value respectively, wherein a given offset value greater than 1 increases the quantity of resource elements allocated to the given CSI report multiplexed on the PUSCH relative to a number of resource elements allocated with the given offset value being less than or equal to 1.

Aspect 12: The user equipment of aspect 11, wherein the first offset value is equal to the third offset value and the second offset value is equal to the fourth offset value, and the processor and the memory are further configured to: consider the baseline CSI report, comprised of the first CSI Part1 of the baseline CSI report and the first CSI Part2 of the baseline CSI report, as a first CSI report, consider the differential CSI report, comprised of the second CSI Part1 of the differential CSI report and the second CSI Part2 of the differential CSI report, as a second CSI report, different from the first CSI report, determine a first priority of the first CSI report and a second priority of the second CSI report, order the first CSI report and the second CSI report according to their respective priorities; and apply a predefined set of multiplexing rules, that are based on priority values, to transmissions of the baseline CSI report and the differential CSI report.

Aspect 13: The user equipment of aspect 11, wherein, for semi-static offset values, the first offset value, the second offset value, the third offset value, and the fourth offset value are radio resource control (RRC) configured, and for dynamic offset values, a downlink control information (DCI) indicates that at least one of: the first offset value and the third offset value are equal and the second offset value and the fourth offset value are equal, the first offset value and the second offset value associated with the baseline CSI report, and relative offset values for the third offset value and the fourth offset value associated with the differential CSI report, are RRC configured, or the user equipment is configured with a table from which the first offset value, the second offset value, the third offset value, and the fourth offset value are selected.

Aspect 14: A method of wireless communication at a user equipment, comprising: obtaining a first channel state information (CSI)-related quantity and a second CSI-related quantity in at least one of: respective first and second CSI-interference measurement (CSI-IM) resources, or respective first and second CSI-reference signal (CSI-RS) resources in respective first and second slots, and transmitting a baseline CSI report based on the first CSI-related quantity in the first slot, and a differential CSI report based on the second CSI-related quantity in the second slot, the baseline CSI report being linked to the differential CSI report.

Aspect 15: The method of aspect 14, wherein the first slot is a half-duplex slot, the baseline CSI report is a baseline half-duplex CSI report, the second slot is a full-duplex slot, and the differential CSI report is a differential full-duplex CSI report.

Aspect 16: The method of aspect 14 or 15, wherein the baseline CSI report and the differential CSI report have equal priority values, and the method further comprises at least one of: multiplexing the baseline CSI report and the differential CSI report on a physical uplink control channel (PUCCH) or a physical uplink shared channel (PUSCH), transmitting the baseline CSI report on the PUSCH and the differential CSI report on a different PUSCH, or transmitting the baseline CSI report on the PUCCH and the differential CSI report on a different PUCCH.

Aspect 17: The method of any of aspects 14 through 16, wherein the transmitting the baseline CSI report and the differential CSI report further comprises transmitting a combined CSI report comprising a combined respective payload of payloads of the baseline CSI report and the differential CSI report.

Aspect 18: The method of any of aspects 14 through 17, wherein the baseline CSI report has a baseline CSI report identification number and the differential CSI report has a differential CSI report identification number that is different from the baseline CSI report identification number and the transmitting the baseline CSI report and the differential CSI report further comprises: detecting a conflict between respective transmissions of the baseline CSI report and the differential CSI report based on a detected use of a same carrier and at least one overlapped orthogonal frequency division multiplexed (OFDM) symbol for the respective transmissions, assigning a first priority value to the baseline CSI report in response to the conflict, the first priority value based on at least one of the baseline CSI report identification number or a parameter that distinguishes the baseline CSI report from the differential CSI report, assigning a second priority value to the differential CSI report in response to the conflict, the second priority value based on at least one of the differential CSI report identification number or the parameter that distinguishes the baseline CSI report from the differential CSI report, and applying a predefined set of multiplexing rules that are based on the first priority value and the second priority value to resolve the conflict.

Aspect 19: The method of any of aspects 14 through 18, wherein the baseline CSI report is associated with a first slot-type and the differential CSI report is associated with a second slot-type, and the transmitting the baseline CSI report and the differential CSI report further comprises: detecting a conflict between respective transmissions of the baseline CSI report and the differential CSI report based on a detected use of a same carrier and at least one overlapped orthogonal frequency division multiplexed (OFDM) symbol for the respective transmissions, assigning a first priority value to the baseline CSI report and a second priority value to the differential CSI report based on slot-type in response to the conflict, and applying a predefined set of multiplexing rules that are based on the first priority value and the second priority value to resolve the conflict.

Aspect 20: The method of any of aspects 14 through 19, wherein the baseline CSI report and the differential CSI report have equal priority values, and the transmitting the baseline CSI report and the differential CSI report further comprises: detecting a conflict between respective transmissions of the baseline CSI report and the differential CSI report based on a detected use of a same carrier and at least one overlapped orthogonal frequency division multiplexed (OFDM) symbol for the respective transmissions; and at least one of: dropping the differential CSI report and transmitting the baseline CSI report, dropping, for aperiodic reports based on a timer, the baseline CSI report and transmitting the differential CSI report before an expiration of the timer, or dropping the differential CSI report and transmitting the baseline CSI report following the expiration of the timer, alternating, for periodic and semi-persistent CSI reports, between dropping and transmitting the differential CSI report and the baseline CSI report, or dropping, for periodic and semi-persistent CSI reports, one of the baseline CSI report or the differential CSI report that has a later parameter update than the differential CSI report or the baseline CSI report respectively and transmitting a remaining un-dropped CSI report.

Aspect 21: The method of any of aspects 14 through 20, wherein the baseline CSI report and the differential CSI report are multiplexed on a physical uplink shared channel (PUSCH).

Aspect 22 The method of any of aspects 14 through 21, wherein a quantity of resource elements allocated to a given CSI report that is multiplexed on a physical uplink shared channel (PUSCH) is based on an offset value that is associated with the user equipment, the method further comprising: receiving a first offset value associated with a first CSI Part1 of the baseline CSI report, receiving a second offset value associated with a first CSI Part2 of the baseline CSI report; receiving a third offset value associated with a second CSI Part1 of the differential CSI report, receiving a fourth offset value associated with a second CSI Part2 of the differential CSI report, and computing respective quantities of resource elements allotted to the baseline CSI report and the differential CSI report using the first offset value, the second offset value, the third offset value, and the fourth offset value respectively, wherein a given offset value greater than 1 increases the quantity of resource elements allocated to the given CSI report multiplexed on the PUSCH relative to a number of resource elements allocated with the given offset value being less than or equal to 1.

Aspect 23: A user equipment configured for wireless communication, comprising: means for obtaining a first channel state information (CSI)-related quantity and a second CSI-related quantity in at least one of: respective first and second CSI-interference measurement (CSI-IM) resources, or respective first and second CSI-reference signal (CSI-RS) resources in respective first and second slots, and means for transmitting a baseline CSI report based on the first CSI-related quantity in the first slot, and a differential CSI report based on the second CSI-related quantity in the second slot, the baseline CSI report being linked to the differential CSI report.

Aspect 24: The user equipment of aspect 23, wherein the first slot is a half-duplex slot, the baseline CSI report is a baseline half-duplex CSI report, the second slot is a full-duplex slot, and the differential CSI report is a differential full-duplex CSI report.

Aspect 25: The user equipment of aspect 23 or 24, wherein the baseline CSI report and the differential CSI report have equal priority values, and the user equipment further comprises at least one of: means for multiplexing the baseline CSI report and the differential CSI report on a physical uplink control channel (PUCCH) or a physical uplink shared channel (PUSCH), means for transmitting the baseline CSI report on the PUSCH and the differential CSI report on a different PUSCH, or means for transmitting the baseline CSI report on the PUCCH and the differential CSI report on a different PUCCH.

Aspect 26: The user equipment of any of aspects 23 through 25, wherein the means for transmitting the baseline CSI report and the differential CSI report further comprises means for transmitting a combined CSI report comprising a combined respective payload of payloads of the baseline CSI report and the differential CSI report.

Aspect 27: The user equipment of any of aspects 23 through 26, wherein the baseline CSI report has a baseline CSI report identification number and the differential CSI report has a differential CSI report identification number that is different from the baseline CSI report identification number and the transmitting the baseline CSI report and the differential CSI report further comprises: means for detecting a conflict between respective transmissions of the baseline CSI report and the differential CSI report based on a detected use of a same carrier and at least one overlapped orthogonal frequency division multiplexed (OFDM) symbol for the respective transmissions, means for assigning a first priority value to the baseline CSI report in response to the conflict, the first priority value based on at least one of the baseline CSI report identification number or a parameter that distinguishes the baseline CSI report from the differential CSI report, means for assigning a second priority value to the differential CSI report in response to the conflict, the second priority value based on at least one of the differential CSI report identification number or the parameter that distinguishes the baseline CSI report from the differential CSI report, and means for applying a predefined set of multiplexing rules that are based on the first priority value and the second priority value to resolve the conflict.

Aspect 28: The user equipment of any of aspects 23 through 27, wherein the baseline CSI report is associated with a first slot-type and the differential CSI report is associated with a second slot-type, and the transmitting the baseline CSI report and the differential CSI report further comprises: means for detecting a conflict between respective transmissions of the baseline CSI report and the differential CSI report based on a detected use of a same carrier and at least one overlapped orthogonal frequency division multiplexed (OFDM) symbol for the respective transmissions, means for assigning a first priority value to the baseline CSI report and a second priority value to the differential CSI report based on slot-type in response to the conflict, and means for applying a predefined set of multiplexing rules that are based on the first priority value and the second priority value to resolve the conflict.

Aspect 29: The user equipment of any of aspects 23 through 28, wherein the baseline CSI report and the differential CSI report have equal priority values, and the transmitting the baseline CSI report and the differential CSI report further comprises: means for detecting a conflict between respective transmissions of the baseline CSI report and the differential CSI report based on a detected use of a same carrier and at least one overlapped orthogonal frequency division multiplexed (OFDM) symbol for the respective transmissions; and at least one of: means for dropping the differential CSI report and transmitting the baseline CSI report, means for dropping, for aperiodic reports based on a timer, the baseline CSI report and transmitting the differential CSI report before an expiration of the timer, or dropping the differential CSI report and transmitting the baseline CSI report following the expiration of the timer, means for alternating, for periodic and semi-persistent CSI reports, between dropping and transmitting the differential CSI report and the baseline CSI report, or means for dropping, for periodic and semi-persistent CSI reports, one of the baseline CSI report or the differential CSI report that has a later parameter update than the differential CSI report or the baseline CSI report respectively and transmitting a remaining un-dropped CSI report.

Aspect 30: The user equipment of any of aspects 23 through 29, wherein a quantity of resource elements allocated to a given CSI report that is multiplexed on a physical uplink shared channel (PUSCH) is based on an offset value that is associated with the user equipment, the user equipment further comprising: means for receiving a first offset value associated with a first CSI Part1 of the baseline CSI report, means for receiving a second offset value associated with a first CSI Part2 of the baseline CSI report; means for receiving a third offset value associated with a second CSI Part1 of the differential CSI report, means for receiving a fourth offset value associated with a second CSI Part2 of the differential CSI report, and means for computing respective quantities of resource elements allotted to the baseline CSI report and the differential CSI report using the first offset value, the second offset value, the third offset value, and the fourth offset value respectively, wherein a given offset value greater than 1 increases the quantity of resource elements allocated to the given CSI report multiplexed on the PUSCH relative to a number of resource elements allocated with the given offset value being less than or equal to 1.

Aspect 31: A non-transitory computer-readable medium storing computer-executable code, comprising code for causing an apparatus to perform a method of any one of aspects 14 through 22.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing Institute of Electrical and Electronics Engineers (IEEE) 802.11 (Wi-Fi), IEEE 802.16 (WiMA), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage, or mode of operation. The term "coupled" is used herein to refer to the direct or indirect coupling between two objects. For example, if object A physically touches object B, and object B touches object C, then objects A and C may still be considered coupled to one another-even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-23 may be rearranged and/or combined into a single component, step, feature, or function or embodied in several components, steps, or functions. Additional elements, components, steps, and/or functions may also be added without departing from novel features disclosed herein. The apparatus, devices, and/or components illustrated in any one or more of FIGS. 1-23 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of example processes. Based upon design preferences, it is understood that the specific order or hierarchy of steps in the methods may be rearranged. The accompanying method claims present elements of the various steps in a sample order and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b, and c. similarly, the construct "a and/or b" is intended to cover a; b; and a and b. The construct A and/or B is intended to cover A, B, and A and B. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A user equipment for wireless communication, comprising:
   one or more memories; and
   one or more processors coupled to the one or more memories, the one or more processors being configured to:
      obtain a first channel state information (CSI)-related quantity and a second CSI-related quantity in at least one of: respective first and second CSI-interference measurement (CSI-IM) resources, or respective first and second CSI-reference signal (CSI-RS) resources in respective first and second slots, and
      transmit a baseline CSI report based on the first CSI-related quantity in the first slot, and a differential CSI report based on the second CSI-related quantity in the second slot, the baseline CSI report being linked to the differential CSI report,
      wherein the baseline CSI report and the differential CSI report have equal priority values, and the one or more processors are further configured to at least one of:
         multiplex the baseline CSI report and the differential CSI report on a physical uplink control channel (PUCCH) or a physical uplink shared channel (PUSCH),
         transmit the baseline CSI report on the PUSCH and the differential CSI report on a different PUSCH, or
         transmit the baseline CSI report on the PUCCH and the differential CSI report on a different PUCCH.

2. The user equipment of claim 1, wherein the first slot is a half-duplex slot, the baseline CSI report is a baseline half-duplex CSI report, the second slot is a full-duplex slot, and the differential CSI report is a differential full-duplex CSI report.

3. The user equipment of claim 1, wherein to transmit the baseline CSI report and the differential CSI report, the one or more processors are further configured to transmit a combined CSI report comprising a combined respective payload of payloads of the baseline CSI report and the differential CSI report.

4. The user equipment of claim 3, wherein the combined CSI report is transmitted only for a predetermined report quantity.

5. The user equipment of claim 3, wherein the combined respective payload comprises data from all fields of a first CSI Part1 of the baseline CSI report and all fields of a second CSI Part1 of the differential CSI report.

6. The user equipment of claim 1, wherein the baseline CSI report has a baseline CSI report identification number and the differential CSI report has a differential CSI report identification number that is different from the baseline CSI report identification number, and the one or more processors are further configured to:
   detect a conflict between respective transmissions of the baseline CSI report and the differential CSI report based on a detected use of a same carrier and at least one overlapped orthogonal frequency division multiplexed (OFDM) symbol for the respective transmissions;
assign a first priority value to the baseline CSI report in response to the conflict, the first priority value based on at least one of the baseline CSI report identification number or a parameter that distinguishes the baseline CSI report from the differential CSI report;
assign a second priority value to the differential CSI report in response to the conflict, the second priority value based on at least one of the differential CSI report identification number or the parameter that distinguishes the baseline CSI report from the differential CSI report; and
apply a predefined set of multiplexing rules that are based on the first priority value and the second priority value to resolve the conflict.

7. The user equipment of claim 1, wherein the baseline CSI report is associated with a first slot-type and the differential CSI report is associated with a second slot-type, and the one or more processors are further configured to:
detect a conflict between respective transmissions of the baseline CSI report and the differential CSI report based on a detected use of a same carrier and at least one overlapped orthogonal frequency division multiplexed (OFDM) symbol for the respective transmissions;
assign a first priority value to the baseline CSI report and a second priority value to the differential CSI report based on slot-type in response to the conflict; and
apply a predefined set of multiplexing rules that are based on the first priority value and the second priority value to resolve the conflict.

8. The user equipment of claim 1, wherein the baseline CSI report and the differential CSI report have equal priority values, and the one or more processors are further configured to:
detect a conflict between respective transmissions of the baseline CSI report and the differential CSI report based on a detected use of a same carrier and at least one overlapped orthogonal frequency division multiplexed (OFDM) symbol for the respective transmissions; and at least one of:
drop the differential CSI report and transmit the baseline CSI report,
drop, for aperiodic reports based on a timer, the baseline CSI report and transmit the differential CSI report before an expiration of the timer, or drop the differential CSI report and transmit the baseline CSI report following the expiration of the timer,
alternate, for periodic and semi-persistent CSI reports, between dropping and transmitting the differential CSI report and the baseline CSI report, or
drop, for periodic and semi-persistent CSI reports, one of the baseline CSI report or the differential CSI report that has a later parameter update than the differential CSI report or the baseline CSI report respectively and transmit a remaining un-dropped CSI report.

9. The user equipment of claim 1, wherein the baseline CSI report and the differential CSI report are multiplexed on the PUSCH.

10. The user equipment of claim 1, wherein a quantity of resource elements allocated to a given CSI report that is multiplexed on the PUSCH is based on an offset value that is associated with the user equipment, and the one or more processors are further configured to:

receive a first offset value associated with a first CSI Part1 of the baseline CSI report;
receive a second offset value associated with a first CSI Part2 of the baseline CSI report;
receive a third offset value associated with a second CSI Part1 of the differential CSI report;
receive a fourth offset value associated with a second CSI Part2 of the differential CSI report; and
compute respective quantities of resource elements allotted to the baseline CSI report and the differential CSI report using the first offset value, the second offset value, the third offset value, and the fourth offset value respectively,
wherein a given offset value greater than 1 increases the quantity of resource elements allocated to the given CSI report multiplexed on the PUSCH relative to a number of resource elements allocated with the given offset value being less than or equal to 1.

11. The user equipment of claim 10, wherein the first offset value is equal to the third offset value and the second offset value is equal to the fourth offset value, and the one or more processors are further configured to:
consider the baseline CSI report, comprised of the first CSI Part1 of the baseline CSI report and the first CSI Part2 of the baseline CSI report, as a first CSI report;
consider the differential CSI report, comprised of the second CSI Part1 of the differential CSI report and the second CSI Part2 of the differential CSI report, as a second CSI report, different from the first CSI report;
determine a first priority of the first CSI report and a second priority of the second CSI report;
order the first CSI report and the second CSI report according to their respective priorities; and
apply a predefined set of multiplexing rules, that are based on priority values, to transmissions of the baseline CSI report and the differential CSI report.

12. The user equipment of claim 10, wherein,
for semi-static offset values, the first offset value, the second offset value, the third offset value, and the fourth offset value are radio resource control (RRC) configured; and
for dynamic offset values, a downlink control information (DCI) indicates that at least one of:
the first offset value and the third offset value are equal and the second offset value and the fourth offset value are equal,
the first offset value and the second offset value associated with the baseline CSI report, and relative offset values for the third offset value and the fourth offset value associated with the differential CSI report, are RRC configured, or
the user equipment is configured with a table from which the first offset value, the second offset value, the third offset value, and the fourth offset value are selected.

13. A method of wireless communication at a user equipment, comprising:
obtaining a first channel state information (CSI)-related quantity and a second CSI-related quantity in at least one of: respective first and second CSI-interference measurement (CSI-IM) resources, or respective first and second CSI-reference signal (CSI-RS) resources in respective first and second slots; and
transmitting a baseline CSI report based on the first CSI-related quantity in the first slot, and a differential CSI report based on the second CSI-related quantity in the second slot, the baseline CSI report being linked to the differential CSI report,
wherein the baseline CSI report and the differential CSI report have equal priority values, and the method further comprises at least one of:
multiplexing the baseline CSI report and the differential CSI report on a physical uplink control channel (PUCCH) or a physical uplink shared channel (PUSCH),
transmitting the baseline CSI report on the PUSCH and the differential CSI report on a different PUSCH, or transmitting the baseline CSI report on the PUCCH and the differential CSI report on a different PUCCH.

14. The method of claim 13, wherein the first slot is a half-duplex slot, the baseline CSI report is a baseline half-duplex CSI report, the second slot is a full-duplex slot, and the differential CSI report is a differential full-duplex CSI report.

15. The method of claim 13, wherein the transmitting the baseline CSI report and the differential CSI report further comprises transmitting a combined CSI report comprising a combined respective payload of payloads of the baseline CSI report and the differential CSI report.

16. The method of claim 15, wherein the combined CSI report is transmitted only for a predetermined report quantity.

17. The method of claim 13, wherein the baseline CSI report has a baseline CSI report identification number and the differential CSI report has a differential CSI report identification number that is different from the baseline CSI report identification number and the transmitting the baseline CSI report and the differential CSI report further comprises:
detecting a conflict between respective transmissions of the baseline CSI report and the differential CSI report based on a detected use of a same carrier and at least one overlapped orthogonal frequency division multiplexed (OFDM) symbol for the respective transmissions;
assigning a first priority value to the baseline CSI report in response to the conflict, the first priority value based on at least one of the baseline CSI report identification number or a parameter that distinguishes the baseline CSI report from the differential CSI report;
assigning a second priority value to the differential CSI report in response to the conflict, the second priority value based on at least one of the differential CSI report identification number or the parameter that distinguishes the baseline CSI report from the differential CSI report; and
applying a predefined set of multiplexing rules that are based on the first priority value and the second priority value to resolve the conflict.

18. The method of claim 13, wherein the baseline CSI report is associated with a first slot-type and the differential CSI report is associated with a second slot-type, and the transmitting the baseline CSI report and the differential CSI report further comprises:
detecting a conflict between respective transmissions of the baseline CSI report and the differential CSI report based on a detected use of a same carrier and at least one overlapped orthogonal frequency division multiplexed (OFDM) symbol for the respective transmissions;
assigning a first priority value to the baseline CSI report and a second priority value to the differential CSI report based on slot-type in response to the conflict; and
applying a predefined set of multiplexing rules that are based on the first priority value and the second priority value to resolve the conflict.

19. The method of claim 13, wherein the baseline CSI report and the differential CSI report have equal priority values, and the transmitting the baseline CSI report and the differential CSI report further comprises:
detecting a conflict between respective transmissions of the baseline CSI report and the differential CSI report based on a detected use of a same carrier and at least one overlapped orthogonal frequency division multiplexed (OFDM) symbol for the respective transmissions; and at least one of:
dropping the differential CSI report and transmitting the baseline CSI report,
dropping, for aperiodic reports based on a timer, the baseline CSI report and transmitting the differential CSI report before an expiration of the timer, or dropping the differential CSI report and transmitting the baseline CSI report following the expiration of the timer,
alternating, for periodic and semi-persistent CSI reports, between dropping and transmitting the differential CSI report and the baseline CSI report, or
dropping, for periodic and semi-persistent CSI reports, one of the baseline CSI report or the differential CSI report that has a later parameter update than the differential CSI report or the baseline CSI report respectively and transmitting a remaining un-dropped CSI report.

20. The method of claim 13, wherein the baseline CSI report and the differential CSI report are multiplexed on the PUSCH.

21. The method of claim 13, wherein a quantity of resource elements allocated to a given CSI report that is multiplexed on the PUSCH is based on an offset value that is associated with the user equipment, the method further comprising:
receiving a first offset value associated with a first CSI Part1 of the baseline CSI report;
receiving a second offset value associated with a first CSI Part2 of the baseline CSI report;
receiving a third offset value associated with a second CSI Part1 of the differential CSI report;
receiving a fourth offset value associated with a second CSI Part2 of the differential CSI report; and
computing respective quantities of resource elements allotted to the baseline CSI report and the differential CSI report using the first offset value, the second offset value, the third offset value, and the fourth offset value respectively,
wherein a given offset value greater than 1 increases the quantity of resource elements allocated to the given CSI report multiplexed on the PUSCH relative to a number of resource elements allocated with the given offset value being less than or equal to 1.

22. A user equipment configured for wireless communication, comprising:
means for obtaining a first channel state information (CSI)-related quantity and a second CSI-related quantity in at least one of: respective first and second CSI-interference measurement (CSI-IM) resources, or respective first and second CSI-reference signal (CSI-RS) resources in respective first and second slots; and means for transmitting a baseline CSI report based on the first CSI-related quantity in the first slot, and a differential CSI report based on the second CSI-related quantity in the second slot, the baseline CSI report being linked to the differential CSI report, wherein the baseline CSI report and the differential CSI report have equal priority values, and the user equipment further comprises at least one of:

means for multiplexing the baseline CSI report and the differential CSI report on a physical uplink control channel (PUCCH) or a physical uplink shared channel (PUSCH), means for transmitting the baseline CSI report on the PUSCH and the differential CSI report on a different PUSCH, or means for transmitting the baseline CSI report on the PUCCH and the differential CSI report on a different PUCCH.

23. The user equipment of claim 22, wherein the first slot is a half-duplex slot, the baseline CSI report is a baseline half-duplex CSI report, the second slot is a full-duplex slot, and the differential CSI report is a differential full-duplex CSI report.

24. The user equipment of claim 22, wherein the means for transmitting the baseline CSI report and the differential CSI report further comprises means for transmitting a combined CSI report comprising a combined respective payload of payloads of the baseline CSI report and the differential CSI report.

25. The user equipment of claim 24, wherein the combined CSI report is transmitted only for a predetermined report quantity.

26. The user equipment of claim 22, wherein the baseline CSI report has a baseline CSI report identification number and the differential CSI report has a differential CSI report identification number that is different from the baseline CSI report identification number and to transmit the baseline CSI report and the differential CSI report the user equipment further comprises:

means for detecting a conflict between respective transmissions of the baseline CSI report and the differential CSI report based on a detected use of a same carrier and at least one overlapped orthogonal frequency division multiplexed (OFDM) symbol for the respective transmissions;

means for assigning a first priority value to the baseline CSI report in response to the conflict, the first priority value based on at least one of the baseline CSI report identification number or a parameter that distinguishes the baseline CSI report from the differential CSI report;

means for assigning a second priority value to the differential CSI report in response to the conflict, the second priority value based on at least one of the differential CSI report identification number or the parameter that distinguishes the baseline CSI report from the differential CSI report; and means for applying a predefined set of multiplexing rules that are based on the first priority value and the second priority value to resolve the conflict.

27. The user equipment of claim 22, wherein the baseline CSI report is associated with a first slot-type and the differential CSI report is associated with a second slot-type, and to transmit the baseline CSI report and the differential CSI report the user equipment further comprises:

means for detecting a conflict between respective transmissions of the baseline CSI report and the differential CSI report based on a detected use of a same carrier and at least one overlapped orthogonal frequency division multiplexed (OFDM) symbol for the respective transmissions;

means for assigning a first priority value to the baseline CSI report and a second priority value to the differential CSI report based on slot-type in response to the conflict; and means for applying a predefined set of multiplexing rules that are based on the first priority value and the second priority value to resolve the conflict.

28. The user equipment of claim 22, wherein the baseline CSI report and the differential CSI report have equal priority values, and to transmit the baseline CSI report and the differential CSI report the user equipment further comprises:

means for detecting a conflict between respective transmissions of the baseline CSI report and the differential CSI report based on a detected use of a same carrier and at least one overlapped orthogonal frequency division multiplexed (OFDM) symbol for the respective transmissions; and at least one of:

means for dropping the differential CSI report and transmitting the baseline CSI report, means for dropping, for aperiodic reports based on a timer, the baseline CSI report and transmitting the differential CSI report before an expiration of the timer, or dropping the differential CSI report and transmitting the baseline CSI report following the expiration of the timer, means for alternating, for periodic and semi-persistent CSI reports, between dropping and transmitting the differential CSI report and the baseline CSI report, or means for dropping, for periodic and semi-persistent CSI reports, one of the baseline CSI report or the differential CSI report that has a later parameter update than the differential CSI report or the baseline CSI report respectively and transmitting a remaining un-dropped CSI report.

29. The user equipment of claim 22, wherein a quantity of resource elements allocated to a given CSI report that is multiplexed on the PUSCH is based on an offset value that is associated with the user equipment, the user equipment further comprising:

means for receiving a first offset value associated with a first CSI Part1 of the baseline CSI report;

means for receiving a second offset value associated with a first CSI Part2 of the baseline CSI report;

means for receiving a third offset value associated with a second CSI Part1 of the differential CSI report;

means for receiving a fourth offset value associated with a second CSI Part2 of the differential CSI report; and means for computing respective quantities of resource elements allotted to the baseline CSI report and the differential CSI report using the first offset value, the second offset value, the third offset value, and the fourth offset value respectively, wherein a given offset value greater than 1 increases the quantity of resource elements allocated to the given CSI report multiplexed on the PUSCH relative to a number of resource elements allocated with the given offset value being less than or equal to 1.

30. The User equipment of claim 22, wherein the baseline CSI report and the differential CSI report are multiplexed on the PUSCH.

* * * * *